(12) United States Patent
Johnson et al.

(10) Patent No.: US 8,972,746 B2
(45) Date of Patent: *Mar. 3, 2015

(54) TECHNIQUE FOR SUPPORTING MULTIPLE SECURE ENCLAVES

(75) Inventors: Simon P. Johnson, Beaverton, OR (US); Uday R. Savagaonkar, Portland, OR (US); Vincent R. Scarlata, Beaverton, OR (US); Francis X. McKeen, Portland, OR (US); Carlos V. Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/972,406

(22) Filed: Dec. 17, 2010

(65) Prior Publication Data

US 2012/0159184 A1 Jun. 21, 2012

(51) Int. Cl.
*G06F 11/30* (2006.01)
*G06F 12/14* (2006.01)
*G06F 21/62* (2013.01)

(52) U.S. Cl.
CPC ........ *G06F 12/1466* (2013.01); *G06F 21/6218* (2013.01)
USPC .......................................... 713/189; 713/190

(58) Field of Classification Search
CPC .......... G06F 21/70; G06F 21/71; G06F 21/72
See application file for complete search history.

(56) References Cited

U.S. PATENT DOCUMENTS

| 4,933,846 | A | * | 6/1990 | Humphrey et al. | 710/107 |
| 5,276,735 | A | * | 1/1994 | Boebert et al. | 713/167 |
| 5,499,297 | A | * | 3/1996 | Boebert | 713/159 |
| 5,502,766 | A | * | 3/1996 | Boebert et al. | 713/193 |
| 6,073,157 | A | | 6/2000 | Horiguchi et al. | |
| 2005/0108533 | A1 | * | 5/2005 | Ji et al. | 713/171 |
| 2005/0160266 | A1 | * | 7/2005 | Choi | 713/168 |
| 2006/0015754 | A1 | * | 1/2006 | Drehmel et al. | 713/193 |
| 2006/0198517 | A1 | * | 9/2006 | Cameron et al. | 380/44 |
| 2007/0136098 | A1 | * | 6/2007 | Smythe et al. | 705/3 |
| 2008/0059799 | A1 | * | 3/2008 | Scarlata | 713/176 |
| 2008/0279373 | A1 | * | 11/2008 | Erhart et al. | 380/46 |
| 2009/0089078 | A1 | | 4/2009 | Bursey | |
| 2010/0043070 | A1 | * | 2/2010 | Okada et al. | 726/21 |
| 2010/0318799 | A1 | * | 12/2010 | Simon et al. | 713/171 |

(Continued)

FOREIGN PATENT DOCUMENTS

WO 2012/082410 A2 6/2012
WO 2012/082410 A3 8/2012

OTHER PUBLICATIONS

Ned Smith ("Storage Protection with Intel Anti-Theft Technology—Data Protection (Intel AT-d)"; Intel Technology Journal, vol. 12, Issue 04, Dec. 23, 2008, ISSN 1535-864X, DOI 10.1535/itj.1204.01, pp. 239-254).*

Trimberger, Special Session I: Trusted Hardware: "Trusted Design in FPGAs", 44th Design Automation Conference, San Diego, California; Jun. 4-8, 2007.*

(Continued)

*Primary Examiner* — Jeffrey Pwu
*Assistant Examiner* — Carlos Amorin
(74) *Attorney, Agent, or Firm* — Thomas R. Lane

(57) ABSTRACT

A technique to enable secure application and data integrity within a computer system. In one embodiment, one or more secure enclaves are established in which an application and data may be stored and executed.

4 Claims, 22 Drawing Sheets

(56) References Cited

U.S. PATENT DOCUMENTS

| | | | |
|---|---|---|---|
| 2010/0318800 A1* | 12/2010 | Simon et al. | 713/171 |
| 2011/0066509 A1* | 3/2011 | Pizano et al. | 705/14.69 |
| 2011/0099397 A1* | 4/2011 | Rotem et al. | 713/320 |
| 2011/0162082 A1* | 6/2011 | Paksoy et al. | 726/26 |
| 2011/0258426 A1* | 10/2011 | Mujtaba et al. | 713/2 |
| 2012/0017090 A1* | 1/2012 | Gould et al. | 713/176 |
| 2012/0158817 A1* | 6/2012 | Lauderdale et al. | 709/201 |

OTHER PUBLICATIONS

International Search Report and Written Opinion received for PCT Patent Application No. PCT/US2011/063140 mailed on Jun. 26, 2012, 9 Pages.

Intenational Preliminary Report on Patentability received for PCT Patent Appliction No. PCT/US2011/063140, mailed on Jun. 27, 2013, 8 pages.

* cited by examiner

FIG. 27

TECHNIQUE FOR SUPPORTING MULTIPLE SECURE ENCLAVES

FIELD OF THE INVENTION

Embodiments of the invention relate generally to the field of information processing and more specifically, to the field of security in computing systems and microprocessors.

BACKGROUND

Securing execution and integrity of applications and their data within a computer system is of growing importance. Some prior art security techniques fail to adequately secure applications and data in a flexible but reliable manner.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 27 illustrates, for one embodiment of the invention, a debug register DR7 2700.

DETAILED DESCRIPTION

Embodiments of the invention pertain to a technique for providing secure application and data in a flexible but reliable manner. Although there are multiple embodiments of multiple aspects of the invention, the attached document entitled "Secure Enclaves Architecture" is hereby incorporated by reference as an example of at least one embodiment. However, the incorporated reference is not intended to limit the scope of embodiments of the invention in any way and other embodiments may be used while remaining within the spirit and scope of the invention.

Figure 1:
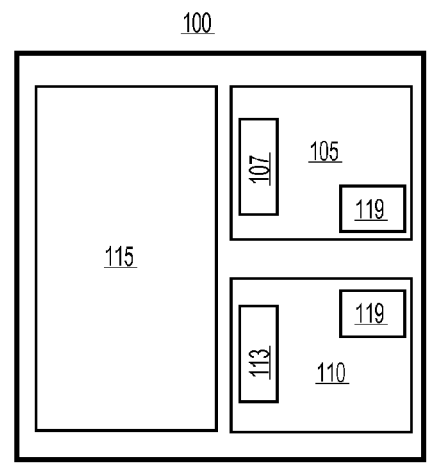
FIG. 1 illustrates a block diagram of a microprocessor, in which at least one embodiment of the invention may be used.

FIG. 1 illustrates a microprocessor in which at least one embodiment of the invention may be used. In particular, FIG. 1 illustrates microprocessor 100 having one or more processor cores 105 and 110, each having associated therewith a local cache 107 and 113, respectively. Also illustrated in FIG. 1 is a shared cache memory 115 which may store versions of at least some of the information stored in each of the local caches 107 and 113. In some embodiments, microprocessor 100 may also include other logic not shown in FIG. 1, such as an integrated memory controller, integrated graphics controller, as well as other logic to perform other functions within a computer system, such as I/O control. In one embodiment, each microprocessor in a multi-processor system or each processor core in a multi-core processor may include or otherwise be associated with logic 119 to enable secure enclave techniques, in accordance with at least one embodiment. The logic may include circuits, software (embodied in a tangible medium) or both to enable more efficient resource allocation among a plurality of cores or processors than in some prior art implementations.

Figure 2:
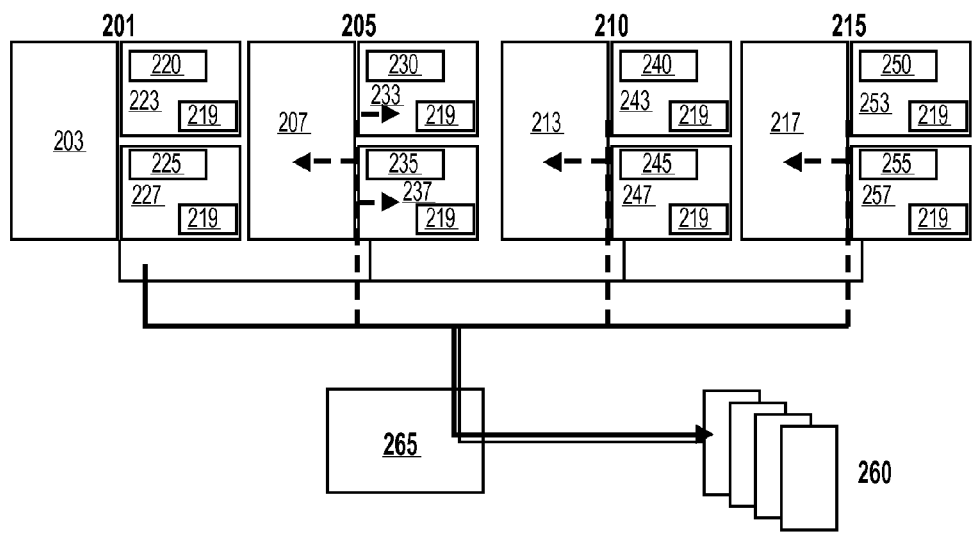
FIG. 2 illustrates a block diagram of a shared bus computer system, in which at least one embodiment of the invention may be used.

FIG. 2, for example, illustrates a front-side-bus (FSB) computer system in which one embodiment of the invention may be used. Any processor 201, 205, 210, or 215 may access information from any local level one (L1) cache memory 220, 225, 230, 235, 240, 245, 250, 255 within or otherwise associated with one of the processor cores 223, 227, 233, 237, 243, 247, 253, 257. Furthermore, any processor 201, 205, 210, or 215 may access information from any one of the shared level two (L2) caches 203, 207, 213, 217 or from system memory 260 via chipset 265. One or more of the processors in FIG. 2 may include or otherwise be associated with logic 219 to enable secure enclave techniques, in accordance with at least one embodiment.

In addition to the FSB computer system illustrated in FIG. 2, other system configurations may be used in conjunction with various embodiments of the invention, including point-to-point (P2P) interconnect systems and ring interconnect systems. The P2P system of FIG. 3, for example, may include several processors, of which only two, processors 370, 380 are shown by example. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. One or more of the processors or cores in FIG. 3 may include or otherwise be associated with logic 319 to enable secure enclave techniques, in accordance with at least one embodiment.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention may, therefore, be determined with reference to the appended claims, along with the full scope of equivalents to which such claims are entitled.

Secure Enclaves is a set of instructions that provides a safe place for an application to execute code and store data inside in the context of an OS process. An application that executes in this environment is called an enclave. Enclaves are executed from the Enclave Page Cache (EPC). The enclave pages are loaded into EPC by an OS. Whenever a page of an enclave is removed from the EPC, cryptographic protections are used to protect the confidentiality of the enclave and to detect tampering when the enclave is loaded back into the EPC. Inside the EPC, enclave data is protected using access control mechanisms provided by the processor. Table 2-1 below provides a complete list of the non privileged enclave instructions.

TABLE 2-1

Non Privileged Instruction List

| Category | Operations | Description |
| --- | --- | --- |
| Application Support | EENTER, EEXIT, EACCEPT, ERDTCSPTR, EIRET | Used to enter/exit the enclave, accept memory management requests and provide thread specific information. |
| Provisioning | EREPORT, EGETKEY, EMKPERMIT, ERDMR | Used to provide evidence about an enclave. This evidence can be used to demonstrate to a $3^{rd}$ party that an enclave is running on an Intel processor and the initial enclave contents. |

These instructions will only execute in ring 3. All other times they will generate a #UD fault. Table 2-2 provides the list of privileged instructions.

TABLE 2-2

Privileged Instruction List

| Category | Operations | Description |
| --- | --- | --- |
| Enclave Construction | ECREATE, EADDPRE, EADDPOST, EINIT | Used to build and enable the enclave. |
| Application Support | EMODIFY, EREMOVE | Used to dynamically manipulated enclave page attributes. |
| Hardware Management | ELPG, EWBINVPG, EADDSMAP, EUPSMAP | Used to manage the enclave page cache. |
| Debugging | EDBGRD, EDBGWR | Used to read and write the contents of a debug enclave. |
| Virtualization Support | ERDINFO | Used to read information about EPC entries. |

Enclave Page Cache (EPC) is where enclave code is executed and protected enclave data is accessed. The EPC is located within the physical address space of a platform but can be accessed only using SE instructions. The EPC may contain pages from many different enclaves and provides access control mechanism to protect the integrity and confidentiality of the pages. The page cache maintains a coherency protocol similar to the one used for coherent physical memory in the platform.

The EPC can be instantiated in several ways. It could be constructed of dedicated SRAM on the processor package. The preferred implementation mechanism is known as Crypto Memory Aperture. This mechanism allows the EPC to be large. More details of CMA are in the section below.

The Enclave Page Cache Map (EPCM) contains the state information associated with each page in the EPC. This state provides the information such as the enclave that the page belongs to, the state of a loaded page, etc. When a page is removed from the EPC, the state information is exported as well and is protected using cryptographic means. When an enclave page is re-loaded into the EPC, the state information is verified.

Figure 4:
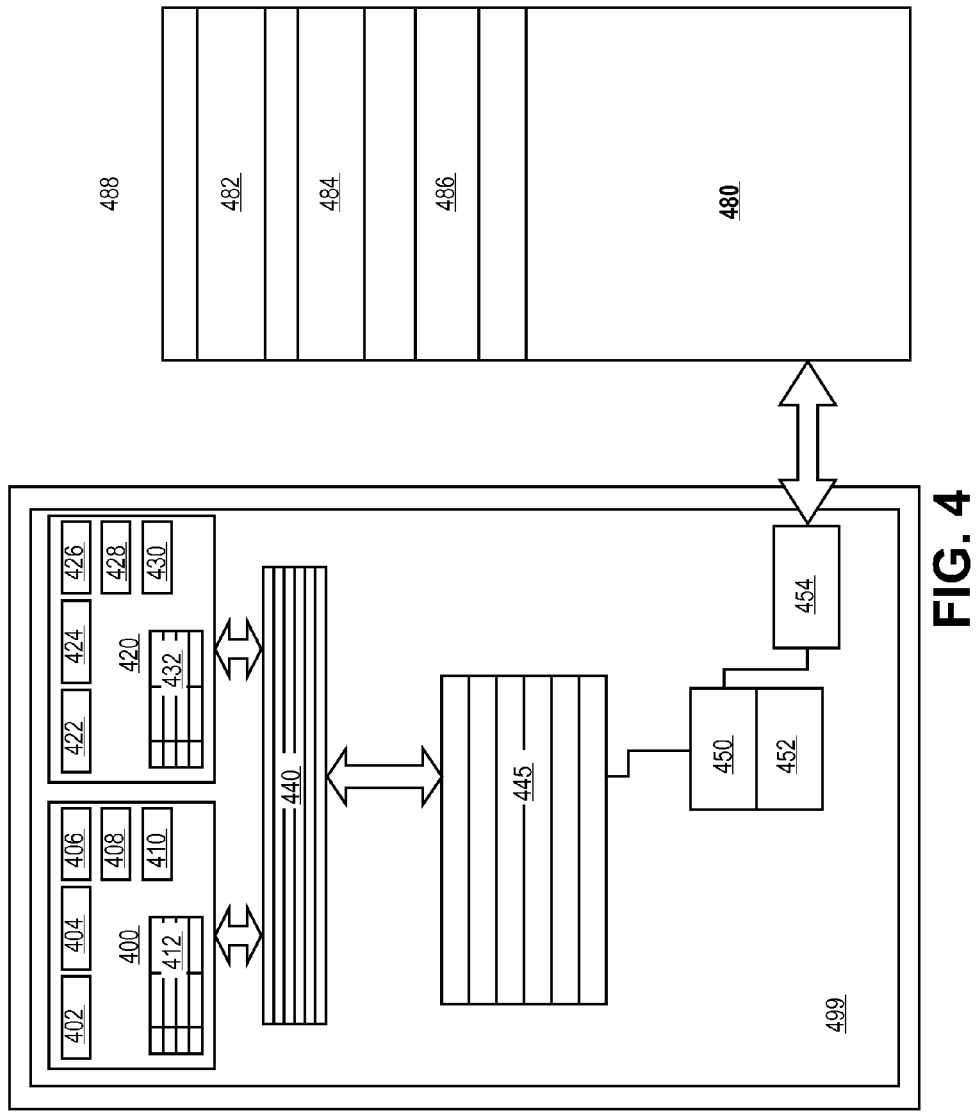
FIG. 4 illustrates a block diagram of a multi-core microprocessor, in which at least one embodiment of the invention may be used.

FIG. 4 illustrates a block diagram of a multi-core microprocessor 499, in which at least one embodiment of the invention may be used. The microprocessor 499 can contain multiple cores 400, 420. One core 400 contains a CR3 402, SMBR 404, page-miss handler 408, PMHE 410, and a translation lookaside buffer 412. One core 420 contains a CR3 422, SMBR 424, page-miss handler 428, PMHE 430, and a translation lookaside Buffer 432. The microprocessor 499, in some embodiments of the invention, contains a level-1 cache 440 shared between core 400 and core 420. The level-1 cache 440 can transfer data to and from the last level cache 445. The home agent 450 can connect to the last level cache 445 and attach to the crypto engine 452. The home agent 450 can assess the physical address space 488 of the crypto memory aperture 480 through the memory controller 454. The crypto memory aperture 480 contains an enclave page cache 482, enclave page cache map 484, backing store 486, as part of the physical address space 488.

CMA is a mechanism which provides support for instantiating the EPC, EPCM, and other SE related structures. The aperture is a region of the physical address space which is reserved for this use.

The EPC and EPCM (as well as other implementation data structures) are mapped to a location inside the aperture. The backing store is the actual data for these resources. When a memory request for the EPC is generated CMA remaps to the backing store location containing the encrypted EPC data and retrieves the data.

In general most of SE is implemented in microcode or extended microcode. There is hardware support required in several places including CMA, logic controlling data movement outside the package, and in the cores.

Figure 5:
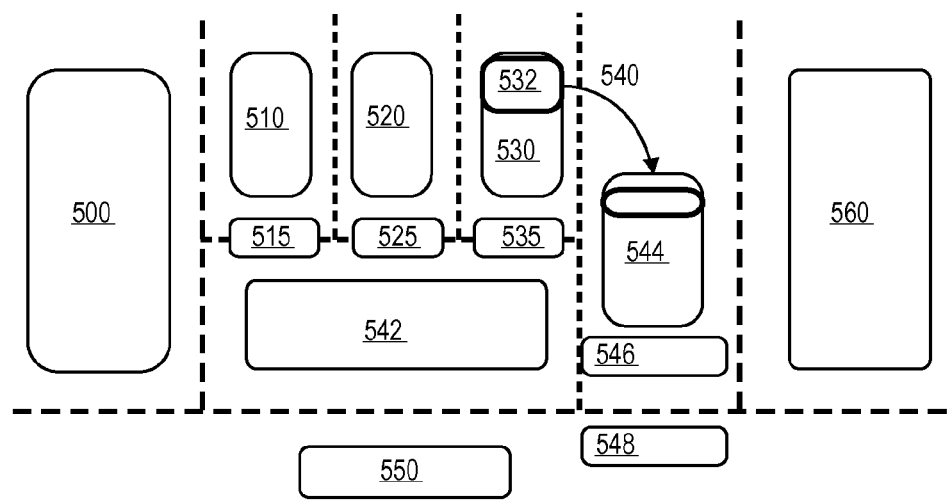
FIG. 5 illustrates a possible implementation of a secure enclave (SE) in one embodiment of the invention.

FIG. 5 illustrates a possible implementation of a secure enclave in one embodiment of the invention. The operating system and VMM 542 can use the ELPG instruction 540 to load an enclave page in the enclave 532 into an enclave page cache 544. When the microprocessor is not executing inside an enclave 532, the enclave page cache 544 is protected from the from software access by the SERR register 548, When executing inside the enclave the microcode page tables provide protection 546. Each VM has an associated VMCS. VM 510 is connected to VMCS 515. VM 520 is connected to VMCS 525. VM 530 is connected to VMCS 535. The SMM 500 can be in a separate container and the processor states can be in a separate container.

FIG. 5 is the high level overview of one embodiment of a Secure Enclave implementation. In this implementation the EPC is kept as a separate container managed by the microcode. The container is not accessible when execution is not inside the enclave. When the enclave is entered, control is transferred to the enclave code inside the EPC which is contained in a separate container.

Any page faults or exceptions which occur while executing inside of the enclave are reflected by the microcode to the responsible OS or VMM. When the machine is not executing inside an enclave, access control to the EPC is provided by the SE range register (SERR). When the machine is running inside the microcode provides page table level protections which prevent access to other EPC entries not belonging to the executing enclave.

One option to implement secure enclaves is to implement the instructions and the protections using the microcode capability in some processors. This capability may meet the security requirements that secure enclaves requires to meet its goals.

The SERR register as shown in FIG. 2-2 is implemented in the Page Miss Handler PMH. The register may be enabled and disabled independently for each logic processor.

One option in the implementation to improve performance is to provide a bit or a few bits to indicate entries in the Translation Lookaside Buffer (TLB) are for an enclave or a particular enclave. If these bits are not provided a TLB flush will be needed when exiting the enclave to prevent other code from accessing the enclave.

The enclave bit is compared to the enclave mode bit. Extra bits would provide an enclave space id functionality. A particular enclave would be assigned an id. The id would be compared with the id of the executing enclave as part of the address check. TLB support is an optional performance enhancement. When an entry may be invalidated in the TLB due to the removal of EPC data, a special microcoded shootdown mechanism is needed. In one embodiment microcode may contact all other cores in the enclave trust boundary and verify the entry is no longer in any TLB. Other embodiments may provide a means for microcode to be assured that other processors have invalidated the TLB entries.

To prevent DMA snoops and invalidates to the EPC a special SAD and/or TAD entry is provided. These dedicated registers provide the protection of the EPC. This is set to the same values as the SERR.

In order to ensure secure keys for each enclave Secure Enclave microcode may use secure access to random numbers in one embodiment.

An enclave may be protected against tampering. The details of the mechanism used for tampering protection vary by implementation. When an enclave is tampered it will prevent further execution on the thread which detected the tampering. In order for users to understand the state of an enclave there is an attestation mechanism put into place to provide proof of the enclave build. This includes the EREPORT instruction used to present information on the enclave contents.

In order to simplify the microcode code required in the enclave design the concept of architectural enclaves was developed. These enclaves are given special access privileges based on the original of the code for the enclave.

The enclave state across power cycles is dependent on software policy. Data inside the CMA is lost on power down. Software may ensure that the enclave data is not lost on a power cycle if it would like to preserve the enclave. Data resident in the EPC may be flushed to memory if software wishes to keep enclaves alive across S3 power states. Software could elect to require that applications tear down all enclaves when power is removed.

An enclave is protected differently depending on its location. Data external to the CPU package is protected using encryption and integrity checking. For code and data in the enclave page cache, pages are protected using access control mechanisms.

Figure 6:
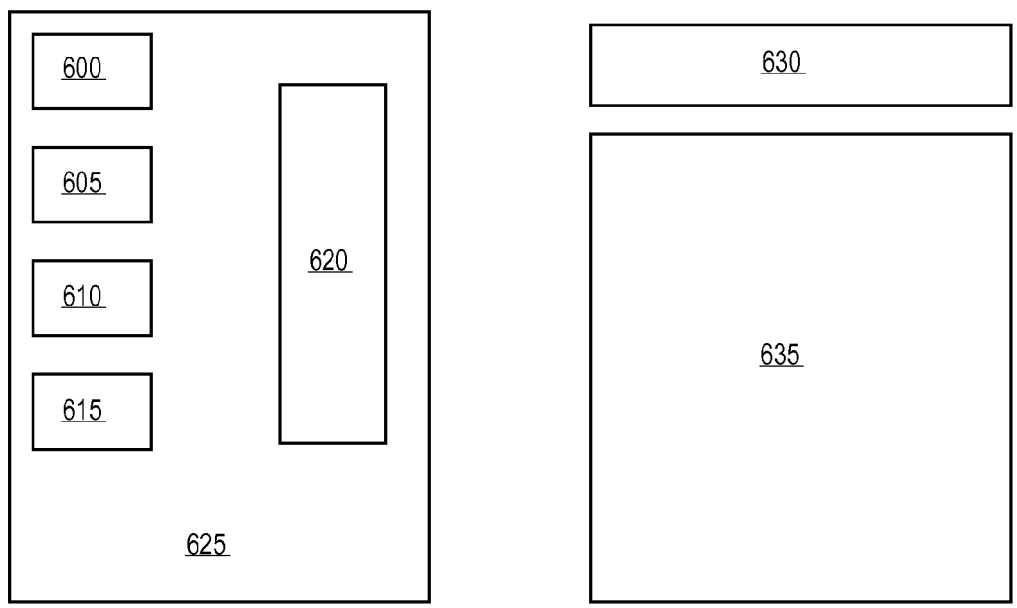
FIG. 6 illustrates a block diagram of a microprocessor, in which at least one embodiment of the invention may be used.

FIG. 6 illustrates a block diagram of a microprocessor, in which at least one embodiment of the invention may be used. FIG. 6 illustrates microprocessor 600 having multiple processor cores 600, 605, 610, 615 and a cache 620. The enclave data 635 can be encrypted. The crypto memory aperture data 630 is used to protect the enclave data 635.

Enclave pages residing in system memory are protected using encryption and integrity. During the load of the page into the EPC, the page is copied into the EPC, decrypted and page's integrity is checked. FIG. 6 shows this portion of the data.

When an enclave page residing inside the EPC is stored to system memory, it is encrypted with the enclave key. Authentication information is also stored at the time of the page store. Enclave data inside the EPC is unencrypted and protected by access control mechanisms. The processor protects this data so that only the enclave which owns that data can access it.

Figure 7:
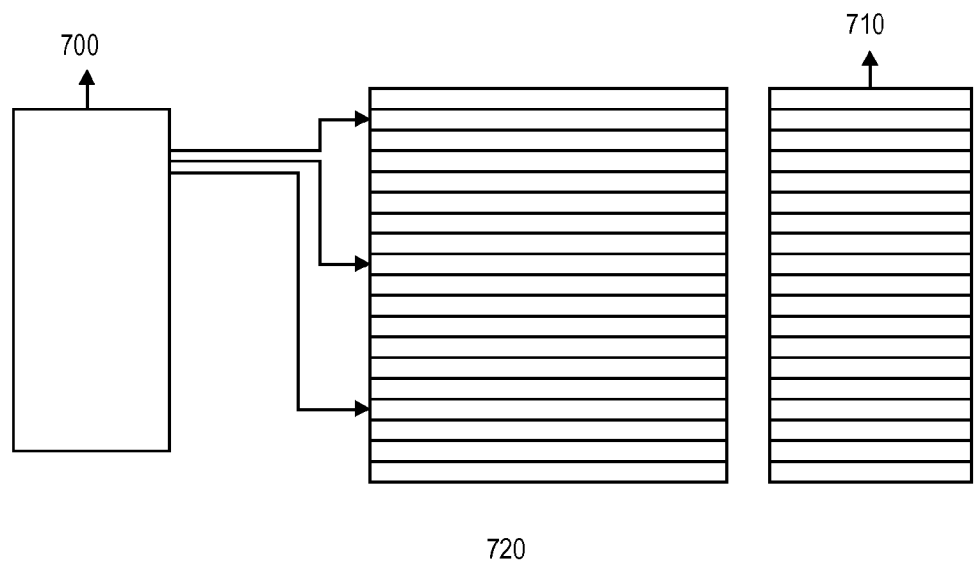
FIG. 7 illustrates an example of a control structure for accessing a portion of the enclave page cache that can be implemented in one embodiment of the invention.

When enclave pages residing in the EPC is evicted from the cache to main memory outside the CPU package, it is protected by CMA encryption. The CMA will encrypt the data to provide data confidentiality. The integrity of the EPC is provided by range registers that prevent reads and writes to the EPC FIG. 7 illustrates an example of a control structure for accessing a portion of the enclave page cache that can be implemented in one embodiment of the invention. Each page of the enclave page cache 720 can have corresponding metadata in the enclave page cache map 710. The metadata is shown in FIG. 7 secure enclave containing a set of linear addresses 700 can access data stored in the enclave page cache 720 when the linear address matches the linear address stored in the enclave page cache map 710.

FIG. 7 shows the layout and usage of the EPC and EPCM. The EPC is split into 4 k pages. Each enclave may have some number of pages resident in the EPC. There is an entry in the EPCM for each page of the EPC which provide meta information needed to ensure security. The details of the EPCM are implementation specific.

When an application desires to load an enclave it will call a system routine in the OS. The OS will attempt to allocate some pages in the EPC. If there is no open spot then the OS will select a victim enclave to remove. The OS will evict the pages of the victim enclave using the EWBINVPG instruction for each page. When the OS has completed the eviction, it will add the secure enclaves control structure (SECS) to the enclave using the ECREATE command. After the SECS is created, the OS will add pages to the enclave as requested by the application using the EADDPRE instruction.

To add data pages to the enclave, the OS may first add SMAP pages to the enclave using the EADDSMAP instruction. Depending on the size and layout of the enclave the OS will add several SMAP pages. When all of the enclave pages are added to the enclave the OS will execute the EINIT instruction to enable the enclave to be executed. A parameter to the EINIT instruction is a permit which demonstrates that the enclave is licensed to run on that machine. When an application is loaded a permit needs to be created. After EINIT successfully completes, the application can execute the EENTER instruction to enter the enclave.

When an enclave is built and marked for execution the application may need to add or subtract physical memory inside the enclave. To support this there are instructions which allow additional memory to be added to the enclave. To add memory to the enclave, the memory is allocated to the correct linear address inside the enclave. The OS copies this memory page into the EPC indicating the linear address. The EADDPOST instruction is run to add this memory to the enclave enclave. If the SMAP node is not resident inside the EPC it may be loadedfirst.

After the memory is copied the enclave software may accept the page before it can be accessed inside. The enclave accepts the data by executing the EACCEPT instruction. This instruction can only be executed by the software inside the enclave.

In some cases the software may want to modify the properties of the enclave memory. In order to do the change the SMAP may be updated. For instance the software may want to create another thread entry point, TCS inside the enclave. In this case the enclave requests that the OS change the SMAP properties of the page using the EMODIFY instruction. After the properties are changed, the enclave software executes the EACCEPT instruction to allow the page to be used.

Memory pages can be removed from the enclave. When the enclave is ready to remove a page, it sends a request to the OS. The OS will execute the EREMOVE instruction which will remove the page from the SMAP. The EREMOVE instruction also invalidates the EPC entry.

To ensure the integrity of the enclave environment a number of access checks may be done. Among the various security properties enforced is that data is correctly located in the EPC to prevent data from leaking across enclaves and the referencing address is not corrupted to assure that code is not moved to a different linear address in the enclave.

The access protection requirements can be implemented using a ranger register and microcode managed shadow page tables. In another embodiment, to avoid the overhead of shadow page tables, the page miss handler hardware can be modified to perform the same access control requirements.

The EPC is accessible to the logical processor (LP) only if the LP is either executing in microcode extension mode, or if the LP is executing inside an enclave and the linear address being accessed belongs to the linear address range covered by that enclave. In other words, only microcode extension accesses or enclave accesses are allowed to go to the EPC range. Any other accesses to the EPC range are considered illegal.

An enclave access may be resolved to a physical address belonging to the EPC. If the access falls outside the EPC but the linear address indicates the address is inside the enclave then the access may be stopped. A fault to the OS or the instruction is reported.

The access to an address in the enclave may be located inside the EPC for the access to succeed. The check that the entry is present in the EPC is usually done by checking the EPCM to verify the valid bit. Each EPC page is dedicated to a particular enclave. References to that EPC entry can only be made by the enclave who owns the EPC page. This is checked by validating the referenced page matches the SECS of the executing enclave.

Each EPC page represents a particular linear address page for the enclave. The requested linear address may match the linear address of the page in the EPC. For instance the EPCM entry stores the linear address for which an enclave page was brought into the EPC. When an enclave access resolves to an EPC page, the linear address for which the page was brought in may match the linear address of the current request.

The linear address mapping of an enclave cannot be corrupted. If the page tables of the linear address are corrupted the resulting access is illegal. This prevents an attacker from moving code and data around inside the enclave.

When the OS/VMM adds a page to an enclave after it has been initialized, the EADDPOST instruction sets the "pending" bit in the EPCM for that page. The pending bit survives subsequent EPC write-backs and evictions (using SEC_INFO). The enclave may issue EACCEPT to clear the pending bit. If an enclave access resolves to an EPC page for which the pending bit is set, the LP issues EF_PENDING fault to the OS/VMM.

When the OS/VMM loads a replay-protected enclave page to the EPC, it sets the FCR (Freshness Check Required) bit in the EPCM entry for that page. The OS/VMM can clear this bit by executing EUPSMAP instruction on that EPC page to clear this bit. An enclave access is allowed to continue only if the FCR bit on that page is not set. Otherwise, the LP delivers EF_FRESH_CHK fault to the OS/VMM.

Each EPCM entry contains a "dirty" bit which indicates whether an enclave is allowed to write to that page. An enclave is allowed to write to an enclave page only if the dirty bit for that page in the EPCM is set. If such is not the case, the LP issues EF_EWRITE to the OS/VMM. The OS/VMM can set the dirty bit by executing the EUPSMAP instruction on that page Any time a logical processor is executing inside an enclave, that enclave's SECS pages may be present in the EPC. However, the SE security model requires that an enclave may not be allowed to make any direct memory accesses to its own SECS (otherwise the enclave will be able to read its own enclave key, completely compromising the security). If an enclave access resolves to an EPC page that holds the SECS for that enclave, the OS/VMM is notified via EF_ATTRIB_SECS fault. An enclave is not allowed to modify any pages that have a TCS attribute set. If an enclave attempts to modify a TCS loaded into the EPC, the OS/VMM is notified via EF_ATTRIB_TCS fault.

In the Size field of the tables below, the following values and indicators are used:

4 4-byte field in both 32- and 64-bit modes 8 8-byte field in both 32- and 64-bit modes 8(4) 8-byte field in both modes. Upper 4 bytes ignored in 32-bit mode.

Note: Some fields have names beginning with a lower case "o" (e.g. oLSP). These fields are pointers, but are represented in the enclave as offsets relative to the base of the enclave. This representation ensures that the measurement of enclave pages is independent of the location at which the enclave is created.

Note: Fields are not described in any particular order (yet). Some fields may be moved to different memory pages within their respective data structures to allow, for example, for different means of protection.

TABLE 4-1

Secure Enclave Control Structure Contents

| Name of Offset | Size (bytes) | Brief Description | How Initialized |
|---|---|---|---|
| SIZE | 8 | Size of enclave | Software |
| BaseAddr | 8 | Enclave Base Linear Address | Software |
| Mask | 8 | Enclave Mask that determines the enclave range | Microcode |
| FLAGS | 8 | Boolean indicates EENIT executed Enc Code Present, Enc Data Present, Pre-production, | Software (Debug flag) and Microcode |
| MR_EADD | 32 | Measurement Register of extended with EADDs from pre-EINIT | Microcode |
| MR_POLICY | 32 | Measurement Register extended with the public key that signed the credential used to generate the enclave's permit, if one was used. | Microcode |
| MR_RESERVE1 | 32 | Reserved Measurement Register | Microcode |
| MR_RESERVE2 | 32 | Reserved Measurement Register | Microcode |
| ENCLAVE_KEY | 16 | Key of the enclave | Microcode |
| Reserved | 16 | MBZ | |
| ISV_SEC_VERSION | 4 | Security version of the enclave | Microcode |
| PERMIT_SEC_VERSION | 4 | Security version of Permit creator | Microcode |
| Reserved | 1824 | MBZ | |
| VERSION | 128 * 16 | | |

Associated with each thread is a Thread Control Structure (TCS). The TCS contains:

TABLE 4-2

TCS Layout
Thread Control Structure

| Name of Offset | Size (bytes) | Brief Description | How Initialized |
|---|---|---|---|
| STATE | 4 | Indicates the current State of the thread. | Software initializes to Inactive. |
| oSSA | 8 | Offset of State Save Area, Offset relative to the enclave base. Pointer to save state stack. | Software ensures memory region is allocated, committed and EADDed. |

TABLE 4-2-continued

TCS Layout
Thread Control Structure

| Name of Offset | Size (bytes) | Brief Description | How Initialized |
|---|---|---|---|
| | | | Software initializes INT offset to zero. |
| NSSA | 4 | Number of SSA slots | Software initializes. |
| CSSA | 4 | Current SSA slot | Software sets to zero. |
| IRR | 8(4) | Interrupt Return Routine | Software initializes to trampoline in uRTS. This field is not measured when the TCS is EADDPREd |
| oEntry | 8 | Offset in enclave to which control is transferred on EENTER if enclave INACTIVE state | Software |
| oHandler | 8 | Offset in enclave to which control is transferred if enclave is in EXCEPTED state. | Software |
| SAVE_DR7 | 8 | Location into which h/w DR7 is saved on EENTER if enclave is NOT in Debug Mode and reloaded on enclave exit (EEXIT or interrupt) | Software sets to zero |
| SAVE_DEBUGCTL | 4 | Location into which h/w IA32_DEBUGCTL MSR is saved on EENTER if enclave is NOT in Debug Mode and reloaded on enclave exit (EEXIT or interrupt) | Software sets to zero |
| TF | 1 | Trap flag value loaded into RFLAGS.TF on EENTER. | Software sets to zero |
| SAVE_TF | 1 | Location into which RFLAGS.TF is saved on EENTER and from which it is restored on EEXIT. | Software sets to zero. |

The thread state can have one of 5 values:

| State | Meaning |
|---|---|
| INACTIVE | The TCS is available for an Normal EENTER |
| ACTIVE | A processor is currently executing in the context of this TCS. |
| INTERRUPTED | An interrupt (vector >= 32) occurred while a processor was executing in the context of this TCS. Execution state has been pushed onto an SSA frame and the enclave has been exited. Nothing is executing in the context of this TCS. EENTER/RETURN_FROM_INTERRUPT will resume the thread at the interrupted location. EENTER/NORMAL is illegal. |
| HANDLING | The TCS::Handler (exception handler entry) has been EENTERed in the context of this TCS. |
| HANDLED | The TCS::Handler has EEXITted and the TCS may be re-entered only by using EENTER/RETURN_FROM_INTERRUPT. |

State Save Area Offset (oSSA)

The State Save Area Offset (oSSA) points to a stack of state save frames used to save the processor state on an interrupt or exception that occurs while executing in the enclave. Next State Save Area (NSSA) is used by the interrupt microcode to determine where to save the processor state on an interrupt or exception that occurs while executing in the enclave. It is an index into the array of frames addressed by oSSA. Count of Save Areas (CSSA) specify the number of SSA frames available for this TCS. When an interrupt or exception occurs and there are no more SSA frames available (NSSA>=CSSA), the interrupt or exception will still occur and the processor state will be cleared, but the TCS will be marked as INVALID.

Figure 3:
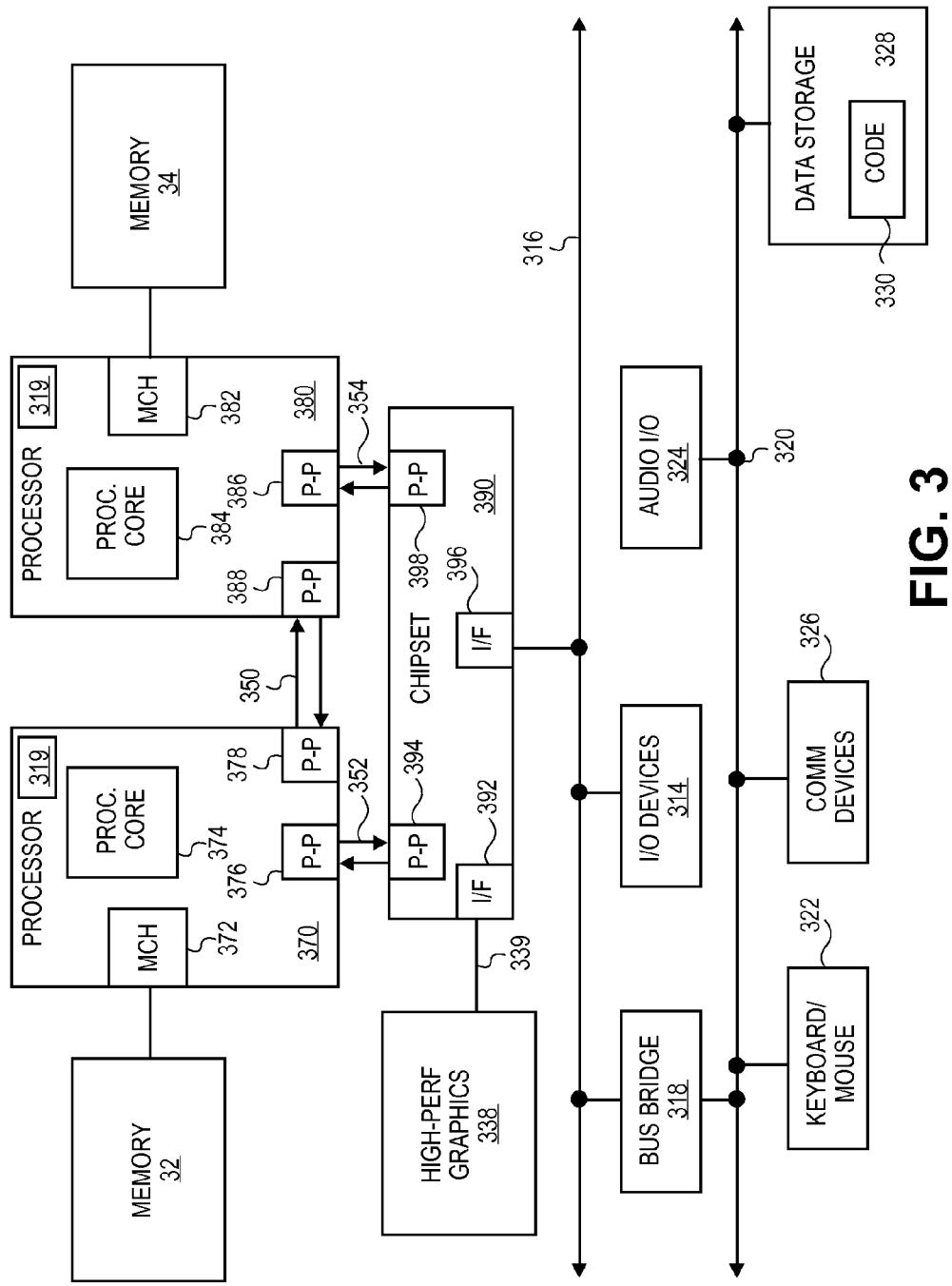
FIG. 3 illustrates a block diagram a point-to-point interconnect computer system, in which at least one embodiment of the invention may be used.

On an interrupt occurring while running in an enclave, the machine state will be saved in the TCS::SSA (State Save Area). This area includes:

FIG. 4-3. Interrupt Save Area

State Save Area

| Name | Description |
|---|---|
| STATE | Value of TCS::STATE just before interrupt |
| RFLAGS | Flag register |
| RAX . . . R15 | 16 general registers |
| RIP | Instruction Pointer |
| XSAVE | XSAVE-compatible X87 FPU, MMX, SSE, SSE2, extensible area |

The TCS::SSA may not be paged out at the time an interrupt occurs. EENTER checks that SSA is inside the EPC and caches the physical address. In the event that the page is evicted, the processor executing the EWBINVPG will force an enclave exit on the processor currently executing the thread using the SSA and report a page fault to it.

Figure 8:
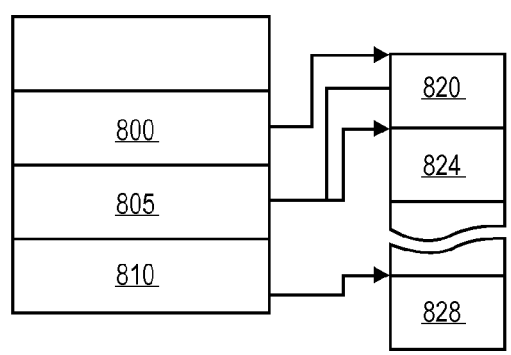
FIG. 8 illustrates an example of a thread control structure in one embodiment of the invention, showing how the data structures are stitched together.

FIG. 8 shows how all of the data structures are stitched together. To avoid clutter, not all per-thread structures are shown for all threads. The Untrusted Stacks and their associated pointers are also omitted. FIG. 8 illustrates an example of a thread control structure in one embodiment of the invention, showing how the save state areas are stitched together. The state save area pointer 800 points to save area 0 820. The current state save area 805 points to save area 1 824. The next state save area 810 points to the next save area 828. The number of save state areas provides a reference of the number of save state areas available.

Page Information (PAGE_INFO) is an architectural data structure that is used as parameter to the EPC-management instructions.

TABLE 4-3

PAGE_INFO Structure
Page Information

| Name of Offset | Size (bytes) | Brief Description |
|---|---|---|
| LIN_ADDR | 8 | Enclave linear address |
| SOURCE_PAGE | 8 | Linear address of the page where page contents are located |
| SEC_INFO | 8 | Linear address of the secinfo structure for the page |
| SECS | 8 | Linear address of EPC slot that currently contains a copy of the SECS |

The SEC_INFO flags and EPC flags contain bits indicating the type of page. PAGE_TYPE Flags

| Name of Flag | Value | Brief Description |
|---|---|---|
| PT_SECS | 0 | Page is an SECS |
| PT_SMAP_LEVEL1 | 1 | Page is SMAP level 1 |
| PT_SMAP_LEVEL2 | 2 | Page is SMAP level 2 |
| PT_SMAP_LEVEL3 | 3 | Page is SMAP level 3 |

PAGE_TYPE Flags

| Name of Flag | Value | Brief Description |
|---|---|---|
| PT_TCS | 4 | Page is a TCS |
| PT_REG | 8 | Page is a normal page |
|  | All others | Reserved |

The SEC_INFO Flags are a set of bits describing the state of an enclave page.

TABLE 4-4

SEC_INFO Flags

| Bit Pos. | Content | |
|---|---|---|
| 0 | REPLAY PROTECTION | RP: Replay Protection. Bit value of 1 indicates that the page is replay protected. Bit value of zero indicates that the page is not replay protected. |
| 1 | CONFIDENTIALITY PROTECTION | CP: Confidentiality Protection. A bit value of 1 indicates that the contents of the page are encrypted, while a bit value of zero indicates that the contents of the page are not encrypted. |
| 2 | FORGERY PROTECTION | FP: Forgery Protection. Since forgery protection in SE architecture is mandatory, this bit may always be set to 1. |
| 3 | READ access | R: Bit value of 1 indicates that the page can be read from inside the enclave. Bit value of 0 indicates that the page cannot be read from inside the enclave. If the SECS flag is set (see below), the R flag may be set to 0 (SECS cannot be read from inside an enclave). |
| 4 | WRITE access | W: Bit value of 1 indicates that the page can be written from inside the enclave. Bit value of 0 indicates that the page cannot be written from inside the enclave. If the SECS, SMAP or TCS flag is set (see below), the W flag may be set to 0 (SECS and TCS cannot be read from inside an enclave). |
| 5 | Execute Access | X: Bit value of 1 indicates that the page can be executed from inside the enclave. Bit value of 0 indicates that the page cannot be executed from inside the enclave. If the SECS or TCS flag is set (see below), the X flag may be set to 0 (SECS and TCS cannot be executed from inside an enclave). |
| 9:6 | PAGE TYPE<br>0—SECS<br>1—SMAP_LEVEL_1<br>2—SMAP_LEVEL_2<br>3—SMAP_LEVEL_3 (RESERVED)<br>4—TCS<br>8—REG | SECS: Bit value of 0. R may be 0, W may be 0, X may be 0.<br>SMAP LEVEL 1: Bit value of 1. R may be 0, W may be 0, X may be 0.<br>SMAP LEVEL 2: Bit value of 2, R may be 0, W may be 0, X may be 0.<br>SMAP LEVEL 3: Bit value of 3, R may be 0, W may be 0, X may be 0.<br>TCS: Bit value of 4. R may be 1, W may be 0, and X may be 0.<br>REG: Bit value of 8. |
| 11:10 | EACCEPT_PAGE_TYPE<br>00—NONE | NONE: Page is a member of the enclave.<br>EMODIFIED: Page attributes have been |

TABLE 4-4-continued

SEC_INFO Flags

| Bit Pos. | Content | |
|---|---|---|
| | 01—EMODIFY | modified by the OS. |
| | 10—EADD | EADD: Page has been added by the OS. |
| 12 | A-REPLAY PROTECTION | Indicates whether Replay Protections will be applied once page is accepted inside the enclave |
| 13 | A-CONFIDENTIALITY PROTECTION | Indicates whether Confidentiality Protection will be applied once the page is accepted inside the enclave. |
| 14 | A-FORGERY PROTECTION | Indicates whether Forgery Protection will be applied once the page is accepted inside the enclave. |
| 15 | RESERVED | MBZ |
| 31:16 | RESERVED | MBZ |

Security Information (SEC_INFO) data structure holds cryptographic meta-data that is needed for forgery protection.

TABLE 4-5

SEC_INFO Structure
Security Information

| Name of Offset | Size (bytes) | Brief Description |
|---|---|---|
| MAC | 16 | Message-authentication code authenticating the contents of the page and the SEC_INFO flags |
| VERSION | 16 | Version (Page IV) |
| KEY_ID | 16 | Key identifier to be used to MAC/encrypt the page and the SEC_INFO flags |
| FLAGS | 8 | Flags describing the state of the enclave page |
| Reserved Flag | ??? | |
| Reserved | 8 | MBZ |

Certificate (CERT) is the certificate structure provided with Architectural Enclaves and passed to EMKPERMIT. This structure is 4096 byte and may be page-aligned.

TABLE 4-6

Certificate Structure

| Offset (Bytes) | Length (Bytes) | Name | Signed? | Description |
|---|---|---|---|---|
| 0 | 4 | Cert Version | No | Structure Version for this certificate |
| 4 | 4 | Header Size | No | Size of Header (unsigned portion of cert) |
| 8 | 4 | Body Size | No | Size of Body (signed portion) |
| 12 | 4 | Algorithm | No | Asymmetric Algorithm Used for signing 0x00000001: RSA |
| 16 | 4 | Key Size | No | Key Size in Bits |
| 20 | 4 | Pub Key Size | No | Size of the public Key in dwords |
| 24 | 4 | Exponent | No | Signing Key's Exponent |
| 28 | 36 | RESERVED | No | Reserved—MBZ |
| 64 | 256 | Pub Key | No | Signer's Public Key |
| 320 | 256 | Signature | No | Signature of Certificate |
| 576 | 32 | EADD Measurement | Yes | Expected MR.EADD vale at time of EINIT call. |
| 608 | 16 | Capability Mask | Yes | Set of Capabilities available to this enclave. |
| 612 | 4 | ISV_Sec_Version | Yes | ISV Assigned Security Version |
| 616 | 3480 | RESERVED | No | Reserved—MBZ |

Permit (PERMIT) outputted from EMKPERMIT and the Permit Enclave and consumed by EINIT. It is 4096 bytes and may be page-aligned.

| Offset (Bytes) | Length (Bytes) | Name | Description |
|---|---|---|---|
| 0 | 32 | EADD Measurement | Expected value of MR.EADD at time of EINIT call. |
| 32 | 32 | Pub_key_hash | Hash of key used to sign certificate. |
| 64 | 16 | Capabilities | Set of Capabilities available to this enclave. |
| 80 | 4 | ISV_Sec_Version | ISV Assigned Security Version |
| 84 | 4 | Permit_Sec_Version | Security Version of source of permit |
| 88 | 104 | RESERVED | Reserved—MBZ |
| 192 | 16 | KeyID | The value of the currentKeyID |
| 208 | 16 | RESERVED | Reserved for KeyID Expansion—MBZ |
| 224 | 16 | MAC | CMAC computation over the preceding fields |
| 240 | 16 | RESERVED | Reserved for MAC Expansion—MBZ |
| 256 | 3840 | RESERVED | RESERVED—MBZ |

The ERPORT structure is the output of the EREPORT instruction.

TABLE 4-7

Report Structure

| Offset (Bytes) | Length (Bytes) | Name | Description |
|---|---|---|---|
| 0 | 4 | Capabilities | The values of the capabilities flags for the enclave. |
| 4 | 1 | Flags | A bit field which represents certain state of the enclave or the report instruction |
| 5 | 1 | RegSelect | A bit field to indicate those measurement registers included beyond UserData |
| 6 | 10 | RESERVED | Set to Zero |
| 16 | 16 | Sec Version | The security version of the TCB |
| 32 | 32 | UserData | The value of the UserData provided by the EREPORT caller. |
| 64 | 32 | MR_EADD | The value of the SECS->MR_EADD |
| 96 | 32 | MR_POLICY | The value of the SECS->MR_POLICY |
| 128 | 32 | RESERVED | Set to Zero |
| 160 | 32 | RESERVED | Set to Zero |
| 176 | 16 | KeyID | The value of reportKeyID for the package on which EREPORT was executed. |
| 192 | 16 | MAC | The output of performing a CMAC across the previous fields in this structure |

Measurements (MEASUREMENTS) is the output parameter of the ERDMR instruction. It contains the Measurement Register values of an enclave, taken from a specified SECS.

TABLE 4-8

Measurements Structure

| Offset (Bytes) | Length (Bytes) | Name | Description |
|---|---|---|---|
| 0 | 32 | MR_EADD | The value of the SECS->MR_EADD |
| 32 | 32 | MR_POLICY | The value of the SECS->MR_POLICY |
| 64 | 32 | RESERVED | Set to Zero |
| 96 | 32 | RESERVED | Set to Zero |

Key Request (KEY_REQUEST) is an input parameter to the EGETKEY instruction. It is used for selecting the appropriate key and any additional parameters required in the derivation of that key.

TABLE 4-9

Key Request Structure

| Offset (Byte) | Size (Bytes) | Name | Description |
|---|---|---|---|
| 0x00 | 0x02 | KeySelect | Identifies the Key Required |
| 0x02 | 0x02 | KeyPolicy | Identifies which inputs are required to be used in the key derivation |
| 0x04 | 0x04 | RESERVED | RESERVED |
| 0x08 | 0x08 | Randomness_la | Provides a pointer to a 256 bit data block - may be naturally aligned |
| 0x16 | 0x16 | SecVersion | Identifies which Security Version may be used in the key derivation |

TABLE 4-10

Request Key Request Structure

| Bits | Name | Description |
|---|---|---|
| 15:12 | RESERVED | MAY BE ZERO |
| 11:00 | KeyName | Numerical value identifies the key required. 0x0000—Out-of-Box ISV Experience Key 0x0001—Provisioning DID 0x0002—Provisioning Key 0x0003—Permit Key 0x0004—Report Key 0x0005—Seal Key 0x0006: 0x07FF—RESERVED |

TABLE 4-11

Key Request Policy Structure

| Bit | Name | Description |
|---|---|---|
| 15:02 | RESERVED | Reserved. May be Zero |
| 01 | MR_POLICY | Derive key using the enclave's POLICY measurement register |
| 00 | MR_EADD | Derive key using the enclave's EADD measurement register |

This structure is used by key derivations to generate keys based on the security versions of the enclave and the enclave's SE TCB. See the Platform TCB Recovery Specification for more details on the TCB Security Version structure.

TABLE 4-12

Security Version

| Offset (Byte) | Size (Bytes) | Name | Description |
|---|---|---|---|
| 0x00 | 0x08 | TCB Sec Version | Security Version structure describing the Security Version of recoverable TCB layers implemented below the SE Instruction implementation. |
| 0x08 | 0x04 | Permit Enclave | Security Version of Permit Enclave which generated the permit for the enclave. |
| 0x12 | 0x04 | ISV | ISV Assigned Security Version for the Enclave. |

TABLE 4-13

Package Manufacturing Registers

| NAME | SIZE (bits) | Description |
|---|---|---|
| FUSE_KEY | 128 | A package unique key which roots the in-band key hierarchy |
| MKPERMIT_ROOT_HASH_KEY | 256 | Hash of the public key used to authenticate the licenses of architectural enclaves |
| OOB_GLOBAL_KEY | 128 | A global key used to provide an OOB experience. |

TABLE 4-14

Package Registers

| NAME | SIZE (bits) | Description |
|---|---|---|
| OWNER_EPOCH | 256 | Platform owner provided entropy used in the key hierarchy derivation |
| EPC_BASE | 36 | |
| EPC_MASK | 36 | |
| EPCM_BASE_OFFSET | 16 | |
| EPC_SECS_BASE_OFFSET | 16 | |

TABLE 4-15

Logical Processor

| NAME | SIZE (bits) | Description |
|---|---|---|
| ENCLAVE_MODE | 1 | Indicates whether the processor is currently executing in enclave mode |
| SECS_PHYSICAL_ADDRESS | 16 | The slot id that contains the SECS for the currently executing enclave |
| TCS_LINEAR_ADDRESS | 64 | The linear address of the TCS that was used to enter the enclave |
| TCS_PHYSICAL_OFFSET | 16 | The platform physical address of the TCS that was used to enter the enclave |
| SSA_PHYSICAL_OFFSET | 16 | The platform physical address of the SSA that may be used in the event the enclave exits due to an interrupt, fault, or exception. |

The EPCM Flags are a set of bits describing the state of an enclave page.

TABLE 4-16

EPCM Flags

| Name of Bit | Brief Description |
|---|---|
| P | Present |
| D | Dirty |
| FCR | Freshness Check Required |
| CP | Confidentiality Protected |
| FP | Forgery Protected |
| RP | Replay Protected |
| R | Readable |
| W | Writeable |
| X | Executable |
| PND | Page is pending, waiting for EACCEPT |
| DB | Debug |
| M | Flags changed by EMODIFY |

Enclave Page Cache Map (EPCM) is a secure structure used by the processor to track the contents of the page cache. The EPCM holds exactly one entry for each page that is currently loaded into the EPC.

TABLE 4-17

EPCM Map
Enclave Page Cache Map

| Name of Offset | Size (bytes) | Brief Description |
|---|---|---|
| FLAGS | 2 | Flags describing the state of the enclave page |
| SECS_SID | 2 | SECS slot ED |
| OFFSET | 4 | Offset of page relative to base linear address of enclave. |

Attestation is the process of demonstrating that a piece of software has been established on the platform especially to a remote entity. In the case of secure enclaves it is the mechanism by which a remote platform establishes that software is running on an authentic platform protected within an enclave prior to trusting that software with secrets and protected data. The process of attestation has three phases, Measurement, Storage and Reporting.

There are two periods of measurement inside an enclave pre-enclave establishment and post-enclave establishment. It is the responsibility of the enclave instructions to provide measurements of the enclave as it is established. Once the enclave has been established the software inside the enclave becomes responsible for measurement.

Figure 9:
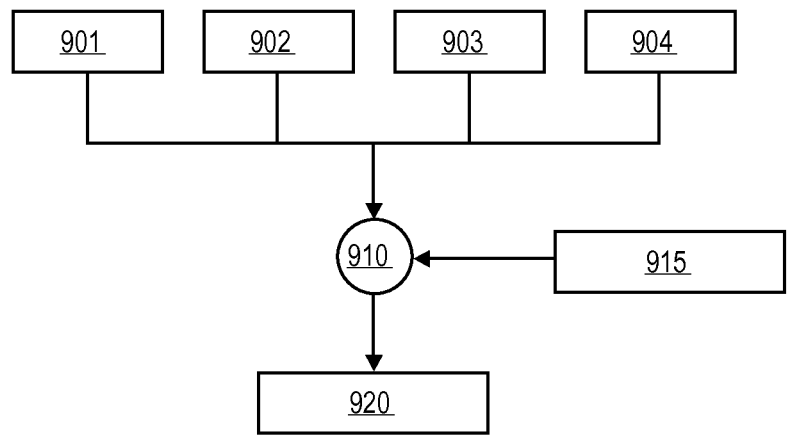
FIG. 9 illustrates one step of the process of software attestation known as quoting, which can be found in one embodiment of the invention.

FIG. 9 illustrates one step of the process of software attestation known as quoting, which can be found in one embodiment of the invention. In one embodiment, the sign operation 910 applies a signing key 915 to the concatenated data from measurement registers 901, 902, 903, 904. The result of the sign operation 910 is the quote 920.

The act of reporting cryptographically binds measurements made when creating the enclave to the platform. This mechanism is often referred to as Quoting as this type of functionality has been available on the platform for sometime as a TPM command. The values of the Measurement Registers (MR) are concatenated and then signed using an asymmetric key. Any challenger simply then has to verify the signature over the quote structure in order to validate the quote.

Figure 10:
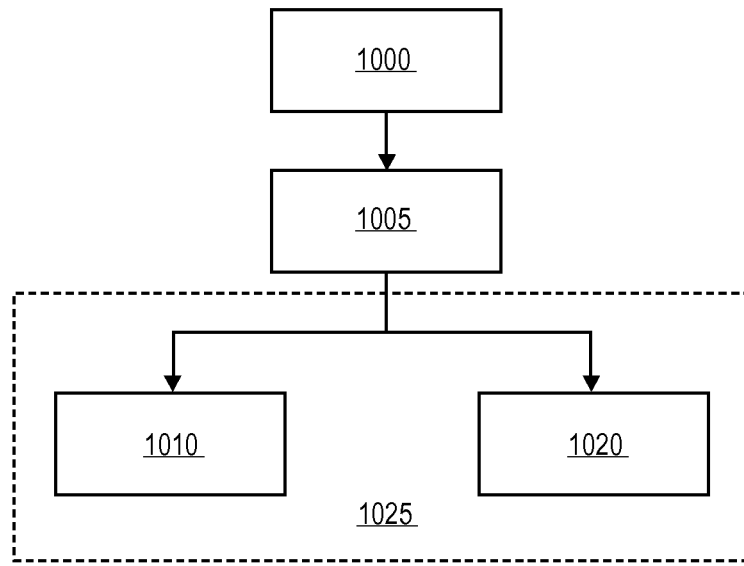
FIG. 10 illustrates the steps, in one embodiment of the invention, to produce quotes from a set of measurement registers.

FIG. 10 illustrates the steps, in one embodiment of the invention, to produce quotes from a set of measurement registers 1000. The local reports 1005 can be generated by accessing the measurement registers 1000 with a symmetric authentication key. The quoting enclave 1025 can contain software that converts the local reports 1005 into anonymous quotes 1010 or normal quotes 1020.

Due to the nature of the computation involved with asymmetric keys and our desire to reduce the number of instructions in the enclave leaf we will not be including instructions to do asymmetric signing. Our approach, shown in the figure below, is to provide a hardware based mechanism for producing 'reports' based on a symmetric key authentication key, and to allow these symmetric key based 'reports' to be converted into asymmetrically signed 'quotes' using software which itself is protected using an enclave. As the Quoting Enclave needs to be authorized to have access to the platform attestation key the Quoting Enclave itself is a special purpose enclave, known as an Authenticated Enclave.

Each enclave provides two 256-bit wide Measurement Registers (MR_EADD & MR_POLICY) and two reserved registers. These measurement registers are contained within the SECS of the enclave.

Figure 11:
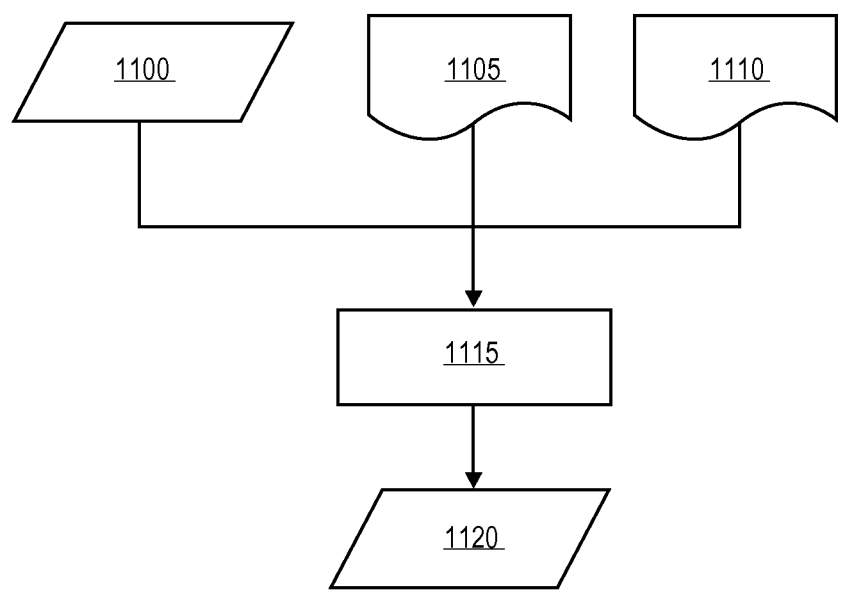
FIG. 11 illustrates the EADD process to update the measure register MR_EADD in one embodiment of the invention.

FIG. 11 illustrates the EADD process to update the measurement register MR_EADD 1100 in one embodiment of the invention. The extend operation 1115 can take as inputs the current value of the MR_EADD 1100, the page data 1105, and the page meta data 1110. The output of the extend operation is the MR_EADD' 1120, which is the next value to store into MR_EADD 1100.

MR_EADD contains the aggregated measurement of the enclave as it was built using the EADD instruction before the EINIT instruction is called. It is only written to by microcode and therefore it needs to be placed in a page of the SECS which is read-only by enclave code. On each invocation of EADD it computes a SHA256 over the page data and the security meta data associated with that page, namely the relative address (w.r.t. to the enclave's base address) of the page and the page's SEC_INFO.flags and this value is extended into MR_EADD1100. Where we define 'extend' to mean:

New MR Value=Hash (Old MR Value||Input Value)

MR_POLICY contains the value of the policy used to authenticate the policy which permitted the enclave to be launched. This value was taken from the enclave permit which was placed in the SECS at launch and copied as a successful completion of the EINIT instruction. MR_POLICY is only written to by microcode and therefore it needs to be placed in a page of the SECS which is read-only by enclave code.

Figure 12:
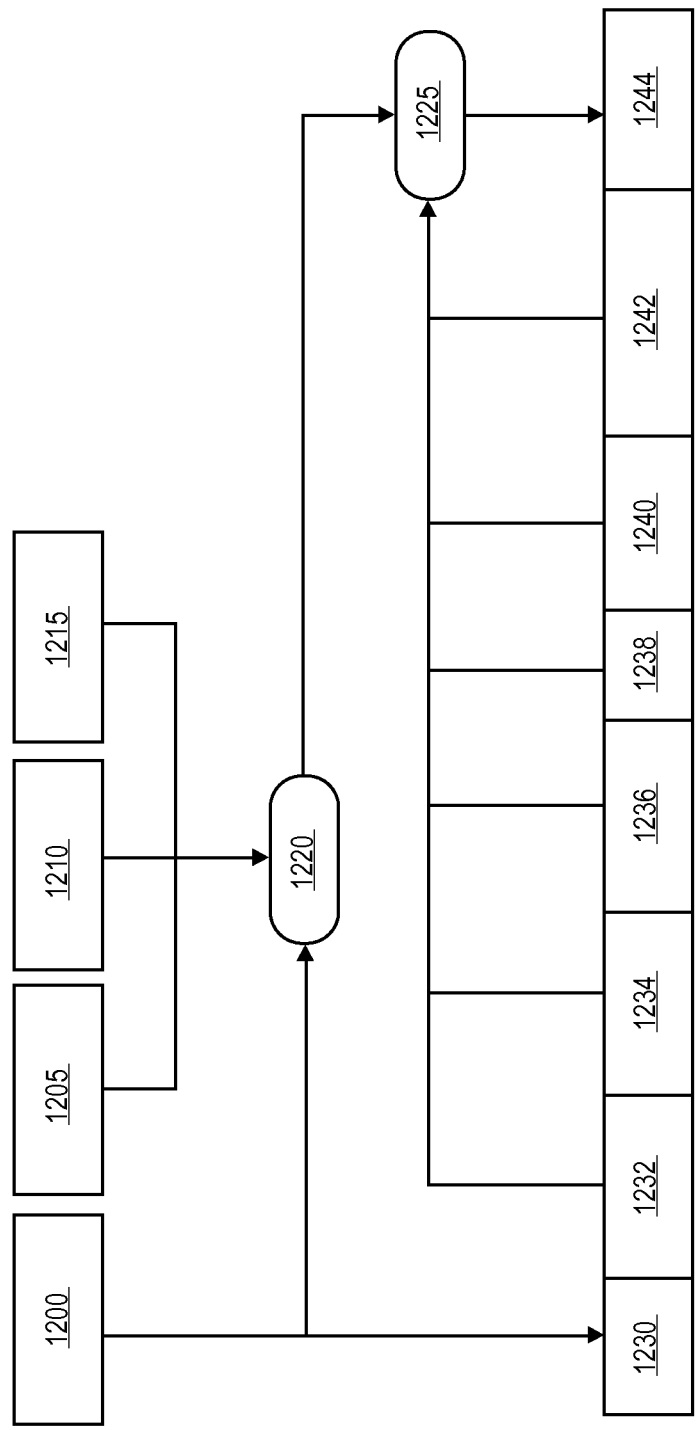
FIG. 12 illustrates the EREPORT instruction that creates reports in one embodiment of the invention.

FIG. 12 illustrates the EREPORT instruction that creates reports in one embodiment of the invention. The KEYID 1200, owner epoch 1205, package fuse key 1210, and fixed string MAC key 1215 are possible inputs to a derivation instruction 1220. The output of the derivation 1220 can enter the CMAC 1225 along with the present values of TCB version 1232, ISV version 1234, capabilities 1236, flags 1238, user data 1240, and measurement registers 1242. The output of the CMAC 1225 can be stored in the MAC 1244. The output of the EREPORT instruction can include the key identification 1230, TCB version 1232, ISV version 1234, capabilities 1236, flags 1238, user data 1240, measurement registers 1242, and MAC 1244.

The EREPORT instruction creates an intermediate key to perform a symmetric key based GMAC over the measurement registers, user data, and additional contextual information, such as the enclave's capabilities and flags.

In addition to the Measurement Registers the user can also supply a 256 bit wide block of data for inclusion in the report. There are many application specific values, e.g. a challenger NONCE and/or an application created key, which the user would like to attest. These values can be reduced to a single hash and submitted to the report for inclusion.

In order to prevent key wear out, by repeatedly calling EREPORT, a random 128 bit value (known as reportKeyID) is produced on each power cycle of the processor and stored in internal location. This value is incremented after 2^32 AES operations using this value. Each call to the EREPORT instruction will increment this value by 1 in one embodiment.

TABLE 5-1

EREPORT Output Structure

| Offset (Bytes) | Length (Bytes) | Name | Description |
|---|---|---|---|
| 0 | 16 | Capabilities | The values of the capabilities flags for the enclave. |
| 16 | 1 | Flags | A bit field which represents certain state of the enclave or the report instruction |
| 17 | 1 | RegSelect | A bit field to indicate those measurement registers included beyond UserData |
| 18 | 14 | RESERVED | Set to Zero |
| 32 | 16 | Sec Version | The security version of the TCB |
| 48 | 32 | UserData | The value of the UserData provided by the EREPORT caller. |
| 80 | 32 | MR_EADD | The value of the SECS->MR_EADD |
| 112 | 32 | MR_POLICY | The value of the SECS->MR_POLICY |
| 144 | 32 | RESERVED | Set to Zero |
| 176 | 32 | RESERVED | Set to Zero |
| 208 | 16 | KeyID | The value of reportKeyID for the package on which EREPORT was executed. |
| 224 | 16 | MAC | The output of performing a CMAC across the previous fields in this structure |

The Flags field in the report structure can be used to determine certain state information about the enclave or when the EREPORT instruction was called which will be useful for a challenger to assess whether they may trust the enclave.

TABLE 5-3

EREPORT Flag Structure

| Bit | Name | Description |
|---|---|---|
| 0 | DEBUG | 1: The enclave is in debug mode (set on ECREATE) |
| 1 | NPW | 1: if Capabilities.NPW = 1. Set by EINIT |
| 2-7 | RESERVED | MBZ: RESERVED for future use |

In one embodiment the architecture allows an architectural enclave with the appropriate capability set to retrieve the key used in the CMAC operation with the EGETKEY command and hence verify that the report was created on the hardware it is currently running on. This capability is limited to the Quoting Architectural Enclave.

For retrieving measurements of the enclave when executing outside the enclave, the ERDMR (Read Measurements) instruction is provided. This instruction takes a pointer to a valid SECS page and a pointer to address where the measurements will be delivered. The measurements are delivered in the form of a MEASUREMENT structure. The MEASUREMENT structure is not cryptographically protected.

TABLE 5-5

MEASUREMENT Structure

| Offset (Bytes) | Length (Bytes) | Name | Description |
| --- | --- | --- | --- |
| 0 | 32 | MR_EADD | The value of the SECS->MR_EADD |
| 32 | 32 | MR_POLICY | The value of the SECS->MR_POLICY |
| 64 | 32 | RESERVED | Set to Zero |
| 96 | 32 | RESERVED | Set to Zero |

Enclave pages when not inside the Enclave Page Cache are protected cryptographically. There are three levels of cryptographic protection: Confidentiality Protection, Forgery Protection, and Replay Protection. In one embodiment application are allowed to choose a protection level for each enclave page independently of the protection level chosen for other pages of the same enclave. The enclaves' implementation MAY allow applications to choose between the following combinations: Forgery Protection, Forgery Protection and Replay Protection, Confidentiality and Forgery Protection, and Confidentiality, Forgery Protection, and Replay Protection. Confidentiality and forgery protection on enclave page can be achieved using one of the several authenticated encryption modes such as the Galois Counter Mode (GCM) in conjunction with an appropriate cipher such as AES. Replay protection, however requires a more sophisticated solution.

Figure 13:
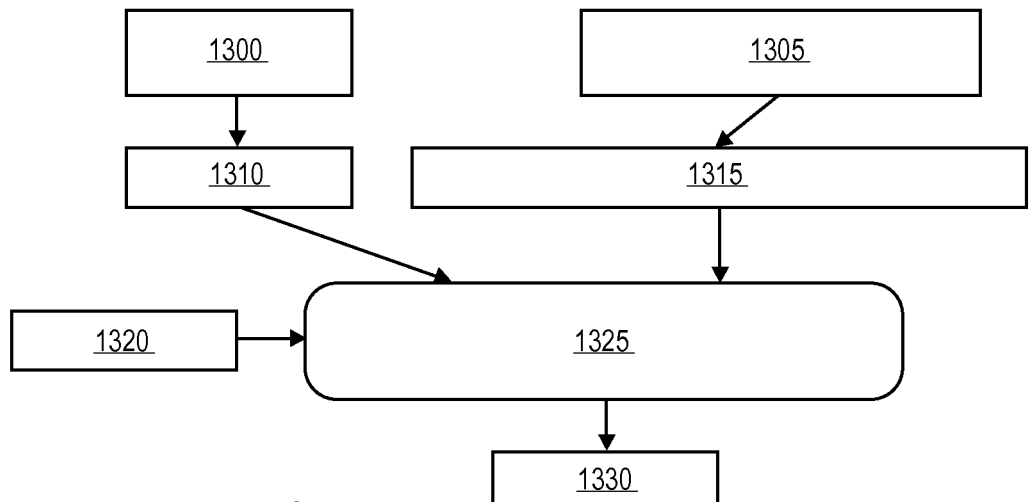
FIG. 13 illustrates the mechanism of replay-protection found in one embodiment of the invention.

FIG. 13 illustrates the mechanism of forgery protection and replay-protection found in one embodiment of the invention. Forgery protection prevents an attacker from substituting a different value of encrypted data which is not generated by the program. Replay protection prevents an attacker from substituting a value of encrypted data which is not the current latest value generated by the program. The node version number 1300 can enter the IV 1310 and then to the GMAC 1325 algorithm. The version numbers for children 1305 can send data 1315 to the GMAC 1325 algorithm. The GMAC 1325 algorithm combines the key 1320, the IV 1310, and the data 1315 to generate the MAC 1330.

Replay protection ensures that all the contents of an enclave as seen by a logical processor at any given time belong to a single snapshot of a non-corrupted enclave. Thus, a replay-protection mechanism needs to define the concept of an enclave version and provide a mechanism of determining whether a forgery-protected enclave page belongs to that version of the enclave. To this end, the replay-protection mechanism ties the contents of each forgery-protected enclave page to a page version number using a message-authentication algorithm such GMAC. In the case of GMAC, the version can be used as a part of the initialization vector (IV) as shown in FIG. 13.

Figure 14:
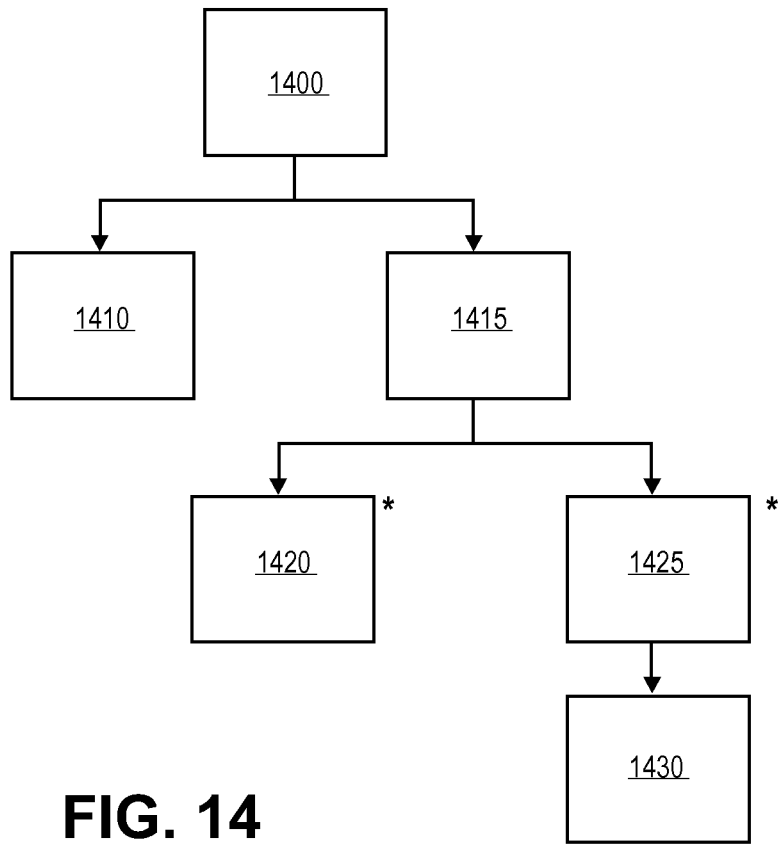
FIG. 14 illustrates an example of the MAC tree structure portion of the replay-protection mechanism found in one embodiment of the invention.

FIG. 14 illustrates an example of the MAC tree structure portion of the replay-protection mechanism found in one embodiment of the invention. The leaf node 1425 can contain the version information for individual MAC content page 1430. Each leaf node such as 1420 contains an individual MAC content page (not shown). Each internal node 1410, 1415 can contain version information of the children groups it links to. The root 1400 is the highest level node in the tree data structure.

To extend versioning to the entire enclave, the replay-protection mechanism maintains a version tree. Leaf nodes contain the versions of individual replay-protected pages of the enclave instance. Each internal node provides the version of each group of children and therefore logically holds the version information for the pages they are representing. FIG. 14 shows this concept pictorially.

In one embodiment, tree structure was chosen to reduce the number of data that needs to be processed from O(n) pages to O(log n). The use of a version tree instead of a hash tree was selected to allow page eviction from the EPC without necessitating a tree update.

Since replay protection may require each page to have its own version that is cryptographically tied to its contents, Replay Protection requires Forgery Protection. Thus, forgery protection in SE architecture is mandatory. Additionally, initial implementations of SE may further restrict the list of supported protection combinations.

The OS/VMM creates an enclave by executing the ECREATE instruction. During the creation of the enclave, the range of linear addresses that is protected by the enclave is specified. This range of linear addresses is known as the Enclave Linear Space (ELS) range.

Once an enclave is created, individual pages belonging to the ELS range are added to the enclave using the EADDPRE instruction. The EADDPRE instruction brings each of the added pages into enclave protection domain by moving those pages into the Enclave Page Cache. If any of these pages out of the EPC using EWBINVPG the logical processor will put cryptographic protections on those pages.

The cryptographic protections are achieved by associating cryptographic meta-data with each enclave page. This meta-data is used by the uCode flows for various processor instructions to decrypt the contents of an enclave page and to verify the authenticity/freshness of each enclave page. The SE architecture provides several such instructions to update, manage, and validate the cryptographic meta-data.

Each enclave page has Security Information SEC_INFO data structure associated with it. The purpose of the SEC_INFO data structure is to hold the cryptographic meta-data required to decrypt and verify the page. The various fields of the SEC_INFO structure are as follows.

TABLE 6-1

The SEC_INFO Data Structure

| Field Type | Field Name | Description |
| --- | --- | --- |
| UINT128 | MAC | Message-authentication code authenticating the contents of the page and the SEC_INFO flags |
| UINT128 | iv_p | Page IV used for computing the MAC above. |
| UINT128 | Key_id | Key identifier to be used to MAC/encrypt the page and the SEC_INFO flags |
| UINT32 | Flags | Flags that describe the page type, cryptographic and access protections for the page. |
| UINT32 | RESERVED | Reserved for future use. MBZ. |
| UINT64 | RESERVED | Reserved for future use. MBZ. |

Security Information Flags (SEC_INFO.Flags) describe the page type, cryptographic and access protection for a protected page.

TABLE 6-2

SEC_INFO flags

| Bit Pos. | Content | |
|---|---|---|
| 0 | REPLAY PROTECTION | RP: Replay Protection. Bit value of 1 indicates that the page is replay protected. Bit value of zero indicates that the page is not replay protected. |
| 1 | CONFIDENTIALITY PROTECTION | CP: Confidentiality Protection. A bit value of 1 indicates that the contents of the page are encrypted, while a bit value of zero indicates that the contents of the page are not encrypted. |
| 2 | FORGERY PROTECTION | FP: Forgery Protection. Since forgery protection in SE architecture is mandatory, this bit may always be set to 1. |
| 3 | READ access | R: Bit value of 1 indicates that the page can be read from inside the enclave. Bit value of 0 indicates that the page cannot be read from inside the enclave. If the SECS flag is set (see below), the R flag may be set to 0 (SECS cannot be read from inside an enclave). |
| 4 | WRITE access | W: Bit value of 1 indicates that the page can be written from inside the enclave. Bit value of 0 indicates that the page cannot be written from inside the enclave. If the SECS, SMAP or TCS flag is set (see below), the W flag may be set to 0 (SECS and TCS cannot be read from inside an enclave). |
| 5 | Execute Access | X: Bit value of 1 indicates that the page can be executed from inside the enclave. Bit value of 0 indicates that the page cannot be executed from inside the enclave. If the SECS or TCS flag is set (see below), the X flag may be set to 0 (SECS and TCS cannot be executed from inside an enclave). |
| 9:6 | PAGE TYPE<br>0—SECS<br>1—SMAP_LEVEL_1<br>2—SMAP_LEVEL_2<br>3—SMAP_LEVEL_3 (RESERVED)<br>4—TCS<br>8—REG | SECS: Bit value of 0. R may be 0, W may be 0, X may be 0.<br>SMAP_LEVEL_1: Bit value of 1. R may be 0, W may be 0, X may be 0.<br>SMAP_LEVEL_2: Bit value of 2, R may be 0, W may be 0, X may be 0.<br>SMAP_LEVEL_3: Bit value of 3, R may be 0, W may be 0, X may be 0.<br>TCS: Bit value of 4. R may be 1, W may be 0, and X may be 0.<br>REG: Bit value of 8. |
| 11:10 | EACCEPT_PAGE_TYPE<br>00—NONE<br>01—EMODIFY<br>10—EADD | NONE: Page is a member of the enclave.<br>EMODIFIED: Page attributes have been modified by the OS.<br>EADD: Page has been added by the OS. |
| 12 | A-REPLAY PROTECTION | Indicates whether Replay Protections will be applied once page is accepted inside the enclave |
| 13 | A-CONFIDENTIALITY PROTECTION | Indicates whether Confidentiality Protection will be applied once the page is accepted inside the enclave. |
| 14 | A-FORGERY PROTECTION | Indicates whether Forgery Protection will be applied once the page is accepted inside the enclave. |
| 15 | RESERVED | MBZ |
| 31:16 | RESERVED | MBZ |

Security Map (SMAP) is the data structure that is used to store cryptographic meta-data required to verify the freshness of an enclave page (i.e., replay protection). A security map represents a full version tree for a particular snapshot of an enclave. Each node of the Security Map holds versions for 256 child nodes (or enclave pages, in the case of a leaf node). Additional meta-data about the security node is contained within the SEC_INFO for a particular SMAP node.

In one embodiment, the Security Map tree is two levels deep[1], and is accessed using enclave offset of an enclave page within that enclave. The root of the SMAP is contained within the SECS and it only holds versions for 128 child nodes. Bits from the enclave offset are used to choose appropriate child are used to index the SMAP. In gen 1, the enclave offset is 35 bits long. The enclave offset is extracted by the following formula (enclave linear address & enclave mask). The enclave mask is determined by (size of the enclave—1) and can be calculated during ECREATE.

TABLE 6-3

SMAP Layout

| Tree Depth | Indexing Bits |
| --- | --- |
| At depth 0 | bits 34 through 28 of the enclave offset are used |
| At depth 1 | bits 27 through 20 of the enclave offset are used |
| At depth 2 | bits 19 through 12 of the enclave offset are used |

[1] The depth of the Security Map is related to the size of the enclave supported by the SE architecture. In Gen 1, SE architecture will support maximum enclave size of 32 GB.

In general, at depth l>1 bits N−(l)×8 through N−(l+1)×8+1 are used to select the appropriate child at next level.

Note: Security Map is a logical data-structure, and is not architectural. A logical processor is not even aware of where in the linear address space the SMAP is located. The system software is responsible for maintaining and walking the security map. Each individual node in the security map has an architecturally defined structure—however, the architecture does not specify how the security map is maintained in the memory. It may however be noted that, each node in the security map has a well-defined logical position in the security map, and if the node is moved around within the map, the various processor instructions that relate to the security map will interpret that as an attack scenario.

A root security node is contained within the SECS and contains version information for 128 children. A non-root security node is protected page and its associated SEC_INFO. The protected page contains version information for 256 children.

TABLE 6-4

SMAP Node Layout

| Field Type | Field Name | Description |
| --- | --- | --- |
| UINT128 | VERSION-0 | VERSION for Child 0 |
| UINT128 | VERSION-1 | VERSION for Child 1 |
| UINT128 | VERSION-N | VERSION for Child N |
| UINT128 | VERSION-255 | VERSION for Child 255 |

The SEC_INFO contains the location of the SMAP within the SMAP. The location with the SMAP is determined by the linear/enclave offset and the page type SMAP_LEVEL__1 and SMAP_LEVEL__2.

Adding a replay-protected enclave page requires that the SMAP parent have been created and resident inside the EPC with FCR bit cleared. To verify the integrity of an enclave page, a logical processor uses the IV_P and key_id in the SEC_INFO structure to generate a key. The key is used to compute the MAC over the flags in the SEC_INFO structure and the contents of the page. The computed MAC is compared with MAC located in the SEC_INFO structure. If the MACs match, then the page is considered to pass the integrity check.

A logical processor verifies the integrity of a page when the page is loaded into the EPC using the ELPG instruction. As a part of this instruction, a logical processor notes down the IV_P from the SEC_INFO structure that was used to verify the page.

To verify the freshness an enclave page, a logical processor verifies that the enclave page and its smap parent have been loaded into the EPC and that smap parent is fresh. It then proceeds to check the version of the page against version of stored in the smap parent. If the two versions match, the processor generates a new version for the page and updates the version in the smap parent and version of the enclave page. Lastly, it marks the enclave page as fresh.

Note—the generation of a new version allows the page to be modifiable. This both simplified the architecture and implementation.

To remove an enclave page, a logical processor verifies that the enclave page and its smap parent have been loaded into the EPC and are both fresh. It then proceeds to set the version of the page in the smap parent to 0 and mark the EPC slot of the enclave page as available.

The Enclave Page Cache (EPC) is a secure storage used by the CPU to temporarily store enclave pages when they are not cryptographically protected by SE cryptographic protections.

Following requirements are identified on the EPC. Any accesses to the enclave memory pages loaded into the EPC that belong to non-debug en-claves may be protected from any modification by software entities outside that enclave. Attackers may not be able to read plain-text data belonging to non-debug enclaves that is loaded into the EPC via straight-forward hardware attacks. Attackers may not be able to able to modify data in the EPC that belongs to non-debug en-claves via straight-forward hardware attacks. Any data loaded into the EPC may be accessible coherently, yet securely from any CPU in the system.

There are several mechanisms of implementing the EPC. The EPC could be implemented as on on-die SRAM or eDRAM. The EPC could also be constructed by dynamically sequestering ways of the CPU's last-level cache. In such an implementation, the EPC may be protected from un-authorized accesses from outside the package. However, other packages in the system may be able to access the EPC coherently, yet securely.

Another mechanism of implementing EPC is the Crypto Memory Aperture (CMA). The Crypto Memory Aperture (CMA) provides a cost-effective mechanism of creating cryptographically protected volatile storage using platform DRAM. The CMA uses one or more strategically placed cryptographic units in the CPU uncore to provide varying levels of protection, as needed by the customer technology. The various uncore agents are modified to recognize the memory accesses going to the CMA, and to route those 25 accesses to a Crypto Controller located in the uncore. The Crypto Controller, depending on the desired protection level, generates one or more memory accesses to the platform DRAM to fetch the cipher-text. It then processes the cipher-text to generate the plain-text, and satisfies the original CMA memory request. The CMA fully integrates into the Intel QuickPath, Interconnect (QPI) protocol, and scales to multi-package platforms, with security extensions to the QPI protocol. In a multi-package platform 30 configuration, the CMA protects memory transfers between Intel CPUs using a link-level security (Link-Sec) engine in the externally facing QPI link layers.

An SECS is said to be active if it is currently loaded into the EPC. As explained later in this document, the OS/VMM is responsible for managing what gets loaded into the EPC. However, while loading an enclave page into the EPC, the OS/VMM needs to tell the CPU the whereabouts of the SECS for that page, except when the page under consideration itself is an SECS. When the page being loaded is not an SECS, the CPU requires that the SECS corresponding to the page be located inside the EPC. Before loading any page for an enclave, the OS/VMM MAY load the SECS for that enclave into the EPC.

It may be noted that, the CPU does not enforce any restrictions on how many times an SECS could be loaded to the EPC—however, it would be highly unusual for the OS/VMM to load multiple copies of the SECS to the enclave page cache. Nevertheless, even if multiple copies of the same SECS are loaded to the EPC, each of those copies is considered as a separate active SECS instance, and enclave pages loaded into the EPC that belong to different instances of active SECS are considered to belong to different enclaves by the hardware.

The OS/VMM sees the EPC as a contiguous block of physical memory in the system address space. 10 However, to reduce internal storage, and enable fast indexing, the CPU associates a slot identifier (SID) with each EPC page. The physical address of an EPC page and the corresponding slot identifier are related to each other as follows.

$$sid=(page\_pa-epc\_base\_pa)>>12$$

$$page\_pa=pc\_base\_p|(sid<<12)$$

The hardware uses a special slot identifier of 0xFF to denote an invalid slot. EPC slot identifiers are used by both the uCode and the PMH to track the information about the enclave pages.

Every enclave page loaded to the EPC has a well-defined system physical address. Since there is a one-to-one mapping between the physical addresses belonging to EPC and the EPC slot identifiers, we say that each page loaded to EPC has its own EPC slot identifier or EPC_SID.

Additionally, every enclave page, except for the SECS page, that is loaded into the EPC is associated with an active SECS instance. Recall that an active SECS instance is nothing but an SECS page that is loaded to the EPC. Consequently, the active SECS page also has its own EPC_SID. The EPC_SID of the SECS page to which a non-SECS enclave page belongs is referred to as the SECS_SID for non-SECS 25 page. For each page loaded into the EPC, the hardware keeps track of the SECS_SID. The SECS_SID for an SECS pages loaded into the EPC is defined to be 0xFF, or the invalid SID.

The EPCM is a secure structure used by the processor to track the contents of the page cache. The 30 EPCM holds exactly one entry for each page that is currently loaded into the EPC. For the page represented by it, each EPCM entry tracks such information as the enclave to which that page belongs, the linear address for which the page was brought into the enclave page cache, the version of the page, etc. The EPCM structure is used by the CPU in the address-translation flow to enforce access-control on the enclave pages loaded into the EPC. The EPCM entries are managed by the (x)uCode as part of various instruction flows.

In one embodiment of the invention, an enclave page cache (EPC) may be dynamically allocated or de-allocated. In one embodiment, software, such as an operating system can dynamically allocate pages in memory as EPC or de-allocate memory from EPC. In one embodiment, the operating system can assign any page in the enclave to be in the EPC. The EPC can take up every available location in the memory in some embodiments. One distinction of dynamic EPC from fixed EPC, according to one embodiment, is that dynamic EPC allows for the addition and removal of pages of memory. In one embodiment, logic, such as a software driver may allocate a memory area to be EPC and de-allocate the memory from the EPC. In one embodiment, a pre-boot process checks for available memory to store meta data for each page of memory and software may declare a page to be EPC or non EPC, while hardware logic may track and enforce each page's attributes.

In one embodiment, hardware logic may control access to the memory used as an EPC via a translation lookaside buffer (TLB) and a page miss handler (PMH). In one embodiment, when the search address has a match in the TLB, known as a TLB hit, the TLB may be flushed when the secure enclave exits the EPC. In one embodiment, when the search address has no match in the TLB, known as a TLB miss, an extra lookup may fetch data from the enclave page cache map (EPCM) on multiple memory references. In one embodiment, a PMH may perform the look up of the EPCM. In another embodiment a range register in the PMH is checked to control access to a contiguous physical address, EPC. The operating system may not allow direct memory access (DMA) to access the EPC pages. If the returned page of the memory is marked as an enclave page, the secure enclave control structure identification (SECSID) of the page may be checked against that of the currently executing enclave to ensure that the access is secure. If there is a mismatch between the SECSID of the returned page and that of the currently executing enclave, the PMH may issue an abort message. If the returned page of the memory is not marked as an enclave page or if the returned page of the memory is marked as an enclave page and the SECSID of the page matches that of the executing enclave's, the PMH may load the page translation into the TLB. In one embodiment, a cache tag can be used to identify the enclave line from the other lines on a writeback cycle. However, in at least one embodiment, a cache tag is not used if the logic determining the type of memory request accesses the EPCM during a writeback cycle.

In one embodiment of the invention, software, the BIOS, can allocate memory before the operating system boots to create enclave pages. Software may, in one embodiment, create an EPC with a sequence of steps in the BIOS. The BIOS may reserve some memory to store meta data and, for each processor, set a range register. BIOS may take as input a base address and a memory size. The system configuration is checked by a process known as MCHECK to ensure all registers on all packages and all cores are set correctly to provide protection from accesses outside the enclave. MCHECK will lock the registers until the system resets. In another embodiment, software can add a page to an EPC by an instruction known as EPCADD, which declares portions of memory to be a part of the EPC. The EPCADD sequence can take a memory address as input and can output a message to indicate the success or failure. In the case of EPCADD outputting a message indicating success, EPCADD can set the EPCM.E bit and the page corresponding to that physical address is flushed from all TLBs in the system. In one embodiment of the invention, the EPCADD may return an error code in RAX of 01 to represent the page with the input address is already an EPC page and an error code of 02 to represent the input address is out of range. A page of memory declared by EPCADD as part of an EPC may require EPC semantics to access the data. In this embodiment of the invention, software can remove a page from the EPC in a instruction known as EWBINVPG and allow the encrypted data to continue to be available while protected by cryptography and integrity protection. Data in this format can be stored on regular memory of the hard disk drive. In yet another embodiment, software can, in an instructionknown as EPCREMOVE, remove a page in an EPC and make the encrypted data unavailable. Hardware executing EPCREMOVE clears the page and parts of the EPCM. EPCREMOVE can be executed without first executing EWBINVPG. The EPCREMOVE sequence can, in one embodiment, remove a page from an EPC based on a memory address. In an embodiment of the invention, the EPCREMOVE instruction may contain an error code in RAX of 01 to represent that the page being removed is part of a secure enclave control structure (SECS) and cannot be removed and an error code of 02 to represent that the page being removed is not an EPC page. A global TLB shootdown of a page of memory can result from EPCREMOVE in one embodiment of the invention, and the memory formerly occupied by the page could become available for general software access.

The PMH prevents access to the protected regions of the memory space. Depending on the architecture this can be as simple as just the physical address check of accesses to the EPC. Further PMH support can be used to allow for performance improvements or alternative implementations of SE. SE architecture relies on the Page-miss Handler (PMH) to prevent unauthorized accesses to the enclave pages loaded into the enclave page cache. PMH detects various events, and reports those events back to microcode. The microcode may report an event to the OS/VMM. The OS/VMM then can execute appropriate instruction to remedy the fault.

When an enclave is created using the ECREATE instruction, a linear address range is specified for that enclave. This range is called the linear address range for that enclave. Any memory pages belonging to the linear address range of the enclave are considered to be under the enclave's protection, and have SEC_INFO entries associated with them.

Memory pages belonging to the linear address range of an enclave are also referred to as enclave pages. A program executing inside an enclave is allowed to access the enclave pages only if those pages are loaded into the enclave page cache and it is the enclave which owns the page. The processor will generate an exception-class event if this is not the case. It is the responsibility of the OS/VMM to ensure that the enclave pages get loaded to the EPC as needed.

If a logical processor is executing an enclave, and it generates a memory access to its enclave page, then such a memory access is referred to as an enclave access. The address may be checked to ensure it is being accessed by the correct entity In one embodiment the PMH provides access control functionality to protect the EPC when a program is not executing in an enclave. A range register, enabled for each logical processor will restrict access to the EPC when the processor is not executing enclave code. This range register is disabled when the processor starts executing enclave code. In its place the processor puts special page tables in place. These page tables are controlled by the processor and only allow access to EPC pages owned by that enclave. The processor and microcode restrict access to the EPC using these two mechanisms.

In some embodiments, a tradeoffs can be made among many axis including performance, implementation complexity, and silicon cost. In this chapter three possible implementations are described such that developers can understand some of the possible tradeoffs. Table 8-1 below shows these possible protections and the PMH support required.

TABLE 8-1

| PMH Support Options | |
|---|---|
| Implementation | Minimal PMH Support |
| Minimal Hardware Support: Secure Enclave Inside microcode extension | Physical Range Register Support to protect accesses to the EPC or CMA |
| Minimal Hardware support for Microcode: SE with PMH additions | Physical Range Register Support to protect accesses to the EPC or CMA. Linear Address check for access inside enclave, see Appendix 3 for more information |
| Robust hardware support for Microcode or microcode extensions: Implementation with extensive PMH support | Physical Range Register Support to protect accesses to the EPC or CMA. Linear address check for access inside the enclave, see Appendix 3 for more information |

As shown in the first row of Table 8-1one additional range register is all that is required to provide the access control protections needed. In this particular implementation the other protections are provided by microcode extensions. The range register may be enabled on a logical processor basis. The basic implementation using this mechanism is shown in FIG. 2-2.

PMH is modified to prune out accesses to the CMA range (covered by CMRR in the CPU) from LPs that are neither running in extended microcode mode nor in enclave mode. Additionally, LPs running in enclave mode are only allowed to access the EPC sub-range of the CMA.

Figure 15:
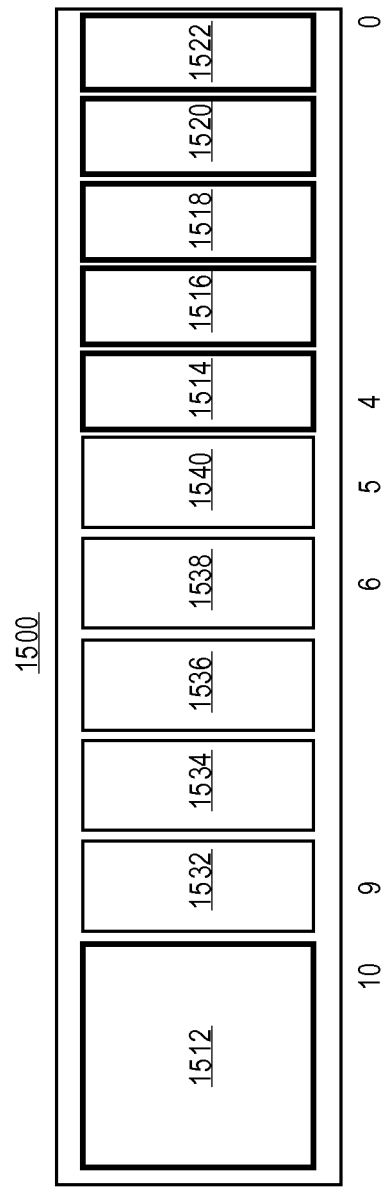
FIG. 15 illustrates in one embodiment of the invention how a page fault error code map can be implemented.

FIG. 15 illustrates in one embodiment of the invention how a page fault error code map can be implemented. When bit 5 1540 is set, bit 9, bit 8, bit 7, and bit 6 can be decoded together to determine the page fault error codes. The res bits 1512, the I/D bit 1514, the RSVD bit 1516, the U/S bit 1518, the W/R bit 1520, the P bit 1522.

When a page is not present in the EPC a fault is provided to the OS/VMM to indicate this fact. The Page Fault Error Code Map is altered as shown in Table 8-2. This indicate the new bits which are used to report the faulting condition. If there is no EPC fault then bit 5 is set to zero and bits 6 to 9 are also zero. If the fault is due to an EPC condition then bit 5 will be set and the software may decode bits 6 to 9 to understand the EPC faulting condition. More information on the fault types is described in the next section.

When bit 5 of the Page Fault Error Code is set bits 6 to 9 are interpreted as given in Table 8-2. This shows the condition which caused the page fault to occur. Some of the states indicate an illegal condition which may never occur in normal operation. They indicate an OS/VMM management error.

TABLE 8-2

Page Fault Error Codes

| EPCF Code | Definition |
|---|---|
| 0 | An access occurred to an EPC location which was not part of the current enclave or when not running in enclave mode |
| 1 | Address of a page inside the enclave linear address does not map to an EPC location |
| 2 | The EPC page is marked as not present |
| 3 | The EPC page accessed (checked against EPCM) is not part of the enclave under execution |
| 4 | The EPC page accessed does not have the same linear address as the reference (checked against EPCM) |
| 5 | Post EINIT: The EPC page has been added to the enclave but not accepted by the enclave software |
| 6 | An enclave page was loaded into the EPC but the version number of the integrity has not been updated |
| 7 | A write was attempted to an enclave page which does not have write permission. |
| 8 | A read was attempted to an enclave page which does not have read permission |
| 9 | An instruction fetch was attempted to an enclave page which does not have execute permission |
| A | An enclave attempted to access the SECS. Access is prohibited |
| B | An enclave attempted to access the TCS. Access is prohibited. |

In order to protect the EPC from attack there may be a mechanism which invalidates EPC addresses in all TLB's on the platform. This feature may signal to all cores that a particular page is to be invalidated. It may then wait until all processors return an indication that the shoot down is complete.

Whenever an enclave exit, EEXIT, occurs the TLB may not allow accesses to the enclave pages currently present in the TLB. This can be done by clearing the TLB or using extra bits to tag the enclave entries.

One alternative is the use of an enclave bit in the TLB on enclave exit all the enclave entries are cleared. Another alternative is the use of several bits to indentify a particular enclave. In this case the enclave entries do not need to be evicted. The enclave entries can be left in the tlb. When an address is sent to the tlb for lookup these bits are appended to the lookup. These bits are compared to an enclave id from the core which indicates the enclave identity. If the bits match then the request came from the same enclave. If the match fails then the request did not come from that particular enclave and the lookup will not hit on that location.

Enclave Authentication provides a means of determining the authority that licensed the enclave code to run within an enclave, which is the author/approver of that code. Enclave Authentication also provides a foundation to outsource Enclave microcode flows, Flexible Sealing & Reporting, as well an enforcement point for a number of new business models.

Certain aspects of the Secure Enclaves architecture require complex, time consuming flows, which are not well suited for implementation within micro-coded instructions. The solution is to outsource those portions of the Secure Enclaves architecture to macrocode. In many cases, the outsourced code requires special access to sensitive processor or platform data. For example, EPID signing is too long for a single instruction. Instead a Quoting Enclave is used to produce EPID signed Quotes, by granting it special access to the EPID private key. Enclave authentication allows Intel to specify the additional capabilities granted to specific enclaves, such as access to the END key only by the Quoting Enclave. Enclaves provided by Intel, which have additional capabilities and implement core Enclave functionality, are referred to as the enclave is made available to the Sealing & Attestation mechanisms, allowing a vendor the ability to choose between the rigid protection based on the enclave measurement or more flexible protection based on the source of the enclave's code.

Enclave authentication is split into two parts. Each enclave is accompanied by an Enclave License with a signature chain rooted back to Intel. The enclave license indicates who the source/accountable entity for the enclave is, any special capabilities the enclave requires, and any additional information needed for identifying the particular business model/agreement that enabled this enclave. A license may be for a specific enclave, indicating the measurement of that enclave, or it may be for a key, which is then allowed to sign enclaves as needed.

For example, A could purchase a license authorizing them to produce enclaves for use in A's video player. To do this, Intel would create a license for the Vendor A's video player Root Key, along with capabilities that Intel permits Vendor A to use in video player enclaves. Vendor A will then use the video player Root Key to sign individual license files for each video player revision they release. This creates a license chain for the enclave may contain multiple intermediate licenses.

A chain of signed licenses is not ideal for evaluation during the enclave launching process, so instead they are combined into a single instruction digestible structure called a Permit. Permits are symmetrically authenticated using the CMAC algorithm and are interpreted during initialization (EINIT) of the enclave.

TABLE 11-1

Enclave License Structure (Adheres to Ucode Patch Format)

| Offset (Bytes) | Length (Bytes) | Name | Signed? | Description |
| --- | --- | --- | --- | --- |
| 0 | 4 | LicenseVersion | No | Structure Version for this License |
| 4 | 4 | Header Size | No | Size of Header (unsigned portion of cert) |
| 8 | 4 | Body Size | No | Size of Body (signed portion) |
| 12 | 4 | Algorithm | No | Asymmetric Algorithm Used for signing 0x00000001: RSA |
| 16 | 4 | Key Size | No | Key Size in Bits |
| 20 | 4 | Pub Key Size | No | Size of the public Key in dwords |
| 24 | 4 | Exponent | No | Signing Key's Exponent |
| 28 | 36 | RESERVED | No | Reserved - MBZ |
| 64 | 256 | Pub Key | No | Signer's Public Key |
| 320 | 256 | Signature | No | Signature of Certificate |
| 576 | 8 | LicenseID | Yes | License Contract ID |
| 584 | 2 | LicenseType | Yes | Type of License 0x0000: Bulk 0x0001: Per Platform |
| 586 | 2 | LicenseAuthorityID | Yes | ID of License Authority to Approve |
| 588 | 4 | LicenseReserved | Yes | MBZ - Reserved |
| 592 | 4 | ISV SVN | Yes | ISV Assigned Security Version Number |
| 596 | 2 | Flags | Yes | Flags that may be turned on in enclave |
| 598 | 10 | Reserved | Yes | MBZ - Reserved |
| 608 | 16 | Capabilities | Yes | Bit mask of available Capabilities |
| 624 | 32 | EntityHash | Yes | Hash of Licensed PubKey or Enclave MR.EADD |
| 656 | 3440 | RESERVED | No | Reserved - MBZ |

Architectural Enclaves.

Enclave Sealed Storage provides enclave software with the ability to encrypt data to certain attributes of the enclave, such as its load-time measurement. Enclaves Attestation framework allows an enclave to provide evidence of the enclave's measurement to an external party. In many circumstances, it is more desirable to seal data or attest to the source of the enclave rather than the precise software hash of the enclave.

In one embodiment once the signature on an authenticated enclave is verified, the public portion of the key used to sign

TABLE 11-2

Permit Structure

| Offset (Bytes) | Length (Bytes) | Name | Description |
| --- | --- | --- | --- |
| 0 | 8 | LicenseID | License Contract ID |
| 8 | 2 | LicenseType | Type of License 0x0000: Bulk 0x0001: Per Platform |

TABLE 11-2-continued

Permit Structure

| Offset (Bytes) | Length (Bytes) | Name | Description |
|---|---|---|---|
| 10 | 2 | LicenseAuthorityID | ID of License Authority to Approve |
| 12 | 4 | LicenseReserved | MBZ - Reserved |
| 16 | 4 | ISV SVN | ISV Assigned Security Version Number |
| 20 | 2 | Flags | Flags that may be turned on in enclave |
| 22 | 10 | Reserved | MBZ - Reserved |
| 32 | 16 | Capabilities | Bit mask of available Capabilities |
| 48 | 16 | ParentKeyHash | Hash signing keys for license chain |
| 64 | 32 | EntityHash | Hash of Licensed PubKey or Enclave MR.EADD |
| 96 | 16 | KeyID | Key ID for deriving Permit & License Key |
| 112 | 16 | RESERVED | Reserved for MAC Expansion to 256 bit |
| 128 | 32 | cpuMAC | MAC using Permit Key |
| 160 | 32 | licenseMAC | MAC using License Key (Only required if License Type != 0) |
| 192 | 3440 | RESERVED | Reserved - MBZ |

Most of the elements of the License are copied to the Permit, yielding similar structures. The License ID is a 64 bit number to identify a business agreement. License Type identifies what platforms this license applies to. A Bulk license allows this enclave to be launched on any platform supporting Secure Enclaves. A Per Platform license requires the platform to first contact the indicated License Authority, and request permission to launch the enclave. Once permission has been established, no further contact with the License Authority is needed, but this allows the License Authority to track the number of platforms this enclave is deployed at for billing purposes. The ISV that licensed this enclave may opt to establish a security version number for this version of the enclave. By doing so, data sealed by this version can be made available to future versions, but not previous versions. The flags field indicates flags for the enclave that may be set in order for this permit to apply. The Capability Mask is a bit mask of the special capabilities that this enclave may be granted. The ParentKeyHash is the hash of the public key that signed this enclave's license, hashed with the public key that signed that key. EntityHash is the expected hash of the entity this license applies to. In the case of an enclave, this is the value of MR.EADD for the properly constructed enclave. For a licensing key, this is the hash of the public key.

In a License, the public key used to sign the license is included in the license itself. The permit is MACed using CPU keys. A proper cpuMAC indicates that the EMKPERMIT instruction created this permit after validating the license chain back to Intel. If the LicenseType is not Bulk, then a licenseMAC indicates that the Architectural License Enclave has contacted the appropriate License Authority and has receive confirmation that this platform may launch the enclave.

Not all enclaves require a permit. In order to ease development for enclaves, permits will be optional during the development and debugging phases of the software's lifecycle. The following policies will be enforced by EINIT. Non-debug enclaves always require a permit to launch. Debug Enclaves will launch without a permit. However, if no permit is presented to EINIT, MR.Policy, ISV Sec Version, Permit Sec Version, and Capabilities will all be set to 0.

If a permit is used to launch a debug enclave, permit->Flags [DEBUG] may be set, and only capabilities allowed by debug enclaves may be set in the permit.

Figure 16:
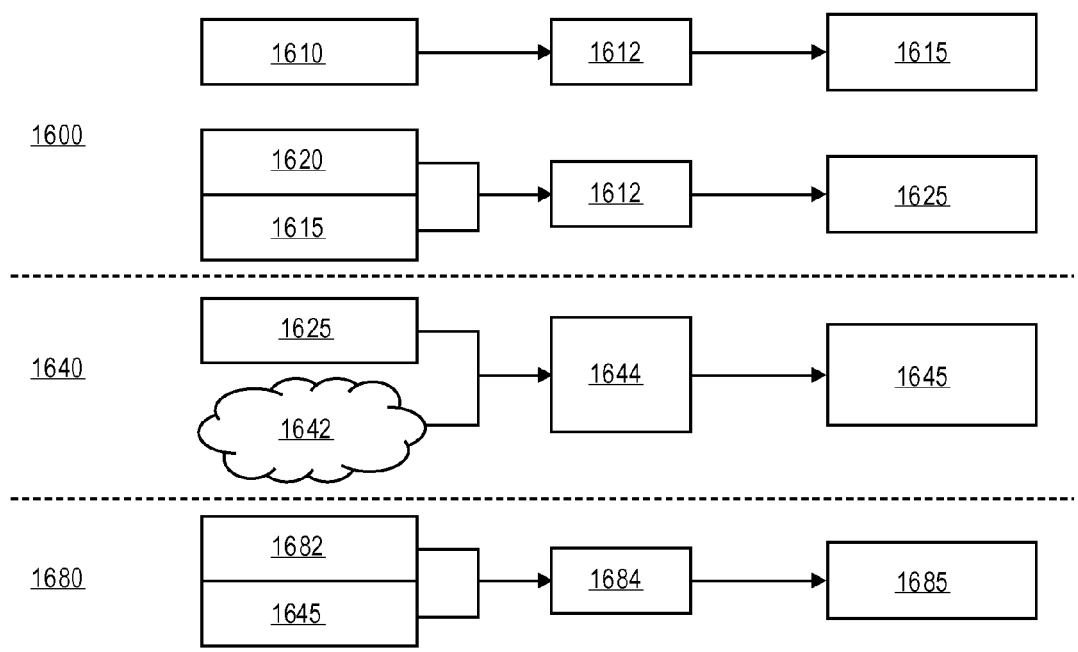
FIG. 16 illustrates an example of a process to create a permit to launch an enclave in one embodiment of the invention.

FIG. 16 illustrates an example of a process to create a permit to launch an enclave in one embodiment of the invention. The process can have three stages: permit issuing 1600, additional license approval 1640, and initialization enclave 1680. In the permit issue 1600 stage, the ISV key permit 1615 can be generated by performing an EMKPERMIT instruction 1612 on the ISV key license 1610. The enclave permit with MAC for CPU only 1625 can be generated by performing an EKPERMIT instruction 1612 on the enclave license 1620 and ISV key permit 1615. In the additional license approval 1640 stage, the enclave permit with MAC for CPU only 1625 and the $3^{rd}$ party enclave that corresponds to the information to be licensed 1642 enter the license enclave 1644, and the license enclave 1644 generates the enclave permit with MAC for CPU and license 1645. In the initialization enclave 1680 stage, the enclave SECS1682 and the enclave permit with MAC for CPU and license 1645 can be the inputs to the EINIT 1684 instruction. The output of the EINIT 1684 instruction is the ISV enclave 1685.

In order to launch an enclave, a permit may be created from the license that is shipped with the software, and then provided to the cpu to start the enclave. This process is broken down into three: Permit Issuing, Additional License Approval, and Enclave Initialization. FIG. 16 depicts the flow through this process.

A new instruction, EMKPERMIT, is used to create a permit from a license. EMKPERMIT creates a single permit from a single license, but can be called in succession in to convert a chain of licenses into a single permit with MAC using the Permit Key. The next section will describe this in further detail.

Each license includes a license type, which determines what additional steps may be taken for the permit to be usable. Per Platform Licenses require that a License Authority in the cloud maintain a billing count of platforms the enclave is deployed on. For licenses of this type, an additional step is required. An Architectural Enclave called the License Enclave will negotiate with the License Authority in the cloud, and upon approval, will provide an addition MAC on the permit using the License Key. Architectural Enclaves, for example, are always Bulk License, meaning they do not require the License Key MAC in order to run. They work on any platform supporting Secure Enclaves.

Permits are enforced at Enclave Initialization. During initialization the permit is processed, and if the enclave measurement matches that in the permit, and the MACs are correct, the enclave launches. EINIT will look at the license type and only inspect the License MAC for licenses requiring additional approval.

EMKPERMIT is a privileged instruction, due to the time required to verify the RSA signature on the license. This instruction takes a very simple signed credential that adheres to the uCode Patch format, verifies it, and produces a permit from its contents. The license contains both a signature and the public portion of the key used to sign it. This allows uCode to only store a hash of the Intel's license signing key, and be able to validate Intel signed licenses. EMKPERMIT can also validate licenses signed by ISV keys, by providing an authenticated approval of their key. This is done by created a permit, which contains a hash of the ISV's public key. The result is that EMKPERMIT can verify Intel licenses using an internal hash, or ISV keys with a hash provided in a second permit.

EMKPERMIT takes 3 parameters: pointer to a License, an optional pointer to a key permit, and a pointer to an output permit. For Intel signed Licenses, the key permit is null, and an internally hardcoded set of permit parameters are used. The calling method is used to validate an Architectural Enclave's License and produce a permit for it. EMKPERMIT ensures that the public key in the license is authorize by the uCode (by comparing the hash of the included public key to the internal hash).

In the case of an ISV, an ISV's key will have a license signed by Intel. Calling EMKPERMIT without a key permit, will use the Intel key hash to verify the signature on the license and create a permit authorizing the ISV key's hash to represent a legitimate license signing key. EMKPERMIT is then called a second time including the ISV's key's permit. EMKPERMIT validates the key permit's MAC, and then uses the hash of the ISV key where it previously used the Intel hash. Assuming the public key in the enclave license hashes to the value in the ISV key, and that the enclave license is properly signed by it, EMKPERMIT will produce a permit for the enclave. This permit indicates the license information (which may be consistent through the entire chain), the hash of all the public keys in the license chain, the enclave's measurement, and its capabilities.

The following steps are taken by the u-code during EMKPERMIT:
1. Copy parameters to scratch pad (to protect against race condition attacks)
2. Calculate hash of Public key in License.
3. If Key Permit==Null,
   a. Verify License Public key hash=Intel Key hash, or fail.
4. else
   a. Validate Key Permit's MAC using Permit Key
   b. Verify License Public key hash=Key Permit's Entity-Hash, or fail.
5. Validate cert's signature with PubKey.
6. Ensure License Info, Capabilities, and Flags are consistent between License and Key Permit.
7. Create permit with:
   a. PubKeyHash=Hash(KeyPermit.Hash, Hash(License Pub Key))
   b. Capabilities=KeyPermit.Capabilities & License.Capabilities
   c. Measurement=License.Measurement
   d. ISV SVN=License SVN.
   e. Flags=License Flags
8. KeyID=current KeyID in the core
9. cpuMAC=CMAC calculated using Permit Key
10. licenseMAC=0x0000 . . . 0000

The License Enclave is designed to make decisions about enclave launching outside the scope of visibility for uCode. For example, uCode cannot evaluate whether an ISV's business arrangements with Intel allow for an additional enclave deployment. The License Enclave is designed to collect whatever material is necessary to make an assessment and either further approve the enclave launch, or veto it. The License Enclave is only required to support complex business arrangements, and is not necessary for Bulk Licenses such as the ability to launch the enclave on any platform as many times as is needed.

The License Enclave is expected to be a system service. If a license indicates it needed further approval from the License Enclave, the chain of licenses and the enclave permit created by EMKPERMIT are passed to the License Enclave. The License Enclave then generates an approval request. The application then sends this approval request to the appropriate License Authority, which generates an approval notice. This is passed back into the License Enclave, and the License Enclave uses the License Key to MAC the permit in the licenseMAC field.

Once a permit is issued for an enclave, it may be evaluated and enforced by u-code in the enclave launch process. This is done as a part of the EINIT instruction, which takes the linear address of the permit as a parameter. The following additional steps are added to EINIT as part of the Authenticated Enclaves mechanism.
1. Copy permit to scratch pad
2. Verify cpuMAC on permit using the Permit Key
3. If LicenseType !=Bulk, Verify licenseMAC using the License Key
4. Compare Measurement in permit with MR.EADD in SECS.
5. Compare Flags in Permit to flags in SECS.
6. Copy Pubkey Hash in permit into MR.Policy.
7. Copy ISV SVN to SECS
8. Copy Capability Map in permit into SECS Capabilities The current capabilities map is a 128 bit mask of capabilities available to this enclave.

TABLE 11-3

Capability Bit Table

| Bit | Name | Debug | Description |
|---|---|---|---|
| 00 | RESERVED - MBZ | No | Reserved for Activating Ring Controls (Not Gen 1) |
| 01-02 | RESERVED - MBZ | No | Reserved for authorized enclave entry ring level (Not Gen 1) |
| 03 | RESERVED - MBZ | No | Reserved for Enclave may execute in VT Root Mode (Not Gen 1) |
| 04 | RESERVED - MBZ | No | Reserved for disabling encrypted executable pages (Not Gen 1) |
| 05 | RESERVED - MBZ | No | Reserved for Allow encrypted non-executable pages (Not Gen 1) |
| 06 | RESERVED - MBZ | No | Reserved for Allow post-EINIT EADD of executable pages (Not Gen 1) |
| 07 | RESERVED - MBZ | No | MBZ: RESERVED for Memory Protections |
| 08 | KEY_PROVISION | Yes | 1: Grant access to Provisioning Key |
| 09 | KEY_LICENSE | Yes | 1: Grant access to License Key |
| 10 | KEY_REPORT | Yes | 1: Grant access to Report Key |
| 11 | KEY_ISV_AUTH | Yes | 1: Grant access to the ISV Auth Key |
| 12 | KEY_OOB | Yes | 1: Grant access to OOB Key |
| 13 | KEY_EPID | No | 1: Grant access to Fused EPID Key |
| 14 | KEY_EPID_ID | No | 1: Grant access to EPID ID |
| 15-23 | RESERVED | No | MBZ: RESERVED for EGETKEY controls |
| 24 | CL_NAMEBASED | Yes | 1: Enclave is permitted to attest using a Name Base |
| 25-127 | RESERVED | No | RESERVED |

The space is organized based on the action to be taken by EINIT. Bit 00-03 are reserved for future use as ring level restrictions are active on this enclave. 04-07 is reserved to indicate what page protections are permitted in the future. 08-23 are processor keys available through EGETKEY. 24-31 are for other controls, such as using Name Based mode for attestation or for future technologies we want to restrict. Certain capabilities may never be used by an enclave in debug mode. The Debug column indicates whether a capability is legal to use in Debug Mode.

In future generations, bit 00 may indicate that ring level and VT restrictions apply to this enclave. Bits 01-02 indicate what ring level the enclave is permitted to run at, and bit 02 indicates whether the enclave runs in VT root mode or not. On each EENTER the current CPL may be compared against bits 01-02 to determine if this enclave is allowed to execute at this ring level. If an attempt is made to execute it at the wrong ring, EENTER will fail. Similarly, if ring restrictions are active, the enclave may only be entered from VT root mode if bit 03 is on. In the first generations these bits are MBZ.

Enclave pages may be encrypted or only integrity protected. Also, pages may be executable or not. In future generations, these attributes may be tracked and enforces in the security info portion of the EPCM. These capability bits are reserved to control the application of encryption to enclave pages in the enclave based on whether the page is executable and whether the enclave has been EINITed already.

Many Architectural Enclaves are Ring 3 entities that require access to keys protected within or by the CPU. EGETKEY provides access to these keys while the capability bits are used by EGETKEY to decide if access to the key may be granted.

The following is a list of the current Architectural Enclaves with their properties and short descriptions.

The Provisioning Enclave, with capabilities KEY_PROVISION and authorized by Intel, runs on single package platforms whenever a new Device Attestation Key (DAK) or Provisioning Attestation Key (PAK) is required. Its purpose is to allow the enclave to derive Device ID & Provisioning Key based on the Provisioning Seed provided by EGETKEY. The Provisioning Enclave then uses these keys to prove the authenticity of the platform to a provisioning server and retrieves a Device Attestation Key (DAK). After retrieving the DAK, the Provisioning Enclave seals it such that the Quoting Enclave can retrieve it. The Provisioning Enclave may then optionally use the DAK to authenticate with a Platform Attestation Key (PAK) provider and retried a PAK. Using a PAK provides better privacy for the user by ensuring that for a particular ISV, their activities cannot be associated with those of a previous owner of their platform. After retrieving the PAK, the Provisioning Enclave seals it such that the Quoting Enclave can retrieve it.

The Quote Enclave, with capabilities KEY_REPORT and authorized by the enclave has the same author as the Provisioning Enclave (typically Intel) used to provision the EPID key. Its location is OS Service Available to all apps. Its purpose is to allow enclaves to unseal a platform EPID key. A Report from EREPORT is provided as input. The enclave uses EGETKEY to retrieve the Report Key. The Report key is then used to verify the report. Enclave signs a Quote from using EPID.

The License Enclave, with capabilities KEY_LICENSE and authorized by Intel and signed by Root Intel, is shipped with Enclaves (OS Service) and singularly instantiated. Its purpose is to evaluate complex license policies. If an enclave requires additional license confirmation from the License Enclave, EINIT will only accept it after the License Enclave uses the License Key to CMAC the permit.

In single-package systems all the symmetric keys used by the enclave's architecture are derived from a single source of uniqueness stored in the processor's fuse array. The key hierarchy is split into an SE TCB Hierarchy, which is platform implementation dependant, and a SE Key Hierarchy whose structure is consistent across all Secure Enclave implementations. Keying material for TCB recovery and the foundation of EPID provisioning is provided by the SE TCB Hierarchy which serves as the root for the SE Key Hierarchy. All keying material used both within the enclave instruction set and in trusted Architectural Enclaves is provided by the SE Key Hierarchy.

The platform provides a two 128 bit platform unique keys in fuses. These keys are encrypted in fuses using a key stored in secret CPU logic. Several single purpose keys are derived from this key, and TCB recovery techniques are applied based on the platform's requirements. The resulting-keys serve as the roots in the SE Key Hierarchy.

Keys for the Architectural Enclaves are retrieved using the EGETKEY instruction.

The enclave architecture also requires the use of an asymmetric key to provide attestation of the REPORT values to systems outside the platform. This key, an EPID key, is initially provisioned in fuses, but may be re-provisioned using one of the keys derived from the key hierarchy after deployment. The method for provisioning the EPID attestation key is outside the scope of this specification. More information can be found in the Device Attestation Key (DAK) Provisioning Specification.

Finally the enclave's architecture also makes use of a key which is in the logic of all processors, for provisioning of key material at the OEM. This key is known as the Out-of-Box Experience Global Key. We perform similar derivation operations on this key to provide ISV uniqueness. How these keys derived from the OOB Key are used by ISV's is beyond the scope of this specification.

While the SE TCB portion of the key hierarchy is platform specific, all foundations require the same basic set of keys. We refer to these as the base keys. They are all derived in a fuse key and a logic key, and are the root of the SE Key Hierarchy. These keys are then used by an SE instruction to derive all keys used directly in the SE architecture. These keys are the result of the TCB Key Hierarchy. There are four SE Base Keys plus EPID components which are made available to the SE architecture by platform specific mechanisms. Table 12-1 describes each of these keys.

TABLE 12-1

Secure Enclave Base Keys

| Name | Description | Intel Known |
|---|---|---|
| Base Ops Key | The Base Ops Key is the main source of key derivations for SE. The MAC, Enclave, and Seal keys are all derived from the Ops Key. | No |
| Initial EPID (DAK) Key Blob | The initial DAK EPID key is stored in hardware. This is used to attest to the authenticity of the Intel Hardware and the protections on an enclave. Enables out of the box attestations, and reduces maximum supported load requirements in the back end servers. The DAK Key Blob contains the compressed 256 bit private key, 128 bits of entropy, and 32 bit Group ID. | No |

TABLE 12-1-continued

Secure Enclave Base Keys

| Name | Description | Intel Known |
|---|---|---|
| EPID (DAK) Entropy | The DAK Entropy is additional 128 bits of necessary entropy for the DAK. These bits are separated from the DAK blob to save fuses by deriving from the main fuse key. | No |
| Provisioning Base Key | The Provisioning Base Key is used to derive platform unique provisioning keys. The Provisioning Base Key is known to Intel and used as a shared secret to allow for in the field provisioning of the Device Attestation Key. | Yes |
| Base EPID ID | The EPID ED uniquely identifies this package. Its only use is during provisioning anonymous attestation keys, which are then used for ordinary transactions. Access to the EPID ID is restricted to only the Provisioning Enclave due to its privacy sensitivity. | Yes |
| Out of the Box (OOB) Base Key | The OOB Base key is a global key shared across many Intel platforms. The key may be shared across an entire generation of Intel microprocessors or a particular stepping. This key is then used to derive revocable per ISV encryption keys for distributing ISV secrets with new platforms. | Yes |

Figure 17:
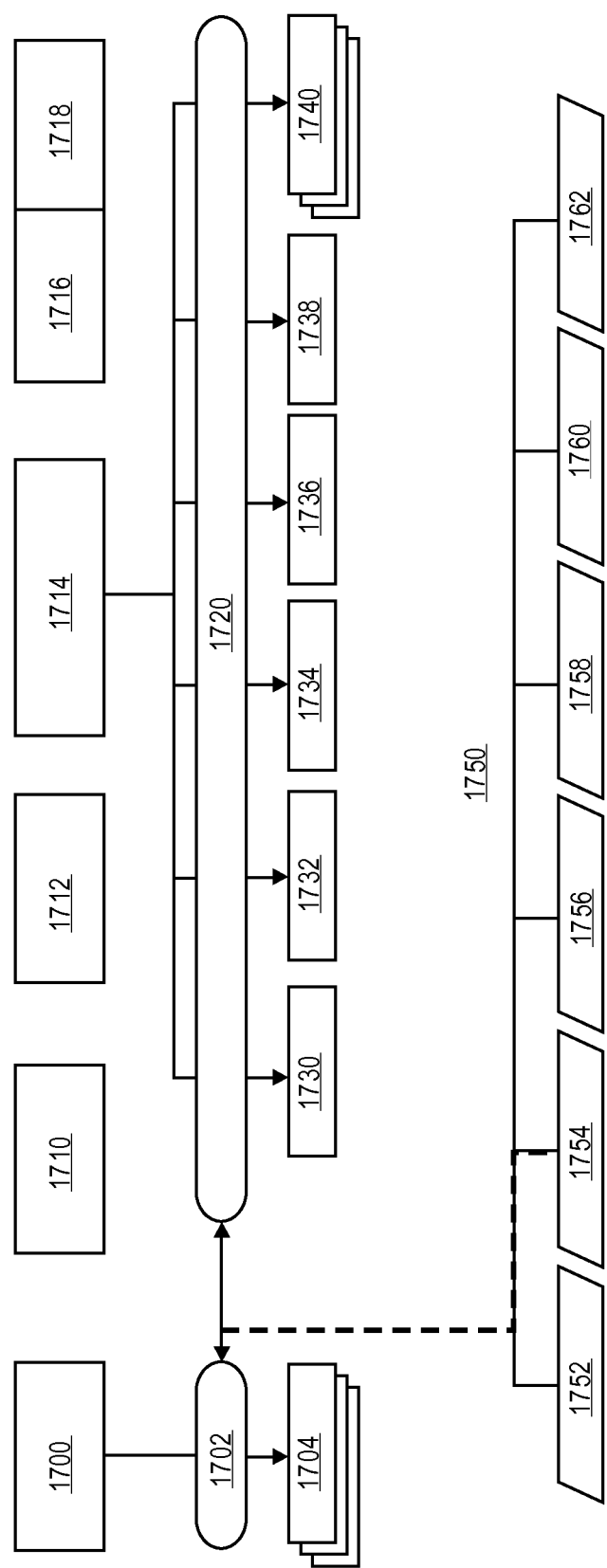
FIG. 17 illustrates for one embodiment of the invention a possible implementation of the platform key hierarchy for a single package secure enclave.

FIG. 17 illustrates for one embodiment of the invention a possible implementation of the platform key hierarchy for a single package secure enclave. The out of the box base key 1700 can be derived 1702 from the available derivation resources 1750 to generate the out of the box key 1704. The available derivation resources 1750 is a string with elements including fixed values 1752, owner epoch 1754, secure enclave security version 1756, The SECS measurement registers 1758, the ISV security version 1760, and SECS flags 1762. The provisioning key 1710 can prove the authenticity of a platform to the Intel backend. The EPID ID 1712 is a signing key. The initial safeID key blob 1718 is a quote and is associated with the safeID seed 1716. The base ops key 1714 can combine with the information from available derivation resources 1750 to derive 1720 a series of keys, including the enclave key 1730, permit key 1732, license key 1734, report key 1736, authentication key 1738, and seal key 1740.

Some embodiments of the invention enable the multiple secure enclave packages within the same platform or system to create a common key between them, thereby enabling a plurality of packages within the same system or platform to work seamlessly and securely together. In one embodiment, it also enables system managers to group or configure packages together into a secure bundle. In one embodiment, a secure multi-package key is created by providing package-specific key information to each package from a trusted source and enabling them to negotiate and securely store a common multi-package key.

The Secure Enclaves instructions and data structures rely on the Base Keys as a source for keying material. The Platform Key Hierarchy shown in Table 12-1 describes the hierarchical relationship of the platform key material and how keys are derived from the Platform Root Key.

The Enclave Wrapping. Key, 1752 is a symmetric key used to encrypt the Secure Enclaves Control Structure (SECS) page while it is not protected inside the Enclave Page Cache (EPC). This key is only used by uCode.

The Permit Key, 1754, is used to provide authenticity and integrity over Permits, which contain capability and licensing information for an enclave. Permits are MACed to ensure their integrity while in transit to EINIT. This key used by EMKPERMIT uCode and EINIT.

The License Key, 1756, is used assert compliance with license policies not able to be evaluated by uCode. The License Key is used to produce an authenticated approval from the License Enclave that is evaluated by EINIT. This key used by EINIT uCode, and is available via EGETKEY to enclaves with the KEY_LICENSE Capability set.

The Report Key, 1758, is used to provide authenticity and integrity over Reports. Reports are MACed by the ERPEPORT to ensure their integrity while in transit to the Quoting Enclave. This key used by EREPORT uCode, and is available via EGETKEY to enclaves with the QUOTE Capability set.

The Auth Key, 1760, is an enclave specific key, and is used to provide authenticity and integrity over data transmitted from the Quoting Enclave to an ISV Enclave and enables enclave-to-enclave authentication on the same platform. The key is available via EGETKEY to all enclaves, and those enclaves with the ISV_AUTH Capability set can specify which key it requires.

The Seal Key, 1762, provides each enclave with a 128-bit key to encrypt their sensitive data. A number of sealing policies can be integrated into the seal key, providing ISVs with flexibility on what software can unseal their data. These keys are available to any enclave via EGETKEY, but individually a seal key is only available to an enclave that meets the seal policy requested.

The EPID ID, 1712, uniquely identifies the package. Its sole purpose is to enable the provisioning of Device Attestation Keys, which are EPID-based anonymous attestation keys. The EPID ID is only accessible to the provisioning enclave. The provisioning enclave will only provide it over a secured channel to an approved provisioning server, and only during the provisioning process, which is initiated by the user or operating system. This ID is available via EGETKEY to enclaves with the PROVISIONING capability.

The Provisioning Key, 1710, is used to prove authenticity of a platform to the Intel Backend, as well as to authenticate the current SE TCB running. By demonstrating access to the Provisioning Key, the provisioning server is assured that the enclave is indeed the device in possession of EPID ID, and is running at least the specified TCB security version. The Provisioning Key is unique to this package and the signer of the provision enclave requesting it. This creates a separation between provisioning infrastructures, if more than one is used on a single platform. This key is available via EGETKEY to enclaves with the KEY_PROVISION capability.

The Provisioning Seal Key provides the provisioning enclave with a 128-bit key to encrypt provisioning in a way that can be retrieved even after a change of ownership. This key is used to encrypt old EPID in order to prove the platform has not been revoked while acquiring new EPIDs. The Provisioning Key is unique to this package and the signer of the provision enclave requesting it. This creates a separation between provisioning infrastructures, if more than one is used on a single platform. This key is available via EGETKEY to enclaves with the KEY_PROVISION capability.

The ISV Out of Box (OOB) Experience Key, 1700, is a shared key between all Intel platforms and an ISV. This key is derived from the OOB Root uniquely to a specific ISV. ISVs will be able to purchase access to this key, allowing them to encrypt secrets to this key and placed in an OEM's hard disk image. These secrets will only be accessible to their code running safely in a secure enclave, and does not require the platform to go online or complete attestation key provisioning. These keys are available via EGETKEY to enclaves with the OOB Capability.

Provisioned keys are those critical keys to the Secure Enclave architecture, but are not derived from the platform keying material. These keys are provisioned from a provisioning server or offline techniques. The Device Attestation Key (DAK) is an anonymous signing key (EPID) use to attestation to the properties of individual enclaves. This can be used by an ISV during key or secret provisioning to ensure that sensitive information is only sent to protected instantiations of their untampered applications.

There are two sources for the Device Attestation Key. The preferred architecture ships with an initial DAK compressed in fuses as the EPID Key Blob and EPID Entropy. This enables the platform to perform attestations immediately after the first power on. The second source is by contacting the DAK provisioning server and downloading one after proving the legitimacy of the hardware using the EPID ID and Provisioning Key. This second method is used by platforms, which do not have fused EPID keys as well as any platform after we revoke a version of the underlying TCB. The EPID fuses are accessible via EGETKEY to enclaves with the PROVISIONING capability.

The Platform Attestation Key (PAK) provides an optional additional level of privacy. Certain uses of the DAK can be associated. Specifically if an ISV enclave has the Name Based Attestation capability, then that single ISV can determine if a given EPID is revisiting that service. (Multiple ISVs cannot collude to track users, however). Since the DAK is bound to the platform, rather than the owner, this association continues through waterfall events. Therefore some users will prefer to use their DAK to assert the legitimacy of their platform to a third party that will issue a PAK to use for daily attestations. In multi-package platforms the DAK's of each package is used to establish the PAK, which represents the whole of the platform in attestations.

Key derivation for user accessible keys shall comply with NIST Special Publication 800-108 (Recommendation for Key Derivation Using Pseudorandom Functions). In the construction of a key derivation function, a Pseudorandom Function (PRF) is needed. The PRF shall be based on the AES-CMAC algorithm as defined in NIST SP 800-38B, Recommendation for Block Cipher Modes of Operation— The CMAC Mode for Authentication, May 2005. (http://csrc.nist.gov/publications/nistpubs/800-108/sp800-108.pdf). The key derivation generally looks like the following:

$$\text{Derivative Key} = PRF_{ParentKey}(\text{Derivative String})$$

The derivative string is composed of a subset of 8 elements based on the specific key being requested. Table 12-2 describes each available element that may be part of a derivation.

TABLE 12-2

Available Derivation String Elements

| | Description | Purpose |
| --- | --- | --- |
| Debug | The fixed string "DEBUG" indicates the requesting enclave is in Debug Mode | Provide cryptographic separation between keys in Debug enclaves and production |
| Fixed String | A fixed string based assigned to each key. For example the Enclave key's string is "ENCLAVE." | Provides key separation. For example, no EGETKEY request to Seal can derive the MAC key or Provisioning key. |
| Owner Epoch | Owner Epoch value | Provides separation of keys between platform owners. By establishing a new Owner Epoch, none of the previous Owners keys are derivable. |
| TCB Security Version | Security Version of the SE. Only current or previous TCBs will be derived. The TCB security versions are stored as a 64 bit TCB SVN value. This value is not architecturally visible or defined, but contains the security versions of each TCB layer in it. | Provides separation between SE TCB versions. This prevents compromised HW underpinnings from retrieving keys from newer versions, but allows new enclaves to retrieve user data from before the upgrade. |
| ISV Security Version (SVN) | Security Version of the Enclave assigned by the ISV and the Permit Architectural Enclave. Only current or previous versions will be derived. The ISV's assigned security version is a 32 bit value that much be mathematically comparable between versions using a simple greater than or equal to test. Therefore the ISV may not attempt to split it into multiple version components. | Provides separation between Enclave and Architectural Enclave versions. This prevents compromised enclaves from retrieving keys from newer enclave version, but allows new enclaves to retrieve user data from before the upgrade. |
| MR.EADD | The current value of the Measurement Register MR_EADD. | MR_EADD includes the measurement of the contents of the enclave at its initial launch. This allows for the creation of a Sealing key only available to enclaves |

TABLE 12-2-continued

Available Derivation String Elements

| | Description | Purpose |
|---|---|---|
| MR.Policy | The current value of the Measurement Register MR_POLICY | containing this particular set of trusted functions. MR_POLICY includes the hash of the signing key used to sign an Authenticated Enclave. This allows for the creation of a Sealing key only available to enclaves signed by the same key as this key. |
| Random | 256 random bits. | Then adds entropy to the derivation process. This is useful for preventing key wear out, adding additional access controls to a secret such as a user password. |

Each key has a predefined set of derivation elements, which will compose the derivation string. Table 12-3 describes which elements are included in each of the keys from the key hierarchy. Each column represents a key, and the rows indicate whether a specific element is included in that key. The Debug string is included if the SECS of the requesting enclave indicates it's in debug mode, and "Request" indicates that this element is not required, but is selectable in the request to derive the key.

TABLE 12-3

Key Derivation String Compositions

| Source | Debug "0xFF" | Fixed String Key Dependant | Owner Epoch Owner Epoch | TCB Version Y = TCB Version Reg R = REQ⇒TCB Versn | ISV Version Y = SECS R = REQ⇒ISV |
|---|---|---|---|---|---|
| Enclave Wrap | N/A | Yes | Yes | Yes | No |
| Permit | N/A | Yes | Yes | Yes | No |
| License | If Debug | Yes | Yes | Yes | Yes |
| Report | If Debug | Yes | Yes | Yes | No |
| Seal | If Debug | Yes | Yes | Request | Request |
| Auth | If Debug | Yes | Yes | Yes | Yes |
| ISV Auth | If Debug | Yes | Yes | Yes | Yes |
| OOB | If Debug | Yes | Yes | Yes | No |
| Provisioning | If Debug | Yes | No | Yes | Yes |
| Provisioning Seal | If Debug | Yes | No | Yes | No |
| EPID ID | If Debug | Yes | No | No | No |

| Source | MR EADD SECS⇒MR_EADD If ISV Auth, then REQ⇒Random | MR Policy SECS⇒MR_Policy | Random Req⇒Random |
|---|---|---|---|
| Enclave Wrap | No | No | Yes |
| Permit | No | No | Yes |
| License | No | No | Yes |
| Report | No | No | Yes |
| Seal | Request | Request | Yes |
| Auth | Yes | No | No |
| ISV Auth | Request | No | No |
| OOB | No | Yes | No |
| Provisioning | No | Yes | No |
| Provisioning Seal | No | Yes | No |
| EPID ID | No | Yes | No |

Secure Enclaves supports techniques for isolation and recovery of software compromise at several points in the boot sequence. In order to support isolation, all long term keying material provided to enclaves is derived using the security versions of the current TCB.

This section describes an example architecture for a platform whose recoverable TCB is composed of uCode, MCHECK, and microcode extensions (or a uVMM) will be described. The hardware requirements are the same for any SE supporting platform, however the exact key flow is dependent on the specific TCB elements. Other platforms can be supported using similar techniques to those applied here. For platforms supporting Patch-at-Reset, this mechanism compliments Patch-at-Reset to enable full recovery of uCode, including evidence of upgrade and cryptographic separate between uCode revisions.

The following keys are required in hardware to support a CPU-based protection technology. These keys are the foundation of the TCB Key Hierarchy.

Stepping-Specific 256-Bit Logic Key:

The 256-bit logic key is broken into two parts—128-bit fuse wrapping key, and 128-bit out-of-box experience key. It is possible to use a single 128-bit key for both, however, that adds more uCode.

Die-Specific 544 Bits of Fuse Key:

These include 32 bits of group id, 256 bits of SafeId A.x value, and 256 bits of pre-seed. The A.x value and the 256-bit pre-seed are encrypted with the 128-bit fuse wrapping key described above.

Temporary Registers:

The key-derivation process requires the keys be stored and on the package and available only to uCode. Two 128 bit registers are needed for the duration of platform runtime. An additional 256 bits of space are needed for the EPID key until CMA is up and running. After which the additional 256 bits are no longer needed in the CPU.

TCB SVN Register:

This register is a 64 bit lockable register that is sub-divided to hold SVNs for each TCB layer. Specific subdivision is at the discretion of the platform designers, but 8 8 bit SVNs would be reasonable. Each section of this register may be independently lockable.

The binding of keys to a specific set of TCB version is achieved by having the uCode derive a first set of keys from the fused key, based on the type of boot sequence that will commence (i.e. Patch at Reset or Patch later). After this the fuses are locked, and a chain of derivations occurs at each load in the boot sequence.

After the low level code is loaded, the chain continues to include the ISV assigned security version for the software running in the enclave. For any specific configuration, keys derived from the current version are accessible, as well as keys from previous configurations. This enables seamless user data transitions to newer non-vulnerable versions.

Once the die-specific key is generated, it is encrypted with the key wrapping key. This increases the difficultly of extracting the keys with hardware monitoring tools as well as provide protection for the keys in transit before being deposited in the part.

The crypto algorithm used to encrypt these keys is 10 rounds of 128 bit AES-ECB decrypt. The key generation server will apply AES-ECB encrypt to each key to generate a cipher text key that will be burned in fuses.

The Pseudorandom Function (PRF) used for key derivation in the TCB Key Hierarchy is platform specific. We recommend 128 bit AES-ECB for platforms supporting AES-NI. The goal is to provide a non-reversible way to derive keys from other keys. For this section we use the following functional prototype.

void $PRF(uint128*key, uint128*string, uint128*key\_out)$ {

1. Use AES-ECB to encrypt using key key
2. Return resulting cipher text to key_out There are three ways to PRFs are used in key derivation. The PRF Loop Derivation is used to inject the uCode SVN into a key, while establishing a relationship between keys of different SVNs. Specifically:

$$PRFLoop(x-1)=PRF_{PRFLoop(x)}(\text{const})$$

This provides forward migration of data. Take the example of running uCode SVN 3. An enclave uses EGETKEY to retrieve a seal key based on this version (PRFLoop(3)), and seals data with it. An in the field uCode patch upgrade is delivered and the next boot the uCode SVN is 4. After the upgrade, the EGETKEY implementation will have access to PRFLoop(4). When the enclave requests the SVN 3 key from EGETKEY, it can compute $PRFLoop(3)=PRF_{PRFLoop(4)}$ (constant) and therefore retrieve the old seal key.

In order to establish this property, a loop of PRFs is used, however because of the property PRFLoop(x-1) is computed from PRFLoop(x), we need to establish a maximum SVN and count back from it. The specific maxes will need to be established for each platform type based on likelihood of patch and required performance. We recommend a 32 as the initial max point.

Application of a PRF Loop Derivation generally looks like the following:

```
// Inject the uCode SVN into the uCode key.
for (i=MAX_UCODE_SVN; i > ucode_svn; i--)
    PRF(&key_registers[SVN_KEY_REG],CONSTANT,
            &key_registers[SVN_KEY_R
        EG]);
```

This method will be used to inject uCode's SVN into the SVN key, which will be the underlying key behind the SE base keys. The die-specific key in fuses contains 288 bits of EPID values and a 256 bit of random key. All non-ephemeral symmetric keys may be derived from these 256 bits, which is composed of 2 128 bit keys. Therefore a technique may be created for deriving multiple keys from a single key. To do this, after the fuse key is decrypted, we use it to call PRF using different fixed constants.

Application of a key splitting generally looks like the following:

```
// Populate key_registers with 2 keys derived from fusekey
PRF(source, CONSTANT1, C_key1);
PRF(source, CONSTANT2, C_key2);
```

This technique is used to generate random numbers used as part of the EPID ID and a provisioning ID.

Once the SVN key has been loop derived based on the uCode SVN, it can be store away in protected memory such as the SE CMA. Extended microcode will use an MSR exposed to extended microcode only to derive keys from the SVN Key. The MSR takes a key selector that indicates whether the basis for the derivation is the global out of the box key or the fuse key, and a set of requested SVNs for each TCB layer. It verifies the request is less than or equal to the current values. UCode applies any necessary PRF's to retrieve an old SVN keys, and the PRFs the requested TCB SVNs.

```
// Apply further derivations for requested svn
if (keyselector == 0x00)
    tmp_svn_key = key_registers[SVN_KEY_REG];
else
    tmp_svn_key = key_registers[GlobalKey_REG];
for (i=ucode_svn; i > requested_ucode_svn; i--)
    PRF(&tmp_svn_key, CONSTANT, &tmp_svn_key);
svn_base_key = PRF(tmp_svn_key, requested_tcb_svns);
```

Once the proper SVN key is available, it is used as the key for a CMAC over the requested TCB SVN's. Extended microcode then uses this as a CMAC key over the SE Ops Seed (a value derived from the portion of the fuse key not known by Intel) for the Ops key, or a fixed string for the Provisioning Base Key.

$$se\_base\_key=CMAC(svn\_base\_key, se\_ops\_seed);$$

Figure 18:
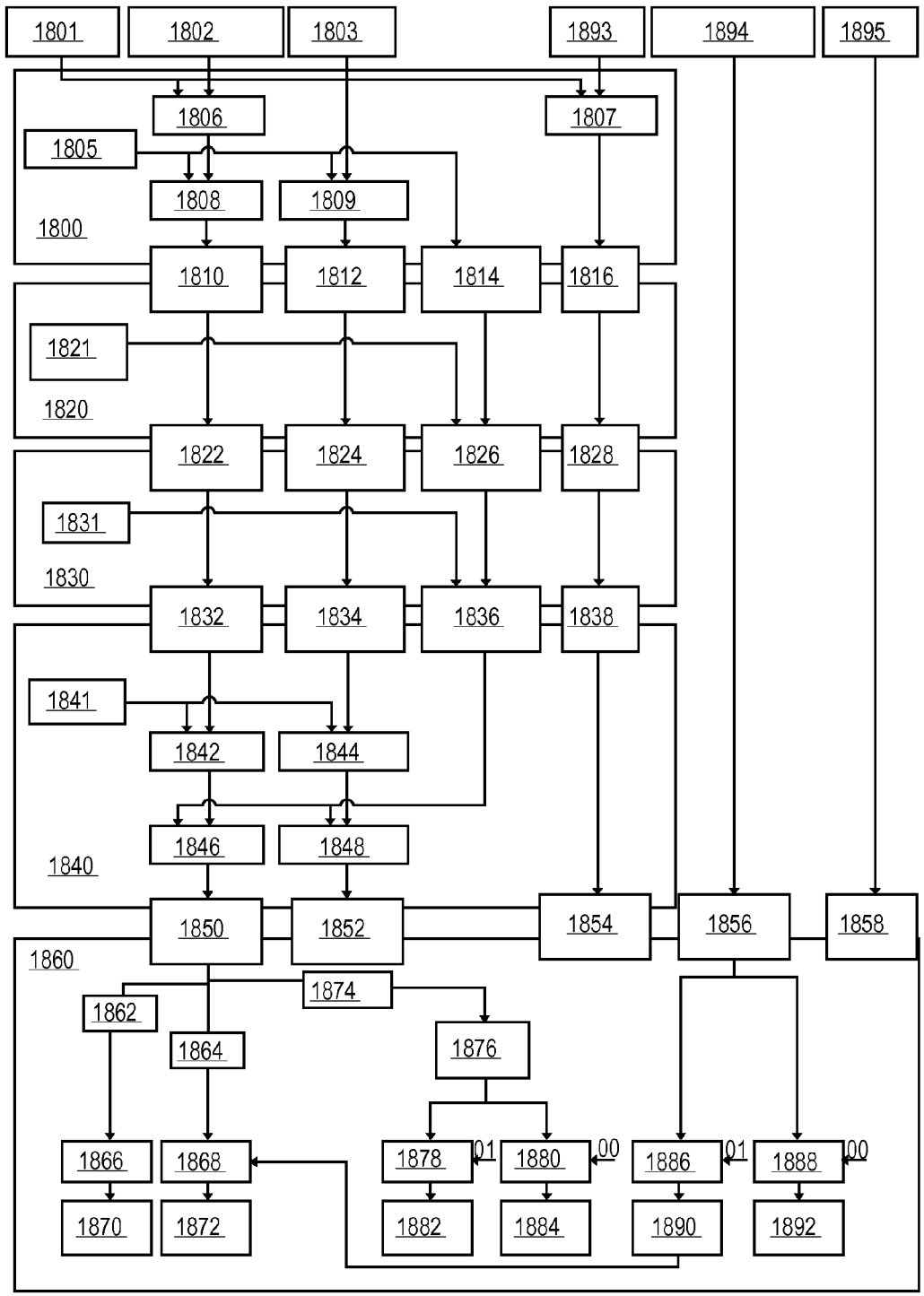
FIG. 18 illustrates an example of a microcode based secure enclave key hierarchy in one embodiment of the invention.

FIG. 18 illustrates an example of a microcode based secure enclave key hierarchy in one embodiment of the invention. In the reset microcode 1800 hierarchy, global wrapping logic key 1801 and Intel known unique root fuse 1802 are inputs to the unwrap 1806 function. The output of the unwrap 1806 and the microcode SVN 1805 enter a PRF loop 1808. The microcode SVN 1805 and the global root logic key 1803 enter another PRF loop 1809. The output of PRF loop 1808 is stored in the SVN key 1810 register. The output of PRF loop 1809 is stored in the global key register 1812. The microcode SVN 1805 is stored in the TCB SVN Register 1814. The global wrapping logic key 1801 and the SE EPID A.x fuses 1893 are inputs to the unwrap 1807 function and the results are stored in the SE EPID 1816 register. In the MCheck 1820 hierarchy, the MCheck SVN 1821 and the output of the TCB SVN register 1814 are stored in the TCB SVN register 1826. The SVN key register 1810 is stored in the microcode SVN register 1822. The global key register 1812 is stored in the global key register 1824. The SE EPID 1816 is stored in the SE EPID 1828. In the load microcode 1830 hierarchy, the microcode SVN 1831 and the output of the TCB SVN register 1826 are stored in the TCB SVN register 1846. The microcode SVN register 1822 is stored in the microcode SVN register 1832. The global key register 1824 is stored in the global key register 1834. The SE EPID 1828 is stored in the SE EPID 1838. In the XuMSR derive key 1840 hierarchy, the microcode SVN difference 1841 enters the PRF loop 1842 and PRF loop 1844. The microcode SVN 1832 register sends data to the PRF loop 1842, and the global key register 1834 sends data to the PRF loop 1844. The output of PRF loop 1842 and the output of the TCB SVN register 1836 enter a PRF loop 1846, and the output of PRF loop 1844 and the output of the TCB SVN Register 1836 enter a PRF loop 1848. The output of PRF loop 1846 is stored in SVN base key 1850, and the output of PRF loop 1848 is stored in global key 1852. In the microcode 1860 hierarchy, the Intel not known unique root fuse 1894 is stored in the seed1 1856 while the EPID group ID fuses are stored in EPID rroup 1858. The seed1 1856 enters PRF loop 1886 and PRF loop 1888. The output of PRF loop 1888 is the SE EPID Seed 1 1892. The output of the PRF loop 1886 is the SE ops seed 1890. The SE ops seed 1890, which comes from the SVN base key 1850, and the requested SVN 1864 enter a CMAC 1868 function to generate the SE ops key 1872. The current SVN 1862, which comes from SVN base key 1850, enters a CMAC 1866 function to generate the SE provisioning key 1870. When the SVN base key is equal to {0,0,0} 1874, the SVN base key 1850 is stored in the seed0 1876. The seed0 1876 enters the PRF loop 1878 and PRF loop 1880. Output of PRF loop 1878 is the SE EPID ID 1882, and output of PRF loop 1880 is SE EPID seed0 1884.

All cores synchronize and ensure they are all in MCHECK using doorbells or similar mechanisms. Once all the cores are executing MCHECK, following steps are taken by the BSP. AP's do not participate in the key flow:
1. uCode reads, decrypts, and locks fuses.
2. uCode applies a PRF Loop on the SVN key, and PRF loop on the DOBE key injecting the uCode's SVN into both keys. uCode writes it's SVN to the TCB SVN register and locks that portion
3. MCHECK loader or early MCHECK code writes MCHECK's SVN to the TCB SVN register and locks it.
4. Microcode extensions patch loader writes the microcode extension patch SVN to the TCB SVN register and locks it.

Either during extended microcode initialization or upon calling EGETKEY, extended microcode calculates the SE Base Keys needed to satisfy requests. The Base Keys may be cached in the CMA for further use for increased performance. Table 12-4 describes how the base keys are computed.

TABLE 12-4

Base Key Computations

| Base Key Name | Key Computation |
|---|---|
| Base Ops Key | current_svn_bask_key = XuMSRDeriveBaseKey(0x00, svns) Seed1 = Fuses, not encrypted or locked. SE Ops Seed = PRF(Seed1, 0x01); = CMAC(current_svn_base_key, SE Ops Seed) |
| Previous Ops Keys | Prev_svn_bask_key = XuMSRDeriveBaseKey(previous svns) = CMAC(svn_base_key, SE Ops Seed) |
| Initial EPID (DAK) Key Blob | =EPID Register |
| EPID (DAK) Entropy | Seed0 = XuMSRDeriveBaseKey(0,0,0) Note: Initial products ship with version SVN 1. Lower bits = PRF(Seed0, 0x00); Upper bits = PRF(Seed1, 0x00); |
| Provisioning Base Key | current_svn_bask_key = XuMSRDeriveBaseKey(previous svns) = CMAC(current_svn_base_key, PROV_STRING) |
| Base EPID ID | =PRF(Seed0, 0x01); |
| Out of the Box (OOB) Base Key | =XuMSRDeriveBaseKey(0x01, currentSVNs) |

In order to protect user privacy and data across platform waterfalls, a 256-bit random Owner Epoch is included in the derivations of key. This value is created randomly during ownership change. Prior to the use of enclave keys software may write the OwnerEpoch to the SE_EPOCH_MSR. This can be achieved by the BIOS, which stores it persistently in flash. It can be calculated from some user input, such as the hash of a user boot password. It can also be provided by a Secure Enclaves driver prior to allowing enclave use.

Confidentiality of this value is required to ensure that data encrypted by the platform cannot be decrypted in the originally authorized enclave by someone in possession of the laptop after a waterfall. Compromise of this value does not result in the compromise of any enclave data.

The SE Key Info structure is a non-persistent structure stored in a protected area of memory or the package. The CMA is the most likely location, but any on die protected storage is also ok. During Power on, the SE Key Info is initialized. KeyID is set to a random value, and Key Count is set to 0. On each use of the Enclave Key, Permit Key, and Report key the KeyID read, and the Key Count is incremented. After 2^32 key uses, the KeyID is changed to a new random value, and Key Count is reset to 0. The SE Key Info layout is shown in 5.

TABLE 12-5

SE Key Info

| Field | Byte Offset | Byte Length | Description |
|---|---|---|---|
| KeyID | 16 | 16 | Random version # used in key derivation algorithm. The KeyID is preset to a random value each time the platform key table is initialized. KeyID is incremented each time the Key Count rolls over 2^32. |

TABLE 12-5-continued

SE Key Info

| Field | Byte Offset | Byte Length | Description |
|---|---|---|---|
| Key Count | 32 | 4 | #of AES blocks processed by current derived key. Key Count is set to zero each time the KeyID is initialized or incremented. The KeyCount is incremented by one for each AES block processed. |
| Lock | 36 | 1 | Compare-Set lock byte to synchronize access to the structure. |

On power-on, the Platform Key Table is initialized by uCode. BIOS or other host firmware acquires the current Owner Epoch either from persistent storage or from the user and writes it to the LoadOwnerEpochMSR. At this point the enclave key hierarchy is available.

Much of the enclave's architecture relies on the use of keys to provide authentication and confidentiality of enclave data, and in order to keep the processor complexity to a minimum Architectural Enclaves are used to process these keys for high level usages. E.g. The Quoting Enclave uses the REPORT key to establish that a REPORT structure generated by the EREPORT instruction was created on the platform, and the PERMITING enclave uses the PERMIT key to create an enclave PERMIT which is consumed by EINIT when an enclave is being launched.

In addition any application level enclave needs access to a key to seal secrets which are stored on the platform outside the enclave, and will be unsealed when the application enclave is re-established—even across power cycles.

The mechanism for doing this is the EGETKEY instruction. It is the single interface for establishing secrets about the current software environment.

EGETKEY currently provides access to the following keys:
 PROVISIONING KEY ID—used by the Architectural Provisioning Enclave for identifying datablobs which have been uniquely encrypted (using the PROVISIONING KEY) for the processor.
 PROVISIONING KEY—used by the Architectural Provisioning Enclave to decrypt data blobs which have been uniquely encrypted for the processor.
 PROVISIONING SEAL KEY—used by the Architectural Provisioning Enclave to encrypt the EPID such that the enclave can decrypt it even after an owner change.
 PERMIT KEY—used by the Architectural Permitting Enclave to create PERMITs.
 REPORT KEY—used by the Architectural Quoting Enclave to verify REPORT structures.
 ISV AUTH KEY—used by the Architectural Quoting Enclave to create authentication data for a particular target application enclave.
 AUTH KEY—used by an application enclave to authenticate data sent to it by the Architectural Quoting Enclave.
 SEAL KEY—used by the application enclaves to encrypt data it wishes to store outside the enclave
 OOB EXPERIENCE KEY—used by ISVs for pre-provisioning encrypted data for out-of-box experience usages (e.g. BluRay players).

Most of these values do not reside in the processor in the raw, but are in fact derived on demand by EGETKEY from a single fuse key value. They are derived on demand as each of these keys are not a single key but are in single key from a possible set. The particular key delivered depends on a number of parameters, some of which are user selectable, others are based on the system or particular state.

In order to select the key a KeyRequest structure is used as an input to the EGETKEY instruction. As well as selecting the key the user wants the KeyRequest structure allows the caller to specify those variables under his control which he wishes to be used in the creation of the key. The figure below specifies the KeyRequest structure:

TABLE 12-6

Key Request Structure

| Offset (Byte) | Size (Bytes) | Name | Description |
|---|---|---|---|
| 0x00 | 0x02 | KeySelect | Identifies the Key Required |
| 0x02 | 0x02 | KeyPolicy | Identifies which inputs are required to be used in the key derivation |
| 0x04 | 0x04 | ISVSecVersion | Identifies which Security Version for the Enclave may be used in the key derivation |
| 0x08 | 0x08 | TCBSecVersion | Identifies which Security Version for the TCB that may be used in the key derivation |
| 0x16 | 0x32 | Randomness | Provides a random 256 bits value to be mixed into the key during derivation. |

KeySelect is used to identify the key the user requires, and KeyPolicy is used to establish which additional values are used in creating the key—whether that be a particular security version of the architectural enclaves, or a particular version of an application enclave, or the measurement registers associated with the current enclave (when EGETKEY is called from within an ENCLAVE).

Additional randomness can also be added to the key derivation, this particularly required to prevent wearing of keys, and is used by the PERMITING and QUOTING architectural enclaves. It would also be used by the application enclave when creating SEALing keys. Setting the field to zero indicates that no additional randomness is to be added, otherwise the field points to a 256 bit aligned data value. The figure below specifies the structure for the KeySelect field.

TABLE 12-7

Key Request Key Value Structure

| Bits | Name | Description |
|---|---|---|
| 15:12 | RESERVED | MAY BE ZERO |
| 11:00 | KeyName | Numerical value identifies the key required.<br>0x0000 - Out-of-Box Experience Key<br>0x0001 - Provisioning DID<br>0x0002 - Provisioning Key<br>0x0003 - Permit Key<br>0x0004 - Report Key<br>0x0005 - Auth Key<br>0x0006 - ISV Auth Key<br>0x0007 - Seal Key<br>0x0008 - EPID Key Blob<br>0x0009 - EPID Entropy<br>0x000A - Provisioning Seal Key<br>0x000B:0x07FF - RESERVED |

KeyPolicy is a bit field selector and is used to determine if a particular value, either from the user or the system state is to be used in deriving the key.

TABLE 12-8

Key Request Policy Structure

| Bit | Name | Description |
| --- | --- | --- |
| 15:02 | RESERVED | Reserved. May be Zero |
| 01 | MR_POLICY | Derive key using the enclave's POLICY measurement register |
| 00 | MR_EADD | Derive key using the enclave's EADD measurement register |

Enclave Registers and Control

TABLE 14-1

SE Register layout

| Register Address | Register Name Field and Flags | Bit Description |
| --- | --- | --- |
| SE_BASE_MSR_ADDR | EnclaveCTL_MSR | |
| | 0 | Disable SE Once this bit is set. The system may be reset to re-enable enclaves. |
| | 1 | SE Owner Epoch Lock Once this bit is set. The system may be reset to re-enable enclaves. Furthermore, SE_EPOCH_MSR_0-3 cannot be changed and any attempts to read SE_EPOCH_MSR_0-3 will result in 0x0 being returned |
| | 63:2 | Reserved |
| SE_BASE_MSR_ADDR + 1 | SE_EPOCH_MSR_0 | OWNER_EPOCH 63:0 |
| SE_BASE_MSR_ADDR + 2 | SE_EPOCH_MSR_1 | OWNER_EPOCH 127:64 |
| SE_BASE_MSR_ADDR + 3 | SE_EPOCH_MSR_2 | OWNER_EPOCH 191:128 |
| SE_BASE_MSR_ADDR + 4 | SE_EPOCH_MSR3 | OWNER_EPOCH 255:192 |

Two enabling levels are provided for enclaves. The first enable is an opt in bit set by the BIOS. It is a write once function. It enables or disables enclave capability until the next reset. The second enable is provided to the OS or VMM to turn enclave capabilities on or off dynamically as needed.

Figure 19:
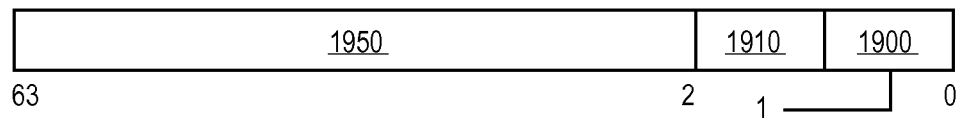
FIG. 19 is a diagram for the enclave CTL_MSR register, which can be found in one embodiment of the invention.

FIG. 19 is a diagram for the enclave CTL_MSR register, which can be found in one embodiment of the invention. The least significant bit is the Enable 1900. Bit 1 of the register is On 1910. Bits 2 through 63 are reserved.

The Enclave capability is enabled by first setting the Enable bit in the EnclaveCTL_MSR shown in FIG. 19. This bit defaults to disable when package reset occurs. This bit can be written once after a package reset. BIOS sets the bit to enable enclaves. If BIOS clears the bit then enclaves cannot be enabled until the part is reset.

Software can detect support for enclaves by executing the CPUID instruction. CPUID will return a result indicating whether enclaves are supported or not.

If the Opt in bit is cleared then CPUID reports that enclaves will not execute.

System software controls enclave capability using the EnclaveCTL_MSR shown in FIG. 19. The On bit allows software to dynamically control access to the enclave capability.

Software can detect support for enclaves by executing the CPUID instruction. Enclave support is indicated if the ON bit in the EnclaveCTL MSR is set The TCSMSR register is a register on each processor which contains the address of the TCS. It is used by exception handling and the RDTCSPTR. It is loaded when entering the enclave. The register is loaded with the value of the TCS when EENTER is executed. It is read by ERDTCSPTR. The register size is based on the mode of the processor.

The enclave base address register on each processor contains the lower address of the enclave under execution. It is loaded when entering the enclave by the microcode. The register size is based on the mode of the processor. This register is not visible to the software. It is a microcode temporary.

The register holds the upper address limit of the current enclave. It is loaded when entering the enclave. The register is loaded with a value stored in the SECS when the enclave starts execution. It is a microcode temporary register. Register size is based on the mode of the processor.

The Enclave Page Cache (EPC) Maximum Size Register indicates the maximum size of the EPC. This size is given in the number of 4096 byte pages. It is a 32-bit register. This register is read only to indicate the largest size EPC supported in the current design.

The EPC Size Register EPC_SIZE MSR indicates the currently defined size of the EPC. Loading the register results in an EPC defined to the size. The value is given in 4096 bit pages. For example, one 4096 bit page would be a 1. The value of the register cannot exceed EPC_MAX value. If the value exceeds the EPC_MAX value a GP fault is taken by the WRMSR instruction. Writing to this register will invalidate all data in the EPC prior to the write. Software may save all EPC entries (if needed) before updating this register.

The EPC base register indicates the location of the base of the EPC. Writing to this register will invalidate all data in the EPC prior to the write. Software may save all EPC entries (if needed) before updating this register.

In general no external interfaces shall allow any transfer or transaction which can compromise the security of enclaves. Secure Enclaves requires random numbers for the enclave keys. Random bits are generated using the digital random number generator. The random number generator may be securely accessible by the microcode. It does not need be located in the part's core.

Figure 26:
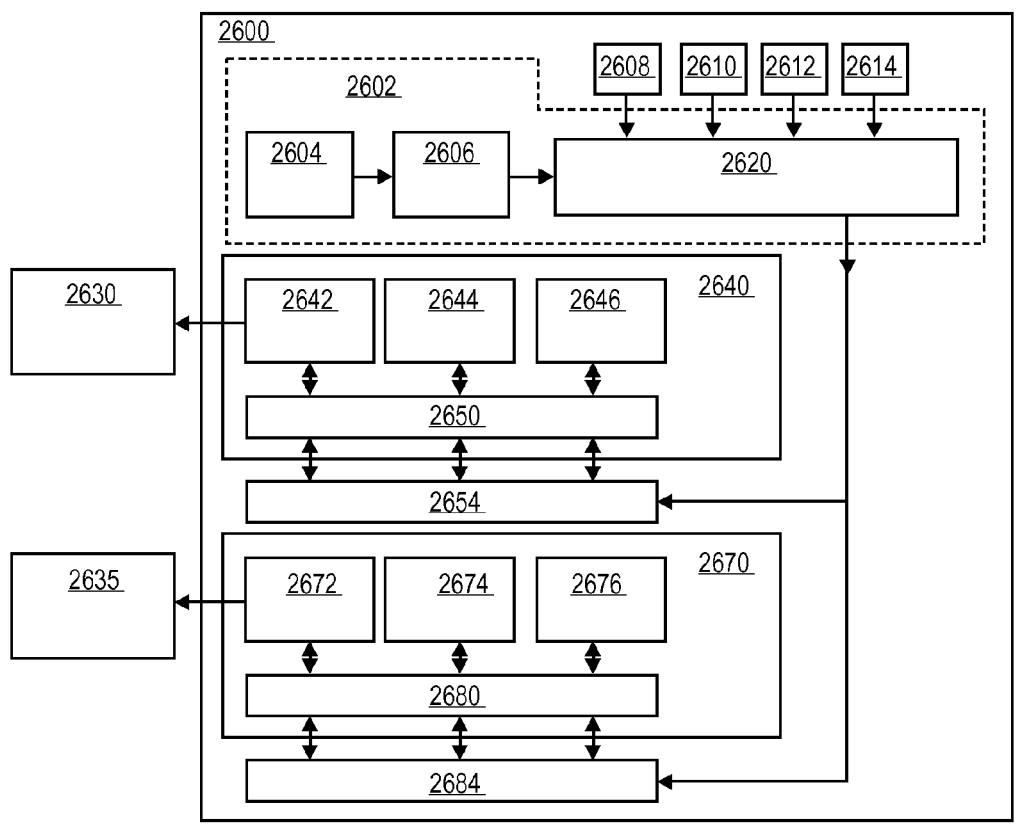
FIG. 26 illustrates, for one embodiment of the invention, the processor package for a digital random number generator.

FIG. 26 illustrates, for one embodiment of the invention, the processor package for a digital random number generator. The processor package 2600 could contain multiple cores, Core0 2640 and Core1 2670. Core0 2640 can contain external instruction microcode 2642, internal function microcode 2644, internal function microcode 2646, RNG microcode module 2650, and RNG queue 2654. Core1 2670 can contain external instruction microcode 2672, internal function microcode 2674, internal function microcode 2676, RNG microcode module 2680, and RNG queue 2684. Read random instruction 2630 can communicate with external instruction microcode 2642, while read random instruction 2635 can communicate with external microcode 2672. The processor package 2600 could also include a DRNG 2602, which takes STD 2608, OPE 2610, PSK 2612, and TSC 2614. The DRNG 2602 can contain a digital entropy source 2604, which connects to online self tests 2606. The output of the online self tests 2606 could be one input of the combined conditioner/deterministic random bit generator (DRBG) 2620.

An enclave can be set as a debug enclave when it is created. The debug enclave will allow external access to the enclave contents using the EDBGRD and EDBGWR instructions. A debug enclave is set up by setting the debug flag in the ECREATE instruction. This bit is stored inside the SECS of the enclave.

Enclaves which are created with the debug bit clear are production enclaves. The EPC contains a debug bit which indicates that the enclave is a debug enclave. The enclave remains encrypted inside main memory or on disk. Debuggers needing to look at the enclave contents will load the memory into the EPC. The EDBGRD and EDBGWR instructions can be used to access enclave memory locations which reside in the EPC. A debug enclave does not require a permit in order to execute. It will execute without a valid permit.

Figure 27:
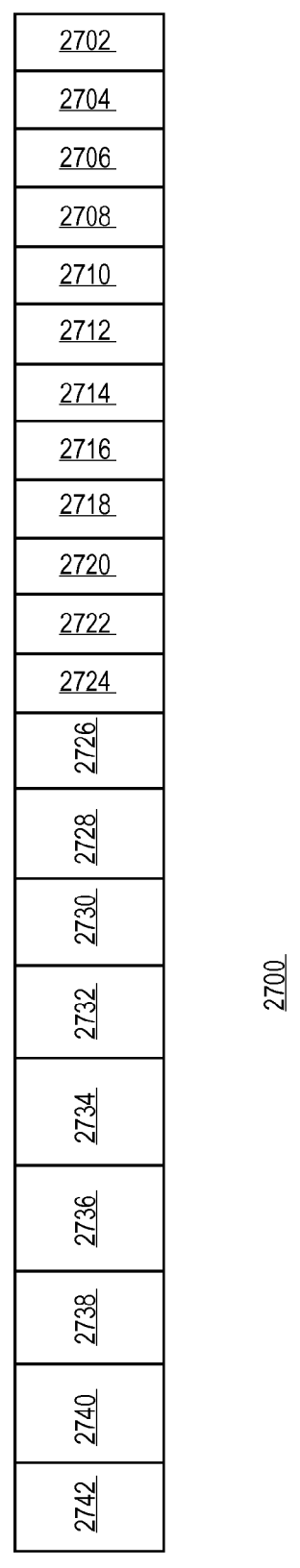

When entering a production enclave the debug control register, DR7 is saved in the TCS save area. DR7 is shown in FIG. 27. FIG. 27 illustrates, for one embodiment of the invention, a debug register DR7 2700. The register DR7 2700 contains bits L0 2702, L1 2706, L2 2710, L3 2714, G0 2704, G1 2708, G2 2712, and G3 2716. Other bits in the DR7 register 2700 include LE 2718, GE 2720, 001 2722, GD 2724, 00 2726, R/W0 2728, LEN0 2730, R/W1 2732, LEN1 2734, R/W2 2736, LEN2 2738, R/W3 2740, and LEN3 2742.

Bits L3-L0 and G3-G0 are set to zero value. DR7 is returned to its original value at enclave exit.

For debug enclaves, the debug register value is not changed. When RFLAGS.TF is set at the start of an EENTER instruction, there are two cases to be considered:

1. The debugger is a legacy (non SE-aware) or the enclave is in production (non-debug) mode.
2. An SE-aware debugger is targeting a debug-mode enclave.

In the first case, the #DB exception may occur on the target of the next EEXIT instruction. This treats the enclave as large, opaque operation. In the second case, the user has complete freedom to single step through the enclave. This behavior is supported by 3 data fields inside the enclave and special processing bf RFLAGS.TF on EENTER, EEXIT and EIRET.

TABLE 15-1

| | TF Flag Data fields |
|---|---|
| TCS::TF | Value loaded into RFLAGS.TF on EENTER |
| TCS::SAVE_TF | Location to save RFLAGS.TF on EENTER and restore on EEXIT |
| SSA::RFLAGS.TF | Location to save RFLAGS.TF on interrupt and restore on EIRET |

TABLE 15-2

| | Instruction behavior with TF |
|---|---|
| EENTER | TCS::SAVE_TF ← RFLAGS.TF |
| | RFLAGS.TF ← TCS::TF |
| | Trap on RFLAGS.TF |
| EEXIT | RFLAGS.TF ← TCS::SAVE_TF |
| | Trap on RFLAGS.TF |
| Interrupt | SSA::RFLAGS.TF ← RFLAGS.TF |
| EIRET | Temp ← RFLAGS.TF |
| | RFLAGS.TF ← SSA:RFLAGS.TF |
| | Trap on Temp |

The register value is saved in the TCS save area. The register is set to 0. At enclave exit the register is restored to the value at entry. If the enclave has branch trace enabled at entry the EENTER is the last entry before entering the enclave. When exiting the enclave the first location after the exit is written to the branch trace.

Int n and Int 3 instructions are reported as GP faults if executed inside the enclave. The debugger may hook the GP fault condition when debugging an enclave.

In this document we describe a novel technique for implementing the CMAC mode of operation for the AES block cipher. CMAC is a mode supporting message authenticity. It accepts as input a message A and a key K and returns an authentication tag T. The derivation of the authentication tag is done using the CBC (cipher block chaining) algorithm. CMAC is more complex than CBC because it includes mechanisms for protecting against length extension attacks. We refer to these as the 'three peculiarities of CMAC'. In what follows we provide an overview of CBC and CMAC.

Figure 20:
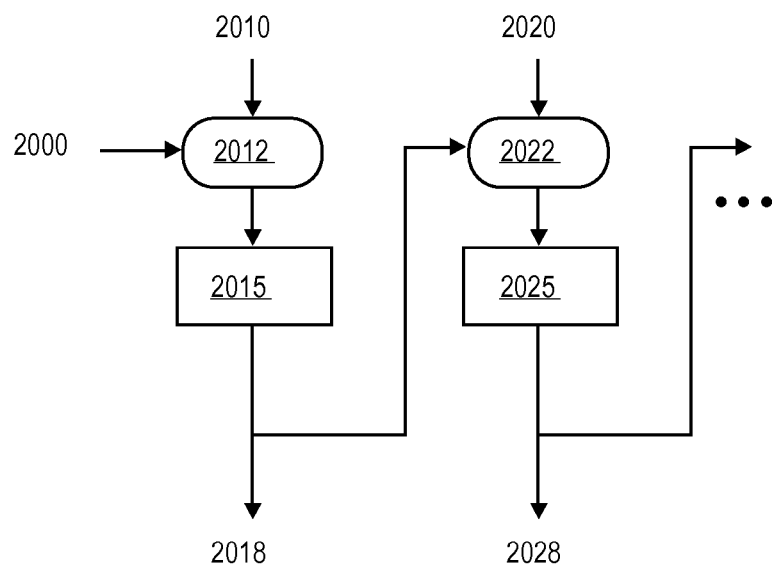
FIG. 20 illustrates the cipher block chaining algorithm used in one embodiment of the invention.

FIG. 20 illustrates the cipher block chaining algorithm used in one embodiment of the invention. The initialization vector 2000 and the stage-one input 2010 enter the exclusive-or gate 2012. The output of the exclusive-or gate 2012 enters the stage-one block cipher 2015. The stage-one block cipher output 2018 then enters the stage-two exclusive-or gate 2022 along with the stage-two input 2020. The output of the exclusive-or gate 2022 enters the stage-two block cipher 2025. The stage-two block cipher output 2028 then enters the next stage of the cipher block chain (not pictured).

The CBC algorithm utilizes a block cipher to provide confidentiality for some piece of data or to compute an authentication tag on this data. The main idea behind the CBC algorithm is that the output from the previous encryption is XOR-ed with the next input block before being encrypted. In this way patterns which may exist in the input data are eliminated in the ciphertext. Also the combination of the XOR operations between and the transformations of the block cipher provide strong mixing for deriving a message authentication tag which ideally is not forgeable.

The CBC algorithm is given below and illustrated in FIG. 20. The cipher is assumed to be a 128-bit block cipher as in the case of AES

| CBC(IV, X, CIPHER, K) |
|---|
| let IV be the initial value of the tag to be produced |
| let X = [$X_1, X_2, ..., X_n$] be the input in complete 128-bit blocks |
| $Y_0 \leftarrow IV$ |
| for i = 0 to n−1 do |
|     $Y_{i+1} = CIPHER_K(X_{i+1} \oplus Y_i)$ |
| $T \leftarrow Y_n$ |
| return Y,T |

The CMAC specification includes three additional algorithms for initializing and finalizing the CBC algorithm. We refer to these as the "three peculiarities" of CMAC. The first peculiarity concerns the derivation of two subkey values $K_1$ and $K_2$ from the symmetric key K. Subkeys $K_1$ and $K_2$ derive from an intermediate value L. CMAC specifies that L derives by applying the symmetric key block cipher transformation on a string consisting of zeros (i.e., $0^{128}$) using the symmetric key value K. Such relationship is shown in equation (1):

$$L = CIPHER_K(0^{128}) \quad (1)$$

Once L is derived the most significant bit of L is checked. If this is zero then $K_1$ derives from L by shifting by one bit position to the left. Otherwise L is shifted by one bit position to the left and also XOR-ed with a special value $R_b$ to produce $K_1$. $R_b$ is defiend as $<0^{120}10000111>$ in binary form. $K_2$ is produced from $K_1$ following the same procedure. The derivation of subkeys $K_1$, $K_2$ is given in pseudo-code below. By MSB( ) we mean the most significant bit of a value.

```
SUBKEYS( CIPHER, K)
    let L = CIPHER_K(0^128)
    let R_b = 0^120 || 10000111
    if MSB(L) = 0
        then K_1 ← L << 1
        else K_1 ← (L << 1) ⊕ R_b
    if MSB(K_1) = 0
        then K_2 ← K_1 << 1
        else K_2 ← (K_1 << 1) ⊕ R_b
    return K_1, K_2
```

The second peculiarity of CMAC concerns the padding that takes place before applying the CBC algorithm on the input data. If the last block of data is not a complete block then the block is padded with a bit equal to "1" followed by as many zero as needed so that the final block becomes complete.

The third peculiarity of CMAC concerns a modification on the last block that takes place in order to avoid length extension attacks. If the last block is a complete one (no padding required) then the last block is XOR-ed with the subkey $K_1$. Otherwise it is XOR-ed with the subkey $K_2$.

The algorithms for CMAC tag generation and validation are listed below:

```
CMAC-GENERATE(X, length, K)
    (K_1, K_2) ← SUBKEYS(AES,K)
    if length = 0
        then
            n ← 1
        else
            n ← ⌈length/128⌉
    let X = [X_1, X_2, ..., X_n] be the input in 128-bit blocks
    if X_n is complete
        then
            X_n ← X_n ⊕ K_1
        else
            X_n ← (X_n || 1 || 0^{128·n−length−1}) ⊕ K_2
    (Y,T) ← CBC(0^128,X,AES,K)
    return T
CMAC-VALIDATE(X, length, K, TAG)
    (K_1,K_2) ← SUBKEYS(AES,K)
    if length = 0
        then
            n ← 1
        else
            n ← ⌈length/128⌉
    let X = [X_1, X_2, ..., X_n] be the input in 128-bit blocks
    if X_n is complete
        then
            X_n ← X_n ⊕ K_1
        else
            X_n ← (X_n || 1 || 0^{128·n−length−1}) ⊕ K_2
    (Y,T) ← CBC(0^128,X,AES,K)
    If T = TAG return TRUE else return FALSE
```

In what follows we show how one can implement the CBC ( ) algorithm when the symmetric key block cipher used is AES and the processor supports a set of instructions for AES round acceleration. The Intel Architecture supports 4 new such instructions at the time frame of the Westmere processor (2009) and on. These instructions are AESENC (AES round encryption), AESENCLAST (AES last round encryption), AESDEC (AES round decryption) and AESDECLAST (AES last round decryption). The specification for these instructions is as follows:

TABLE 16-1

AES Round Instructions

| Opcode/ Instruction | 64/32 bit Mode Support | CPUID Feature Flag | Description |
| --- | --- | --- | --- |
| 66 0F 38 DC/r AESENC xmm1, xmm2/128 | V/V | AES | performs one round of an AES encryption flow operating on a 128-bit data (state) from xmm1 with a 128-bit round key from xmm2/128 |
| 66 0F 38 DD/r AESENCLAST xmm1, xmm2/128 | V/V | AES | performs the last round of an AES encryption flow operating on a 128-bit data (state) from xmm1 with a 128-bit round key from xmm2/128 |
| 66 0F 38 DE/r AESDEC xmm1, xmm2/128 | V/V | AES | performs one round of an AES decryption flow using the equivalent inverse cipher operating on a 128-bit data (state) from xmm1 with a 128-bit round key from xmm2/128 |
| 66 0F 38 DF/r AESDECLAST xmm1, xmm2/128 | V/V | AES | performs the last round of an AES decryption flow using the equivalent inverse cipher operating on a 128-bit data (state) from xmm1 with a 128-bit round key from xmm2/128 |

Figure 21:
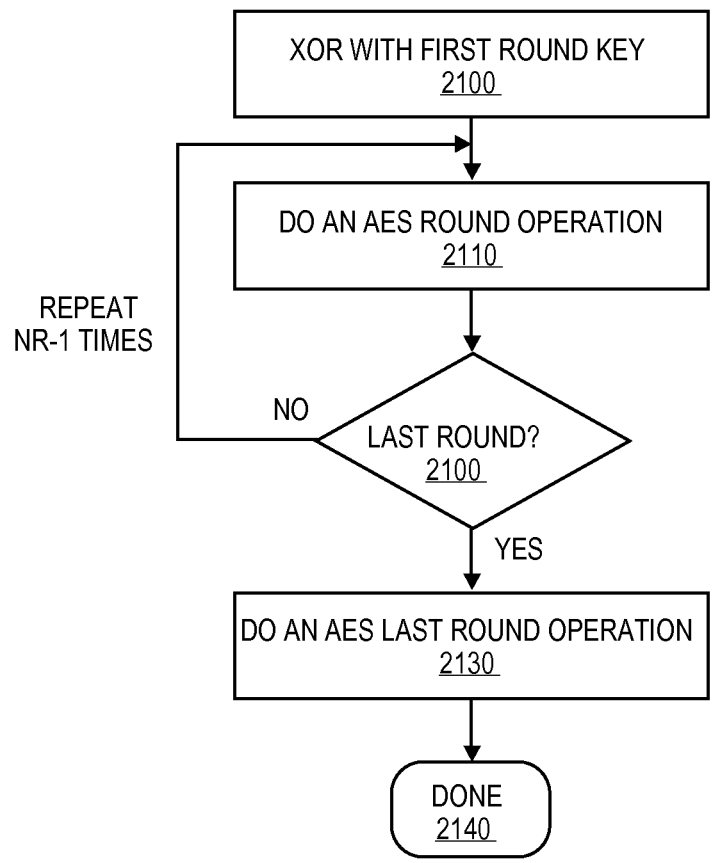
FIG. 21 is a flow chart illustrating the encryption of a single AES block in one embodiment of the invention.
Figure 22:
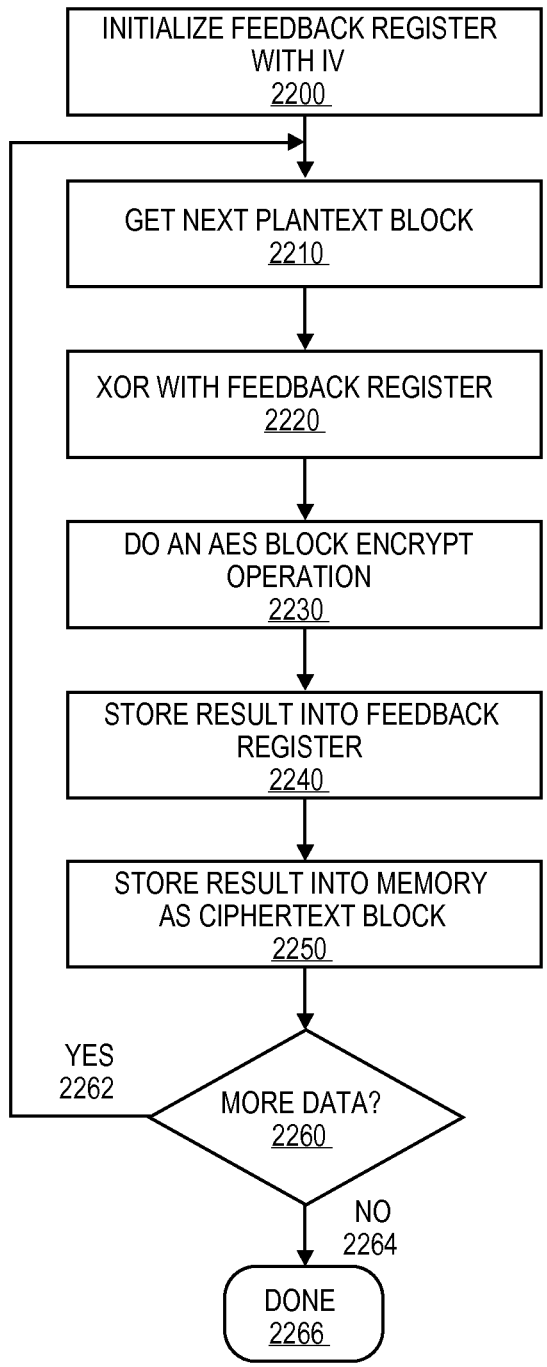
FIG. 22 is a flow chart that illustrates an example of the encryption of multiple AES blocks using the cipher block chaining algorithm as implemented in one embodiment of the invention.

To implement the CMAC mode using the AES round instructions it is sufficient to invoke AESENC AESENCLAST only since the tag validation process is the same as tag generation. FIG. 21 shows a flow chart associated with the encryption of a single AES block. FIG. 22 shows a flow chart associated with the encryption of multiple AES blocks using the CBC algorithm To implement the key schedule transformation one can use the AESIMC instruction for inverse mix columns and AESKEYGENASSIST instruction AESKEYGENASSIST is used for generating the round keys, used for encryption. AESIMC is used for converting the encryption round keys to a form usable for decryption according to the equivalent inverse cipher model. The description of the AESIMC and AESKEYGENASSIST instructions is given in http://softwarecommunity.intel.com/articles/eng/3788.htm.

CMAC is specified using the big endian notation for the 128-bit quantities involved. To implement CMAC in a little endian machine correctly one needs to perform 16 byte-wide byte reflection operations at certain points in the source code implementation. Such operations can be quickly performed using the PSHUFB instruction (1 clock latency, throughput). In what follows we describe the points where byte shuffling is required.

In the SUBKEYS( ) algorithm implementation byte reflection is required on L after it is derived by applying the AES cipher on the zero string and before the derivation of the two subkeys. Also byte reflection is required on the two subkeys after they are derived from L. A SUBKEYS( ) implementation is given in C below:

```
void get_subkeys_128(aes128_key_schedule ks, xmmword k1,
xmmword k2)
{
    int i;
    _xmm _xmm0, _xmm2;
    xmmword rb;
    varset(rb, 0, 16);
    rb[0] = 0x00000087;
    varset(_xmm0, 0, 16);
    varcpy(_xmm2, ks, 16);
    _pxor(_xmm0, _xmm2);
    for(i=1; i < 10; i++)
    {
        varcpy(_xmm2, ks+4*i, 16);
        _aesenc(_xmm0, _xmm2);
    }
    varcpy(_xmm2, ks+40, 16);
    _aesenclast(_xmm0, _xmm2);
    _pshufb(_xmm0, _xmm0);
    if(!((_xmm0[3] >> 31) & 1))
    {
        _xmm0[3] = ((_xmm0[3] << 1) | (_xmm0[2] >> 31));
        _xmm0[2] = ((_xmm0[2] << 1) | (_xmm0[1] >> 31));
        _xmm0[1] = ((_xmm0[1] << 1) | (_xmm0[0] >> 31));
        _xmm0[0] = (_xmm0[0] << 1);
    }
    else
    {
        _xmm0[3] = ((_xmm0[3] >> 1) | (_xmm0[2] >> 31));
        _xmm0[2] = ((_xmm0[2] << 1) | (_xmm0[1] >> 31));
        _xmm0[1] = ((_xmm0[1] << 1) | (_xmm0[0] >> 31));
        _xmm0[0] = (_xmm0[0] << 1);
        _pxor(_xmm0, rb);
    }
    _pshufb(k1, _xmm0);
    if(!((_xmm0[3] >> 31) & 1))
    {
        _xmm0[3] = ((_xmm0[3] << 1) | (_xmm0[2] >> 31))
        _xmm0[2] = ((_xmm0[2] << 1) | (_xmm0[1] >> 31))
        _xmm0[1] = ((_xmm0[1] << 1) | (_xmm0[0] >> 31))
        _xmm0[0] = (_xmm0[0] << 1);
    }
    else
    {
        _xmm0[3] = ((_xmm0[3] << 1) | (_xmm0[2] >> 31));
        _xmm0[2] = ((_xmm0[2] << 1) | (_xmm0[1] >> 31));
        _xmm0[1] = ((_xmm0[1] << 1) | (_xmm0[0] >> 31));
        _xmm0[0] = (_xmm0[0] << 1);
        _pxor(_xmm0, rb);
    }
    _pshufb(k2, xmm0):
}=
```

Next, byte reflection is required on the last block before and after padding only if this last block is not complete. These steps are shown in a C implementation below:

```
int aes128_cmac_init(aes128_key_schedule ks,
                     databuf P,
                     xmmword last,
                     uint32_t bit_length)
{
    uint32_t lr = bit_length%128;
    uint32_t lq = bit_length/128;
    xmmword k1, k2;
    varset(last, 0, 16);
    if (lr)
        varcpy(last, P+lq*16, (lr+7)/8);
    else if (lq)
        varcpy(last, P+(lq-1)*16, 16);
    else
    { }
    get_subkeys_128(ks, k1, k2);
    if((!lr) && (lq))
        _pxor(last, k1);
    else
    {
        _pshufb(last, last);
        ((uint8_t *)last)[15-(lr/8)] |= (1 << (7-(lr%8)));
        _pshufb(last, last);
        _pxor(last, k2);
    }
    return 1;
}
```

Where the function _pshufb( ) performs 128-bit wide byte reflection.

SE Requirements for SMI

Enclaves are not allowed to execute inside SMM space. An attempt to execute an enclave in SMM mode will result in a GP fault of the instruction. When an SMI occurs while executing inside an enclave, the processor may save the register state away inside the enclave and exit. When the exit occurs the TBD MSR bit is set to indicate that the SMI occurred while the enclave was executing. The SMM code cannot access the enclave data. Attempts to touch the EPC area will result in the return of junk data in real mode and an EPC page fault in protected mode.

Certain instructions are not allowed to execute. There are a number of general rules used to decide which instructions are legal.

1. Ring level changes are not allowed inside an enclave. Instructions which change or might change the ring level are prohibited.
2. Outside software cannot service VMEXITS inside an enclave. All instructions which generate or might generate a VMEXIT inside the enclave are prohibited.
3. Software cannot create a virtual machine inside an enclave. All VMX instructions are prohibited
4. Instructions which perform I/O references are prohibited inside an enclave.

In the first generation of enclaves the processor may be running in ring 3 with the IOPL set to 0 when entering an enclave.

In order to preserve the programming environment when enclaves run either a virtualized or non virtualized environment, the instructions listed in Table 18-1 are illegal.

TABLE 18-1

Illegal Instructions Inside Enclave

| Reason for illegal | Instructions |
|---|---|
| VMEXIT generating. Can't be supported by VMM. Generate consistent behavior by disallowing all the time. Generate #UD | CLTS, CPUID, GETSEC, HALT, INVD, INVEPT, INVLPG, INVVPID, LGDT/ LIDT, LLDT, LMSW, LTR, MONITOR, MOV CR, MOV DR, MWAIT, PAUSE, RDMSR, RDPMC, RDTSC, RSM, SGDT, SIDT, SLDT, SLDT, STR, VMCALL, VMCLEAR, VMENTRY, VMLAUNCH, VMPTRLD, VMPTRST, VMREAD, VMRESUME, VMWRITE, VMXON, VMXOFF, WBINVD, WRMSR, XSETBV |
| I/O instructions (also VMEXIT). Generate #UD | IN, INS/INSB/INSW/INSD, OUT, OUTS/OUTSB/OUTSW/OUTSD |

Restrictions are imposed on the state inside an enclave. When entering the enclave, the GDTR.limit, LDTR.limit, IA32_EFER.SCE, and IA32_SYSENTER_CS are saved in the TCS area. The local values are cleared. Instructions which access or cause access to these register will fail inside an enclave. The GDTR.limit, LDTR.limit, IA32_EFER.SCE, and IA32_SYSENTER_CS are restored when leaving the enclave.

TABLE 18-2

Instructions which will not execute

| Reason | Instructions |
|---|---|
| Instructions which access segment registers will fail. | Far call, Far jump, Far Ret, INT n/INT0/INT 3, IRET, LAR, LDS/LES/LGS/LSS, LSL, MOV to DS/ES/SS/FS/GS, POP DS/ES/SS/FS/GS, SYSCALL, SYSTENTER, SYSEXIT, SYSRET |

The life of an enclave is divided into distinct phases. The first phase is enclave creation. The second phase is enclave usage. The final phase is enclave destruction.

The creation and usage of an enclave requires the support of the OS/VMM. While the enclave will not depend on the OS/VMM for security, it will require the OS/VMM to properly maintain certain hardware data structures. Failure of the OS/VMM to maintain these structures will not result in a loss of security, but may cause the total failure of the enclave.

Several instructions support attestation of enclaves, sealing and unsealing of secret data and the permitting of authenticated enclaves.

In the first phase, the enclave may be securely constructed and the internal software environment set up for use by the application. Three instructions are used to create the enclave. The first instruction, ECREATE, sets up the initial state environment. This instruction creates the enclave key, loads, encrypts, and integrity checks two pages used to store the enclave data structures. The second instruction, EADDPRE, adds a page of data to the enclave. It adds pages needed for the code, stack, and heap inside the enclave. The third instruction, EINIT, sets the internal software environment to a known state. At the completion of this instruction the enclave has moved to the second phase, usage.

Before performing EINIT the construction software may have obtained a permit, either by performing EMKPERMIT or by using the permitting enclave.

The enclave is entered through the EENTER instruction. This instruction transitions the machine into enclave mode. It transfers control to a predefined entry point. The EEXIT instruction returns from the enclave to the outside application. The EIRRET instruction returns into the enclave from an interrupt exit.

When entering the enclave via either EENTER or EIRRET the following operation is performed by the instructions. Save and Clear GDTR.limit, LDTR.limit, IA32_EFER.SCE, and IA32_SYSENTER_CS. On exit restore GDTR, LDTR, IA32_EFER, and IA32_SYSENTER_CS.

There are no instructions for destroying an enclave.

EDBG_READ instruction does an 8 byte read of a location inside a debug enclave. No access is allowed to non debug enclave. EDBG_WRITE instruction does an 8 byte write to a location inside a debug enclave. No access is allowed to non debug enclave.

The Enclave Page Cache (EPC) is managed via 2 instructions. Two instructions load/store EPC pages (ELPG and EWBINVPG).

EREPORT generates a cryptographically protected structure that holds an enclave measurement. EGETKEY provides a means of retrieving an enclave specific key of vary types. EMKPERMIT is used to create a permit for an authenticated enclave.

TABLE 19-1

Instruction Categories

| Instructions | Function | CPL | ENCLAVE MODE |
|---|---|---|---|
| ELPG, EWBINVPG | EPC Management | 0 only | OUTSIDE |
| ECREATE, EINIT, EADDPRE, EADDPPOST | Enclave Management | 0 only | OUTSIDE |
| EMKPERMIT | Enclave Management | 0 only | OUTSIDE[1] |
| EENTER/EIRET | Enclave Entry | 1-3 only[2] | OUTSIDE |
| EEXIT | Enclave Exit | ALL | INSIDE |
| ERDTCSPTR | Thread Context | ALL | INSIDE |
| EREPORT | Trust | ALL | INSIDE |
| EGETKEY | Trust | ALL | INSIDE |
| ERDMR | Trust | ALL | OUTSIDE |
| EDBGRD, EDBGWR, ERDINFO | DEBUG/SUPPORT | ALL | OUTSIDE |

[1]No usage model for INSIDE, but no known harm in allowing EMKPERMIT to execute from inside.
[2]Future version may enable entry into enclaves from ring 0.

On interrupt, the processor state may be saved (and hidden) inside the enclave and the state then cleared. Furthermore, even the return address of the interrupt may be hidden.

Interrupts occurring while an enclave is executing may push information onto the interrupt stack in a form expected by the operating system so as to avoid the need to change OS code. To accomplish this, a pointer to trampoline code is pushed onto the interrupt stack as the RIP. This trampoline code eventually returns to the enclave by means of an EENTER instruction with a special parameter (q.v.).

The interrupt stack to be used is chosen using the same rules as for non-SE mode:

If there is a privilege level change, the interrupt stack will be the one associated with the new ring.

If there is no privilege level change, the current Untrusted Stack is used.

If the IA-32e IST mechanism is used, the interrupt stack is chosen using that method.

Figure 23:
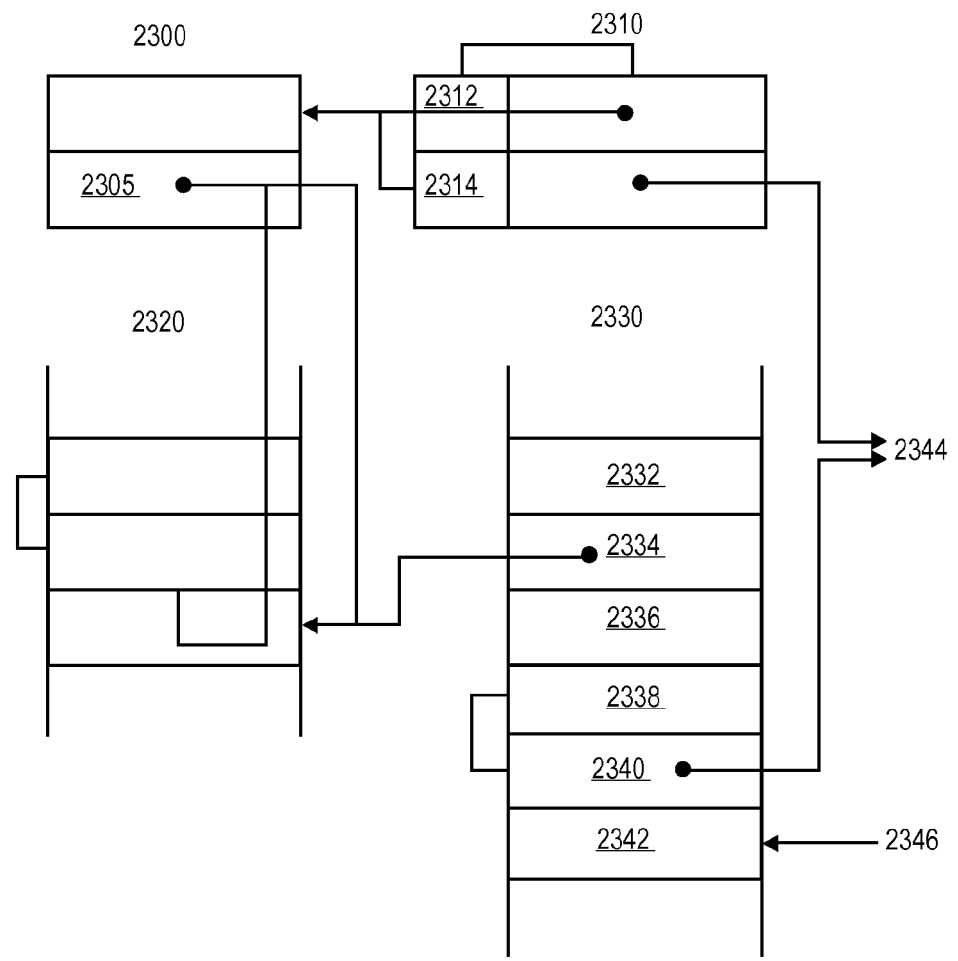
FIG. 23 illustrates in one embodiment the application and interrupt stacks after an interrupt with a stack switch.

FIG. 23 illustrates in one embodiment the application and interrupt stacks after an interrupt with a stack switch. The current save state area frame 2300 contains the RSP register 2305. The thread control structure 2310 can contain the count of the state save area 2312 and the interrupt return routine 2314. The interrupt stack 2330 contains the SS register 2332, RSP register 2334, flag register 2336, CS register 2338, instruction register 2340, and error code 2342. The interrupt stack 2330 can send the data in its RSP register 2334 to the application stack 2320 and the count of save state area 2300. Error code 2342 comes from the RSP after pushes 2346. The interrupt routing routine 2314 and the instruction register 2340 send out the per-thread trampoline in uRTS 2344.

In all cases, the choice of interrupt stack and the information pushed onto it is consistent with non-SE operation. FIG. 23 shows the Application and Interrupt Stacks after an interrupt with a stack switch. An interrupt without a stack switch uses the Application Stack. In addition, the TCS pointer is placed in RBX for later use by the EENTER instruction when resuming the enclave after the interrupt.

The TCS::IRR (Interrupt Return Routine) points to a per-thread code sequence that will later return to a specific thread. This pointer is pushed onto the interrupt stack as the return RIP. This results in a set of data structures that causes the IRET to return to the application where the interrupt return code (which includes the specialized EENTER instruction) is executed. The EENTER takes the RBX register initialized at the time of the interrupt (and preserved by the OS) and uses it as a TCS to re-enter the enclave.

The following bits in RFLAGS are cleared before the register is pushed onto the interrupt stack:

| CF | Carry Flag | SF | Sign Flag |
|---|---|---|---|
| PF | Parity Flag | OF | Overflow Flag |
| AF | Adjust Flag | DF | Direction Flag |
| ZF | Zero Flag | | |

Figure 24:
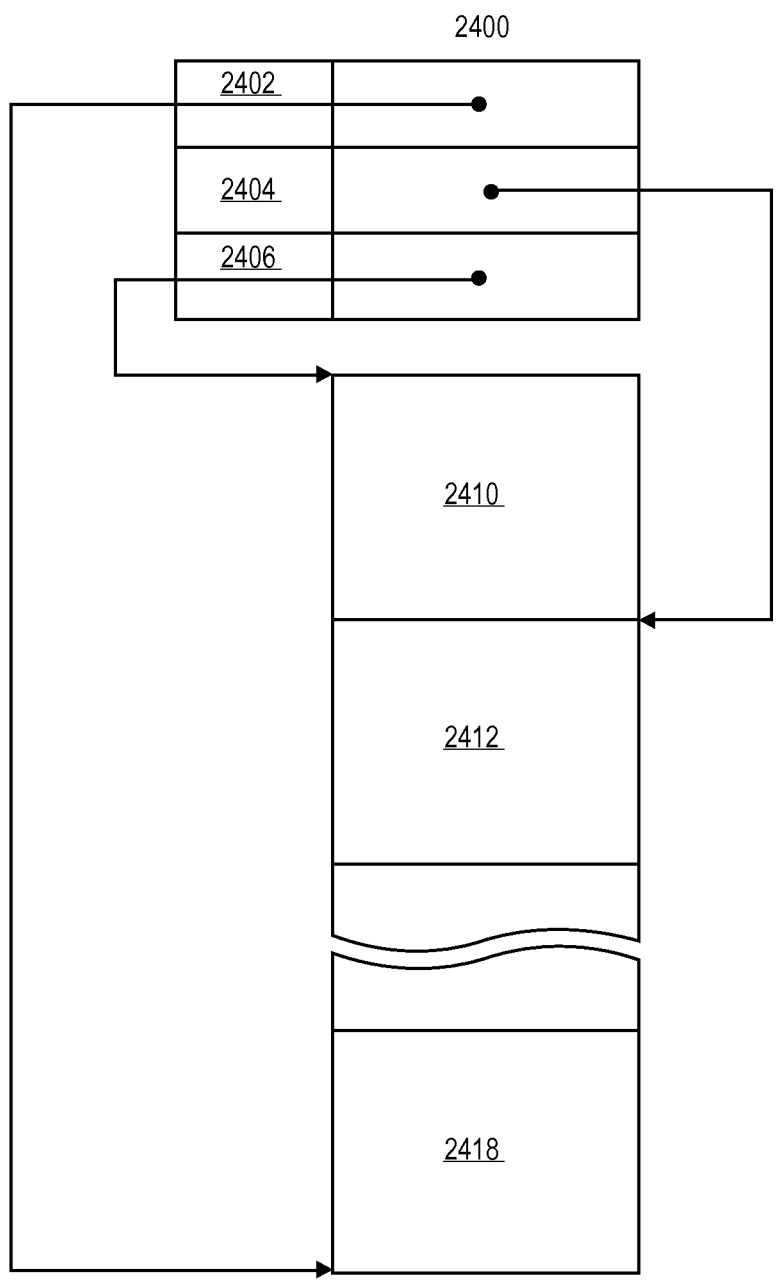
FIG. 24 illustrates a possible way to implement a stack of multiple state save area slots in one embodiment of the invention.

FIG. 24 illustrates a possible way to implement a stack of multiple state save area slots in one embodiment of the invention. The thread control structure 2400 can contain the next state save areaslots 2402, current state save areaslots 2404, and the state save areaslots 2406. State save area 0 2410, state save area 1 2412, and state save area N 2418 are three distinct chosen locations within the state save area. The next state save areaslots 2402 specifies a location to use in the state save area (state save area 0 2410). The current state save areaslots 2404 specifies a location to use in the state save area (state save area 1 2412). The state save areaslots 2406 specifies a location to use in the state save area (state save area N 2418).

The State Save Area holds the enclave state at the time of an interrupt. Because an interrupt may be delivered to user mode that may then re-enter the enclave, the SSA is a stack of multiple SSA slots as illustrated in FIG. 19-3. The location of the State Save Area to be used is controlled by three variables in the TCS: Number of State Save AreaSlots (NSSA) (defines the total number of slots in the State Save Areastack), Current State Save AreaSlot (CSSA) (defines the current slot to use on the next interrupt, State Save Area(SSA) (set of save area slots used to save the processor state on interrupt.

When an interrupt occurs while executing on a thread inside the enclave, microcode determines the Save Area to use by examining TCS::SSA and TCS::CSSA. Processor state is saved and cleared (to avoid leaking secrets) and TCS::CSSA is incremented. As will be described later, if an exception takes the last slot, it will not be possible to deliver the exception to the enclave.

Note: On EENTER, CSSA may be <NSSA, ensuring that there is at least one Save Area available for interrupts (unless EENTER is being used to return from an interrupt).

Figure 25:
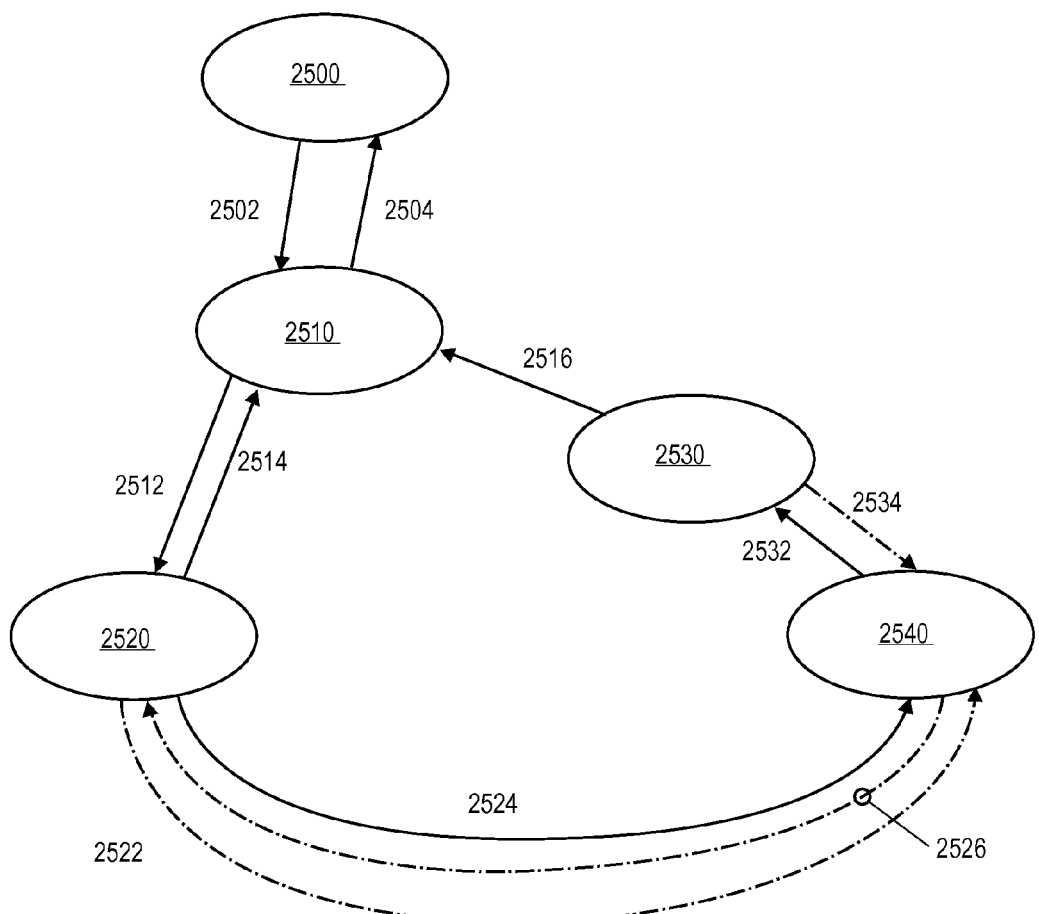
FIG. 25 illustrates in one embodiment of the invention a portion of the state machines with state transitions for interrupts, faults, and traps.

FIG. 25 illustrates in one embodiment of the invention a portion of the state machines with state transitions for interrupts, faults, and traps. The possible states are inactive 2500, active 2510, excepted 2520, handled (EENTER illegal) 2530, and handling 2540. When EENTER dispatches to TCS:ENTRY 2502, inactive 2500 transitions to active 2510. When EEXIT 2504 occurs, active 2510 transitions to inactive 2500. When an interrupt, fault, or trap 2512 occurs, active 2510 transitions to excepted 2520. When EIRET 2514 occurs, excepted 2520 transitions to active 2510. When EENTER dispatches to TCS:HANDLER 2524, excepted 2520 transitions to handling 2540. When EIRET 2522 occurs 2522, excepted 2520 transitions to handling 2540. When an interrupt, fault, or trap 2526 occurs, handling 2540 transitions to excepted 2520. When EEXIT 2532 occurs, handling 2540 transitions to handled 2530. When handling interrupts within the enclave exception handler and EIRET 2534 occurs, handled 2530 transitions to handling 2540. When handling interrupts not from the enclave exception handler and EIRET 2534 occurs, handled 2530 transitions to active 2510. The dotted transitions 2522, 2526, 2534 only occur when handling interrupts within the enclave exception handler.

FIG. 25 shows the portion of the enclave State Machine dealing with interrupts. An interrupt begins with an optional stack switch and the pushing of the synthetic interrupt frame onto the Interrupt Stack. If the event was an interrupt, the enclave enters the Interrupted state. If the event was an exception, the enclave enters the Excepted state. These two states are distinguished in order to both guarantee delivery of an enclave exception to the enclave and also to prevent delivery of a spurious exception by attacking application code.

On any transition to the Interrupted state, untrusted code (either the application, the OS or both) may only resume the enclave using EENTER/RETURN_FROM_INTERRUPT.

On any transition to the Excepted state, untrusted code (either the application, the OS or both) may decide to:

Resume the enclave by using EIRET to return to the interrupted IP. This is how, for example, Page Faults are handled. Note that if the interrupt was caused by a fault, and nothing was done to correct the fault condition, the faulting instruction will be re-executed and will fault again. EIRET after a trap, however, will return to the instruction following the trapping instruction.

Call the enclave exception handler.

Abandon the thread or enclave.

EENTER in Excepted state advances to the Handling state. EEXIT from the trap handler (Handling state) advances to the Handled state. ENTER/NORMAL is illegal in this state. EIRET from the trampoline resumes the state pushed onto the SSA at the time of the last interrupt; either the Active or Handling state.

Secure Enclave Instructions are split into 2 opcodes, a privileged opcode and an unprivileged opcode. The instruction operation is determined by the value in RAX at the time the instruction is called.

TABLE 19-2

Enclave Non Privileged Instruction Layout

| Instruction | RAX | RBX | RCX | RDX |
|---|---|---|---|---|
| EREPORT | 0x0 | userData pointer | REPORT pointer (output) | |
| EMKPERMIT | 0x1 | License pointer | PERMIT pointer (in) | PERMIT pointer (out) |
| EGETKEY | 0x2 | KEYREQUEST pointer (in) | KEY pointer (out) | |
| ERDTCSPTR | 0x3 | TCS pointer (output) | | |
| EENTER | 0x4 | TCS pointer (input) | Return Address (output) | |
| EIRET | 0x5 | TCS pointer | | |
| EEXIT | 0x6 | Target address | | |
| EACCEPT | 0x7 | Linear Address | Flags | Mask |
| ERDMR | 0x8 | SECS pointer | MR Data Pointer (output) | |

TABLE 19-3

Enclave Privileged Instruction Layout

| Instruction | RAX | RBX | RCX | RDX |
|---|---|---|---|---|
| ECREATE | 0x0 | PAGE_INFO pointer | Reserved (MBZ) | |
| EADDPRE | 0x1 | PAGE_INFO pointer | EPC Linear Address | SMAP pointer |
| EINIT | 0x2 | SECS pointer | PERMIT pointer | |
| ELPG | 0x3 | PAGE_INFO pointer | EPC Linear Address | |
| EWBINVPG | 0x4 | PAGE_INFO pointer | EPC Linear Address | |
| EUPSMAP | 0x5 | EPC Linear Address | SMAP pointer | |
| EREMOVE | 0x6 | EPC Linear Address | SMAP pointer | |
| EMODIFY | 0x7 | SEC_INFO pointer | EPC Linear Address | Mask |
| EDBGRD | 0x8 | Buffer pointer | EPC Linear Address | |
| EDBGWR | 0x9 | Buffer pointer | EPC Linear Address | |
| EDRDINFO | 0xA | PAGE_INFO pointer | EPC Linear Address | |
| EADDPOST | 0xB | PAGE_INFO pointer | EPC Linear Address | SMAP pointer |
| EADDSMAP | 0xC | | | |

The ECREATE instruction initializes a protected SECS. The source operand points to a page_info structure. The content page field points to an unprotected SECS structure. The SECS structure may be page aligned. The lower 12 bits of SECS base and bound values may be 0. The SECS is an address of an empty slot in the EPC. The sec_info is an address of an unprotected sec_info structure. The corresponding sec_info flag field may be properly initialized.

| Name of Offset | Value |
|---|---|
| LIN_ADDR | MBZ |
| SOURCE_PAGE | Linear address of SECS describing enclave being created. May be page aligned. |
| SEC_INFO | Linear address of the secinfo structure for the page |

-continued

| Name of Offset | Value |
|---|---|
| SECS | Linear address of EPC of empty slot. May be page aligned and within the EPC. |

Instruction Input(s)

| | |
|---|---|
| RAX | 0x0 |
| RBX | PAGE_INFO pointer |

Instruction Output
Register RAX.RAX contains the error code if instruction fails.
Instruction Operation

```
// uCode Scratchpad Variables
page_info_t *p_page_info;
secs_t *p_secs_page;
sid_t secs_sid;
void *p_content_page;
sec_info_t *p_sec_info;
sec_info_t sec_info;
uint64 lin_addr;
int ret_val = SE_FAIL;
fault_t fault= {0};
// End uCode Scratchpad
acquire_writer_lock(&se_rw_locks);
p_page_info = translate(context, rbx, PAGE_ACCESS_READ,
SE_PAGE_INFO_ALIGNMENT, &fault);
if (fault.valid) {
    ret_val = fault.reason;
    goto FAIL;
}
p_content_page = translate(context, p_page_info->content_page,
PAGE_ACCESS_READ, SE_CONTENT_PAGE_ALIGNMENT, &fault);
if (fault.valid){
    ret_val = fault.reason;
    goto FAIL;
}
p_sec_info = translate(context, p_page_info->sec_info,
PAGE_ACCESS_READ, SE_SEC_INFO_ALIGNMENT, &fault);
if (fault.valid) {
    ret_val=fault.reason;
    goto FAIL;
}
p_secs_page = translate(context, p_page_info->secs,
PAGE_ACCESS_READ | EPC_PAGE, SE_SECS_PAGE_ALIGNMENT,&fault);
if (fault.valid) {
    ret_val = fault.reason;
    goto FAIL;
}
```

-continued

```
secs_sid = pa2sid(p_secs_page);
if (se_epc_m[secs_sid].flags.valid)
    goto FAIL;
memcpy(&sec_info, p_sec_info, sizeof(sec_info));
if ( (sec_info.flags.bits & SECS_FLAG_MASK) !=
SECS_FLAG_CONSTANT)
    goto FAIL;
lin_addr = p_page_info->lin_addr;
if (lin_addr != 0) goto FAIL;
memcpy(p_secs_page, p_content_page, sizeof(se_page_t));
if ((p_secs_page->flags_bits & ~0x2) != 0)
    goto FAIL;
if (!is_power_of_2(p_secs_page->size) || p_secs_page->size <
MIN_ENCLAVE_SIZE || p_secs_page->size > MAX_ENCLAVE_SIZE)
    goto FAIL; // size is not conformant
p_secs_page->lin_addr_mask = p_secs_page->size - 1;
if ((p_secs_page->base_address & p_secs_page->lin_addr_mask) !=
0)
    goto FAIL; // base_address is not naturally aligned
memset(p_secs_page->version, 0 , 2048);
se_epc_m[secs_sid].bits = (SECS_FLAG_BITS | (sec_info.flags.rp
<< 1));
se_pmh_m[secs_sid].ref_count = 0;
release_writer_lock(&se_rw_locks);
return SE_OK;
FAIL:
release_writer_lock(&se_rw_locks);
return ret_val;
```

Flags Affected

None

Use of Prefixes

Lock: causes UD#

REP: causes US#

Segment overrides: N/A

Operand Size: causes UD#

Address Size: ignored

Rex: ignored

Protected Mode Exceptions

GP(0) If the current privilege level is not 0.

PF(fault-code) If a page fault occurs in access memory operands.

UD If enclaves are not enabled

Real Address Mode Exceptions

UD The ECREATE instruction is not recognized in real address mode

Virtual 8086 Mode Exceptions

UD The ECREATE instruction is not recognized in 8086 mode

EADDPRE

Instruction Description

EADDPRE allows privileged software to copy a page outside of an enclave to a page within an enclave specified by lin_addr and the attributes of the enclave page are set using the sec_info flag field.

As part of the instruction the page is hashed and the resulting hash value is extended into the enclave's measurement register.

EADDPRE can only be performed on enclaves that have not yet been initialized by the EINIT instruction.

Instruction Inputs

| RAX | 0x1 |
| RBX | PAGE_INFO pointer |
| RCX | EPC Linear Address |
| RDX | SMAP Pointer |

Instruction Operation

```
// uCode Scratchpad Variables
page_info_t *p_page_info;
secs_t *p_secs_page;
smap_t *p_smap_page;
tcs_t *p_tcs_page;
sid_t secs_sid, epc_sid, smap_sid;
void *p_content_page;
void *p_epc_page;
sec_info_t *p_sec_info;
sec_info_t sec_info;
uint64 lin_addr;
uint64 lin_page;
uint64 lin_offset;
unsigned char ver_offset;
se_epc_flags_t epc_bits;
se_pmh_flags_t pmh_bits;
unsigned int irr;
int ret_val = SE_FAIL;
fault_t fault= {0};
```

```
uint256 hash;
// End uCode Scratchpad
acquire_writer_lock(&se_rw_locks);
// parse the page info structure
p_page_info = (page_info_t *)translate(context, rbx,
PAGE_ACCESS_READ, SE_PAGE_INFO_ALIGNMENT, &fault);
if (fault.valid) {
    ret_val = fault.reason;
    goto FAIL;
}
p_content_page = (void *)translate(context, p_page_info-
>content_page, PAGE_ACCESS_READ , SE_CONTENT_PAGE_ALIGNMENT,
&fault);
if (fault.valid) {
    ret_val = fault.reason;
    goto FAIL;
}
p_secs_page = (void *)translate(context, p_page_info->secs,
PAGE_ACCESS_READ | EPC_PAGE, SE_SECS_PAGE_ALIGNMENT, &fault);
if (fault.valid) {
    ret_val = fault.reason;
    goto FAIL;
}
p_sec_info = (sec_info_t *)translate(context, p_page_info-
>sec_info, PAGE_ACCESS_READ, SE_SEC_INFO_ALIGNMENT, &fault);
if (fault.valid){
    ret_val = fault.reason;
    goto FAIL;
}
p_epc_page = (void *)translate(context, rcx, PAGE_ACCESS_READ |
PAGE_ACCESS_WRITE| EPC_PAGE, SE_EPC_PAGE_ALIGNMENT, &fault);
if (fault.valid){
    ret_val = fault.reason;
    goto FAIL;
}
p_smap_page = (void *)translate(context, rdx, PAGE_ACCESS_READ |
PAGE_ACCESS_WRITE| EPC_PAGE, SE_SMAP_PAGE_ALIGNMENT, &fault);
if (fault.valid){
    ret_val = fault.reason;
    goto FAIL;
}
// copy p_sec_info to a protected memory to avoid TOCTOU issues
memcpy(&sec_info, p_sec_info, sizeof(sec_info));
// check that secs really points to a valid, fresh, SECS
secs_sid = pa2sid(p_secs_page);
if (!is_valid_sid(secs_sid) || !is_fresh_sid(secs_sid) ||
!is_secs_sid(secs_sid))
    goto FAIL;
// check that epc_page really points to an empty EPC page
epc_sid = pa2sid(p_epc_page);
if (se_epc_m[epc_sid].flags.valid)
    goto FAIL;
// check that smap_page really points to a valid, fresh SMAP
leaf node
// that corresponds to encalve & page being allocated
smap_sid = pa2sid(p_smap_page);
if (!is_valid_sid(smap_sid) || !is_fresh_sid(smap_sid) ||
!is_smap_sid(smap_sid))
    goto FAIL;
lin_addr = p_page_info->lin_addr;
if (!is_enclave_addr(p_secs_page, lin_addr))
    goto FAIL; // address does not fall within ELS
lin_offset = lin_addr & p_secs_page->lin_addr_mask;
lin_page = lin_offset >> 12;
ver_offset = lin_page & 0xFF;
if (se_pmh_m[smap_sid].offset != (lin_page &0xFFFF00) ||
se_pmh_m[smap_sid].secs_sid != secs_sid)
    goto FAIL;
if (p_smap_page->version[ver_offset].bits[0] != 0 ||
    p_smap_page->version[ver_offset].bits[1] != 0)
    goto FAIL;
epc_bits.bits = 0;
epc_bits.flags.valid = 1;
epc_bits.flags.rp = 1;
epc_bits.flags.pt = sec_info.flags.pt;
pmh_bits.bits = 0;
if (p_secs_page->flags.init != 0) goto FAIL;
if ((sec_info.flags.bits & PRE_EINIT_EADD_FLAG_MASK) !=
PRE_EINIT_EADD_FLAG_CONSTANT)
```

```
    goto FAIL;
if (!(sec_info.flags.pt == PT_REG || sec_info.flags.pt ==
PT_TCS))
    goto FAIL;
if (sec_info.flags.pt == PT_TCS)
{
    if (sec_info.flags.w || sec_info.flags.x)
      goto FAIL;
    p_tcs_page = p_epc_page;
    irr = p_tcs_page->irr;
    p_tcs_page->irr = 0; // not measured
    pmh_bits.flags.present = 0;
} else if ((sec_info.flags.pt == PT_REG)) {
    if (sec_info.flags.w && ! sec_info.flags.r)
      goto FAIL;
    pmh_bits.flags.present = 1;
    } else {
    goto FAIL;
}
memcpy (p_epc_page, p_content_page, sizeof(se_page_t));
measure_page(p_epc_page, lin_offset, &sec_info, &hash);
extendmreg_eadd(p_secs_page, &hash);
if (sec_info.flags.pt == PT_TCS)
{
    p_tcs_page->irr = irr;
}
se_versions[epc_sid] = get_version( );
p_smap_page->version[ver_offset] = se_versions[epc_sid];
atomic_inc16(&(se_pmh_m[secs_sid].ref_count));
se_pmh_m[epc_sid].secs_sid = secs_sid;
se_pmh_m[epc_sid].offset = lin_page;
se_pmh_m[epc_sid].bits = pmh_bits.bits;
se_epc_m[epc_sid].bits = epc_bits.bits;
release_writer_lock(&se_rw_locks);
return SE_OK;
FAIL:
release_writer_lock(&se_rw_locks);
return ret_val;
```

Flags Affected
None
Use of Prefixes
Lock: causes UD#
REP: causes US#
Segment overrides: N/A
Operand Size: causes UD#
Address Size: ignored
Protected Mode Exceptions
GP(0) If the current privilege level is not 0.
PF(fault-code) If a page fault occurs in access memory operands.
UD If enclaves are not enabled
Real Address Mode Exceptions
UD The EADDPRE instruction is not recognized in real address mode
Virtual 8086 Mode exceptions
UD The EADDPRE instruction is not recognized in 8086 mode
    EADDPOST Instruction Description EALLOCATE allows privileged software to initialize an SMAP entry of an enclave specified by lin_addr and the attributes of the enclave page are set using the sec_info flag field.

Before the enclave can access the page, it may accept the page into the enclave using the EACCEPT instruction.

EALLOCATE can only be performed on enclaves that have been initialized by the EINIT instruction.

Instruction Inputs

| RAX | 0xa |
| RBX | PAGE_INFO pointer |
| RCX | EPC Linear Address |
| RDX | SMAP Pointer |

Instruction Operation

```
// uCode Scratchpad Variables
page_info_t *p_page_info;
secs_t *p_secs_page;
smap_t *p_smap_page;
tcs_t *p_tcs_page;
sid_t secs_sid, epc_sid, smap_sid;
void *p_epc_page;
sec_info_t *p_sec_info;
sec_info_t sec_info;
uint64 lin_addr;
uint64 lin_page;
unsigned char ver_offset;
```

```
se_epc_flags_t epc_bits;
se_pmh_flags_t pmh_bits;
int ret_val = SE_FAIL;
fault_t fault= {0};
// End uCode Scratchpad
acquire_writer_lock(&se_rw_locks);
// parse the page info structure
p_page_info = (page_info_t *)translate(context, rbx,
PAGE_ACCESS_READ, SE_PAGE_INFO_ALIGNMENT, &fault);
if (fault.valid) {
     ret_val = fault.reason;
     goto FAIL;
}
p_secs_page = (void *)translate(context, p_page_info->secs,
PAGE_ACCESS_READ | EPC_PAGE, SE_SECS_PAGE_ALIGNMENT, &fault);
if (fault.valid) {
     ret_val = fault.reason;
     goto FAIL;
}
p_sec_info = (sec_info_t *)translate(context, p_page_info-
>sec_info, PAGE_ACCESS_READ, SE_SEC_INFO_ALIGNMENT, &fault);
if (fault.valid){
     ret_val = fault.reason;
     goto FAIL;
}
p_epc_page = (void *)translate(context, rcx, PAGE_ACCESS_READ |
PAGE_ACCESS_WRITE| EPC_PAGE, SE_EPC_PAGE_ALIGNMENT, &fault);
if (fault.valid){
     ret_val = fault.reason;
     goto FAIL;
}
p_smap_page = (void *)translate(context, rdx, PAGE_ACCESS_READ |
PAGE_ACCESS_WRITE| EPC_PAGE, SE_SMAP_PAGE_ALIGNMENT, &fault);
if (fault.valid){
     ret_val = fault.reason;
     goto FAIL;
}
// copy p_sec_info to a protected memory to avoid TOCTOU issues
memcpy(&sec_info, p_sec_info, sizeof(sec_info));
// check that secs really points to a valid, fresh, SECS
secs_sid = pa2sid(p_secs_page);
if (!is_valid_sid(secs_sid) || !is_fresh_sid(secs_sid) ||
!is_secs_sid(secs_sid))
     goto FAIL;
// check that epc_page really points to an empty EPC page
epc_sid = pa2sid(p_epc_page);
if (se_epc_m[epc_sid].flags.valid)
     goto FAIL;
// check that smap_page really points to a valid, fresh SMAP
leaf node
// that corresponds to encalve & page being allocated
smap_sid = pa2sid(p_smap_page);
if (!is_valid_sid(smap_sid) || !is_fresh_sid(smap_sid) ||
!is_smap_sid(smap_sid))
     goto FAIL;
lin_addr = p_page_info->lin_addr;
if (!is_enclave_addr(p_secs_page, lin_addr))
     goto FAIL; // address does not fall within ELS
lin_page = lin_addr >> 12;
ver_offset = lin_page & 0xFF;
if (se_pmh_m[smap_sid].offset != (lin_page &0xFFFF00) ||
se_pmh_m[smap_sid].secs_sid != secs_sid)
     goto FAIL;
// check that smap_entry is uninitialized
if (p_smap_page->version[ver_offset].bits[0] != 0 ||
     p_smap_page->version[ver_offset].bits[1] != 0)
     goto FAIL;
epc_bits.bits = 0;
epc_bits.flags.valid = 1;
epc_bits.flags.rp = 1;
epc_bits.flags.pt = sec_info.flags.pt;
pmh_bits.bits = 0;
if (p_secs_page->flags.init != 1) goto FAIL;
if ((sec_info.flags.bits & POST_EINIT_EADD_FLAG_MASK) !=
POST_EINIT_EADD_FLAG_CONSTANT)
       goto FAIL;
pmh_bits.flags.present = 0;
pmh_bits.flags.ept = EPT_EADD;
memset (p_epc_page, 0, sizeof(se_page_t));
```

```
se_versions[epc_sid] = get_version( );
p_smap_page->version[ver_offset] = se_versions[epc_sid];
atomic_inc16(&(se_pmh_m[secs_sid].ref_count));
se_pmh_m[epc_sid].secs_sid = secs_sid;
se_pmh_m[epc_sid].offset = (lin_addr & p_secs_page-
>lin_addr_mask))>>12;
se_pmh_m[epc_sid].bits = pmh_bits.bits;
se_epc_m[epc_sid].bits = epc_bits.bits;
release_writer_lock(&se_rw_locks);
return SE_OK;
FAIL:
release_writer_lock(&se_rw_locks);
return ret_val;
```

Flags Affected
None
Use of Prefixes
Lock: causes UD#
REP: causes US#
Segment overrides: N/A
Operand Size: causes UD#
Address Size: ignored
Protected Mode Exceptions
GP(0) If the current privilege level is not 0.
PF(fault-code) If a page fault occurs in access memory operands.
UD If enclaves are not enabled
Real Address Mode Exceptions
UD The EADDPOST instruction is not recognized in real address mode
Virtual 8086 Mode exceptions
UD The EADDPOST instruction is not recognized in 8086 mode
    EMKPERMIT
Instruction Description
Authenticates an enclave or license and generates a permit from it. If rbx==NULL, certificate may be signed by Intel. Otherwise the license may be signed by the key indicated in the rbx permit.
Instruction Inputs

| LICENSE pointer | PERMIT pointer (in) | PERMIT pointer (out) |
| --- | --- | --- |

Instruction Operation

```
static permit_t intel_perm = { 0, 0, 0, {0, SE_BULK_LICENSE, 0,
0},
                              SE_ISV_CAPABILITIES,
                              {0}, INTEL_PUB_HASH,
                              {0}, {0}};
// uCode Scratchpad Variables
hash_t lic_pubkey_hash, license_hash;
license_t loc_license, *p_license;
permit_t loc_permit_in, *p_permit_in, loc_permit_out,
p_permit_out;
rsa_key_t pubkey;
cmac_t permit_in_cmac;
aeskey_t permit_key;
uint8 scratch[SE_HASH_SIZE *2] = {0};
fault_t fault= {0};
// End uCode Scratchpad
p_license = (license_t *) translate(context, rbx,
PAGE_ACCESS_READ,
                              SE_LICENSE_ALIGNMENT,
                              &fault);
if (fault.valid){
   ret_val = fault.reason;
   goto FAIL;
}
// todo: how does translate handle null?
p_permit_in = (permit_t *) translate(context, rcx,
PAGE_ACCESS_READ,
                              SE_PERMIT_ALIGN-
                              MENT, &fault);
if (fault.valid){
   ret_val = fault.reason;
   goto FAIL;
}
p_permit_out = (permit_t *) translate(context, rdx,
PAGE_ACCESS_READ |
                              PAGE_ACCESS_WRITE,
SE_PERMIT_ALIGNMENT, &fault);
if (fault.valid){
   ret_val = fault.reason;
   goto FAIL;
}
get_key(SE_PERMIT_KEY, &permit_key);
// copy input to scratchpad to defend against race attacks
memcpy(loc_license, p_license, sizeof(license_t));
if (p_permit_in) {
   memcpy(loc_permit_in, p_permit_in, sizeof(permit_t));
   cmac(&permit_key, loc_permit_in, PERMIT_HASHED_SIZE,
&permit_in_cmac);
   if (!memcmp(&permit_in_cmac, loc_permit_in.cpu_mac,
SE_HASH_SIZE) {
      ret_val = SE_INVALID_PERMIT;
      goto FAIL;
   }
} else {
   memcpy(loc_permit_in, intel_perm, sizeof(permit_t));
}
// Ensure pub key in cert matches pub key authorized in permit
sha256(&loc_license.pubkey, SE_RSA_2048_SIZE,
&license_pubkey_hash);
if (!memcmp(&cert_pubkey_hash, loc_permit_in.obj_hash,
SE_HASH_SIZE) {
   ret_val = SE_PERMIT_NOT_FOR_LICENSE;
   goto FAIL;
}
if (create_rsa_key(&license_pubkey, 2048, &pubkey) !=
CRYPTO_SUCCESS) {
   ret_val = SE_INVALID_LICENSE;
   goto FAIL;
}
sha256(&loc_license, SE_LICENSE_HASHED_SIZE, &license_hash);
if (rsa_verify(&pubkey, &license_hash, &loc_license.sig) !=
CRYPTO_SUCCESS) {
   ret_val = SE_INVALID_LICENSE;
   goto FAIL;
}
If (loc_permit_in.flags != loc_license.flags) ||
   (!memcmp(&loc_permit_in.caps, loc_license.caps, 16) {
   ret_val = SE_NONMATCHING_LICENSE_ATTRIBUTES;
   goto FAIL;
}
```

```
// Create Permit Out from cert and permit in
loc_permit_out.isv_svn = loc_license.isv_svn;
loc_permit_out.flags = loc_license.flags;
loc_permit_out.reserved2 = 0;
memcpy(&loc_permit_out.lic_info,loc_license.lic_info,
    sizeof(lic_info_t));
loc_permit_out->caps=loc_license.caps;
memcpy(loc_permit_out.obj_hash, loc_permit->obj_hash,
    SE_HASH_SIZE);
memcpy(&scratch[0], loc_permit.parent_key_hash, SE_HASH_SIZE);
memcpy(&scratch[SE_HASH_SIZE], loc_permit.obj_hash,
    SE_HASH_SIZE);
sha256(&scratch, sizeof(scratch),
    &loc_permit_out.parent_key_hash);
cmac(&permit_key, loc_permit_out, PERMIT_HASHED_SIZE,
    &loc_permit_out.cpu_cmac);
memset(loc_permit_out.lic_cmac, 0, SE_HASH_SIZE);
// Copy new cert out to p_permit_out
memcpy(p_permit_out, &loc_permit_out, sizeof(permit_t));
Set RFLAGS.Z = 1
return SE_OK;
FAIL0:
    Set RFLAGS.Z = 0
    Return;
```

Flags Affected
None
Use of Prefixes
Lock: causes UD#
REP: causes UD#
Segment overrides:N/A
Operand Size: causes UD#
Address Size: ignored
Protected Mode Exceptions
GP(0) If the current privilege level is not 0.
PF(fault-code) If a page fault occurs in access memory operands.
UD If enclaves are not enabled
Real Address Mode Exceptions
UD The instruction is not recognized in real address mode
Virtual 8086 Mode Exceptions
UD The instruction is not recognized in 8086 mode
    EINIT
Instruction Description
EINIT marks the enclave as ready to run in a software environment. At the end successful initialization, EENTER will be allowed for the enclave.
Instruction Inputs

| RAX | 0x2 |
| RBX | SECS pointer |
| RCX | PERMIT pointer |

Instruction Operation

```
#define ILLEGAL_DEBUG_CAPABILITES
// uCode Scratchpad Variables
secs_t p_secs_page;
Uint16 secs_sid;
PERMIT p_permit
KEY p_Key
// End uCode Scratchpad
If (p_permit != NULL) {
    Verify that permit_la is 4096B aligned, else goto FAIL0
    copy permit_la to p_permit
} else {
    If !debug goto FAIL 0
}
// translate & verify SECS
acquire_writer_lock(&se_rw_locks);
p_secs_page = (secs_t *) translate(context, rbx,
    PAGE_ACCESS_READ | PAGE_ACCESS_WRITE| EPC_PAGE,
    SE_SECS_PAGE_ALIGNMENT, &fault);
if (fault.valid){
    ret_val = fault.reason;
    goto FAIL;
}
secs_sid = pa2sid(p_secs_page);
//faults or errors?
if (!is_valid_sid(secs_sid) || !is_fresh_sid(secs_sid) ||
    !is_secs_sid(secs_sid) || p_secs_page->init == 1)
    goto FAIL;
If(Debug && p_permit->capabilities &
    ILLEGAL_DEBUG_CAPABILITES)
got FAIL0
If (p_permit != NULL) {
    deriveKey(PERMIT, p_Key); // Derive the PERMITING key
    verify p_permit->cpuMAC == cmac(p_key,permit); If failed
goto FAIL0;
    if (p_permit->licenseType > 0) {
        deriveKey(LICENSE, p_Key); // Derive the LICENSING key
        verify p_permit->licenseMAC == cmac(p_key,permit); else
goto FAIL0;
    }
    if (p_permit->measurement != p_secs_page>MR_EADD)
    THEN goto FAIL0; // bad MR
    if (Debug != p_permit->flags[DEBUG]) goto FAIL 0; // Debug
doesn't match
    p_secs_page ->Capabilities = p_permit ->Capabilities;
    p_secs_page ->MR_POLICY = p_permit ->pub_key_hash;
    p_secs_page ->ISV_SEC_VERSION =
        p_permit ->isv_sec_version;
} else {
    p_secs_page->Capabilities= 0x0000000000000000;
    p_secs_page ->MR_POLICY = 0x0000..0000
    p_secs_page ->ISV_SEC_VERSION = 0x0000
}
p_secs_page ->flags.init = 1;
release_writer_lock(&se_rw_locks);
Set RFLAGS.Z = 1;
Return;
FAIL:
release_writer_lock(&se_rw_locks);
Set RFLAGS.Z = 0
Return;
```

Flags Affected
None
Use of Prefixes
Lock: causes UD#
REP: causes UD#
Segment overrides: N/A
Operand Size: causes UD#
Address Size: ignored
Protected Mode Exceptions
GP(0) If the current privilege level is not 0.
PF(fault-code) If a page fault occurs in access memory operands.
UD If enclaves are not enabled
Real Address Mode Exceptions
UD The instruction is not recognized in real address mode
Virtual 8086 Mode exceptions
UD The instruction is not recognized in 8086 mode
    ELPG
Instruction Description
This instruction is used to load a page into the Enclave Page Cache (EPC).
Instruction Inputs
Linear address of the source page: page_info
Linear address of the destination: epc_la

Instruction Operation

```
// uCode Scratchpad Variables
page_info_t *p_page_info;
secs_t *p_secs_page;
sid_t secs_sid, epc_sid;
void *p_content_page;
void *p_epc_page;
sec_info_t *p_sec_info;
sec_info_t sec_info;
uint128 key;
uint64 lin_addr;
int ret_val = SE_FAIL;
fault_t fault= {0};
acquire_writer_lock(&se_rw_locks);
p_page_info = (page_info_t *)translate(context, rbx,
PAGE_ACCESS_READ, SE_PAGE_INFO_ALIGNMENT,
&fault);
if (fault.valid){
        ret_val = fault.reason;
        goto FAIL;
}
p_content_page = translate(context, p_page_info->content_page,
PAGE_ACCESS_READ, SE_CONTENT_PAGE_ALIGNMENT,
&fault);
if (fault.valid){
        ret_val = fault.reason;
        goto FAIL;
}
p_secs_page = (void *)translate(context, p_page_info->secs,
PAGE_ACCESS_READ | PAGE_ACCESS_WRITE| EPC_PAGE,
SE_SECS_PAGE_ALIGNMENT, &fault);
if (fault.valid){
        ret_val = fault.reason;
        goto FAIL;
}
p_sec_info = (sec_info_t *)translate(context, p_page_info->
sec_info, PAGE_ACCESS_READ | PAGE_ACCESS_WRITE,
SE_SEC_INFO_ALIGNMENT, &fault);
if (fault.valid){
        ret_val = fault.reason;
        goto FAIL;
}
p_epc_page = (void *)translate(context, rcx, PAGE_ACCESS_READ |
PAGE_ACCESS_WRITE| EPC_PAGE,
SE_EPC_PAGE_ALIGNMENT, &fault);
if (fault.valid){
        ret_val = fault.reason;
        goto FAIL;
}
secs_sid = pa2sid(p_secs_page);
if (!is_valid_sid(secs_sid) || !is_fresh_sid(secs_sid) ||
!is_secs_sid(secs_sid))
        goto FAIL;
lin_addr = p_page_info->lin_addr;
if (!is_enclave_addr(p_secs_page, lin_addr))
        goto FAIL; // address does not fall within ELS
memcpy(&sec_info, p_sec_info, sizeof(sec_info));
epc_sid = pa2sid(p_epc_page);
if (se_epc_m[epc_sid].flags.valid)
        goto FAIL; // dest is not free
memcpy (p_epc_page, p_content_page, sizeof(se_page_t));
if (sec_info.flags.pt == PT_SECS) {
        /* loading a secs */
        if (secs_sid != epc_sid || sec_info.flags.rp)
            goto FAIL;
            se_pmh_m[epc_sid].ref_count = 0;
            se_pmh_m[epc_sid].flags.ept = 0;
            se_epc_m[epc_sid].bits = 0;
            key = get_platform_key( );
} else {
        se_pmh_m[epc_sid].secs_sid = secs_sid;
        se_pmh_m[epc_sid].flags.ept = sec_info.flags.ept;
        se_epc_m[epc_sid].flags.rp = 1;
        se_epc_m[epc_sid].flags.pt = sec_info.flags.pt;
        se_epc_m[epc_sid].flags.fcr = 1;
        key = p_secs_page->key;
}
```

```
if (authenticated_decrypt(&key, p_epc_page, lin_addr &
p_secs_page->lin_addr_mask,&sec_info) != SE_OK)
        goto FAIL;
if (secs_sid != epc_sid)
        atomic_inc16(&(se_pmh_m[secs_sid].ref_count));
se_pmh_m[epc_sid].offset = (lin_addr & p_secs_page-
>lin_addr_mask)>>12;
se_pmh_m[epc_sid].flags.present = 0;
se_epc_m[epc_sid].flags.valid = 1;
release_writer_lock(&se_rw_locks);
return SE_OK;
FAIL:
release_writer_lock(&se_rw_locks);
return ret_val;
```

Return:
  If successful, the instruction sets the Z flag in the ELFAGS register to 0, otherwise the Z flag is set to one. The ENCLAVE_STATUS_MSR holds one of the following reasons:
  1. Page verification failed
  2. Parameters are not correctly aligned.
  3. page_info parameter malformed for SECS load
Flags Affected
  See operation.
Use of Prefixes
Lock: causes UD#
REP: causes UD#
Segment overrides: N/A
Operand Size: causes UD#
Address Size: ignored
Protected Mode Exceptions
GP(0) If the current privilege level is not 0.
PF(fault-code) If a page fault occurs in access memory operands.
UD If enclaves are not enabled
Real Address Mode Exceptions
UD The instruction is not recognized in real address mode
Virtual 8086 Mode exceptions
UD The instruction is not recognized in 8086 mode
  EWBINVPG
Instruction Description
This instruction is used to write-back dirty pages from EPC to the main memory.
Instruction Inputs
page_info
epc_la
Instruction Operation

```
// uCode Scratchpad Variables
page_info_t *p_page_info;
secs_t *p_secs_page;
sid_t secs_sid, epc_sid;
se_page_t *p_content_page;
se_page_t *p_epc_page;
sec_info_t *p_sec_info;
sec_info_t sec_info;
uint128 key;
uint64 lin_addr;
int ret_val = SE_FAIL;
fault_t fault= {0};
// End uCode Scratchpad
acquire_writer_lock(&se_rw_locks);
p_page_info = translate(context, rbx, PAGE_ACCESS_READ,
SE_PAGE_INFO_ALIGNMENT, &fault);
if (fault.valid) {
        ret_val = fault.reason;
        goto FAIL;
}
```

-continued

```
p_content_page = translate(context, p_page_info->content_page,
PAGE_ACCESS_READ | PAGE_ACCESS_WRITE,
SE_CONTENT_PAGE_ALIGNMENT, &fault);
if (fault.valid){
        ret_val = fault.reason;
        goto FAIL;
}
p_secs_page = translate(context, p_page_info->secs,
PAGE_ACCESS_READ | PAGE_ACCESS_WRITE| EPC_PAGE,
SE_SECS_PAGE_ALIGNMENT, &fault);
if (fault.valid) {
        ret_val = fault.reason;
        goto FAIL;
}
p_sec_info = translate(context, p_page_info->sec_info,
PAGE_ACCESS_READ | PAGE_ACCESS_WRITE,
SE_SEC_INFO_ALIGNMENT, &fault);
if (fault.valid){
        ret_val = fault.reason;
        goto FAIL;
}
p_epc_page = translate(context, rcx, PAGE_ACCESS_READ |
PAGE_ACCESS_WRITE| EPC_PAGE,
SE_EPC_PAGE_ALIGNMENT, &fault);
if (fault.valid){
        ret_val = fault.reason;
        goto FAIL;
}
secs_sid = pa2sid(p_secs_page);
if (!is_valid_sid(secs_sid) || !is_fresh_sid(secs_sid) ||
!is_secs_sid(secs_sid))
    goto FAIL;
if (!se_epc_m[secs_sid].flags.valid)
    goto FAIL;
epc_sid = pa2sid(p_epc_page);
if (!se_epc_m[secs_sid].flags.valid)
    goto FAIL;
lin_addr = ((se_pmh_m[epc_sid].offset << 12) ^ p_secs_page->
base_address;
if (is_secs_sid(epc_sid)) {
        if (epc_sid != secs_sid || se_pmh_m[epc_sid].ref_count !=
0)
            goto FAIL;
        key = get_platform_key( );
} else {
        if (se_pmh_m[epc_sid].secs_sid != secs_sid)
                goto FAIL;
        if (se_pmh_m[epc_sid].flags.present)
        {
          se_pmh_m[epc_sid].flags.present = 0;
          tlb_shootdown(secs_sid, lin_addr);
        }
        key = p_secs_page->key;
        atomic_inc16(&se_pmh_m[secs_sid].ref_count);
}
sec_info.version = se_versions[epc_sid];
sec_info.flags.bits = 0xFF;
sec_info.flags.rp = se_epc_m[epc_sid].flags.rp;
sec_info.flags.pt = se_epc_m[epc_sid].flags.pt;
sec_info.flags.ept = se_epc_m[epc_sid].flags.ept;
sec_info.flags.a_rp = (uint16)(se_pmh_m[epc_sid].flags.ept ? 1 :
0);
sec_info.flags.a_cp = (uint16)(se_pmh_m[epc_sid].flags.ept ? 1 :
0);
sec_info.flags.a_fp = (uint16)(se_pmh_m[epc_sid].flags.ept ? 1 :
0);
authenticated_encrypt(&key, p_epc_page,
(se_pmh_m[epc_sid].offset) << 12,&sec_info);
memcpy (p_content_page, p_epc_page, sizeof(se_page_t));
memcpy (p_sec_info, &sec_info, sizeof(sec_info_t));
se_epc_m[epc_sid].flags.valid = 0;
release_writer_lock(&se_rw_locks);
return SE_OK;
FAIL:
release_writer_lock(&se_rw_locks);
return ret_val;
```

Return:
If successful, the instruction sets the Z flag in the ELFAGS register to 0, otherwise the Z flag is set to one. The ENCLAVE_STATUS_MSR holds one of the following reasons:
1. The specified EPC slot is not occupied
2. Parameters are not correctly aligned.

Flags Affected
See operation.
Use of Prefixes
Lock: causes UD#
REP: causes UD#
Segment overrides: N/A
Operand Size: causes UD#
Address Size: ignored
Protected Mode Exceptions
GP(0) If the current privilege level is not 0.
PF(fault-code) If a page fault occurs in access memory operands.
UD If enclaves are not enabled
Real Address Mode Exceptions
UD The instruction is not recognized in real address mode
Virtual 8086 Mode exceptions
UD The instruction is not recognized in 8086 mode
EUPSMAP
Instruction Description
This instruction checks and updates the version of enclave page resident in the EPC.
Instruction Inputs
leaf
epc_la
smap_la
Instruction Operation

```
// uCode Scratchpad Variables
smap_t *p_smap_page;
sid_t secs_sid, epc_sid, smap_sid, smap_secs_sid;
void *p_epc_page;
unsigned long lin_offset;
unsigned char ver_offset;
int ret_val = SE_FAIL;
fault_t fault= {0};
// End uCode Scratchpad
acquire_writer_lock(&se_rw_locks);
p_epc_page = translate(context, rbx, PAGE_ACCESS_READ |
PAGE_ACCESS_WRITE| EPC_PAGE,
SE_EPC_PAGE_ALIGNMENT, &fault);
if (fault.valid){
        ret_val = fault.reason;
        goto FAIL;
}
epc_sid = pa2sid(p_epc_page);
if (!se_epc_m[epc_sid].flags.valid ||
!se_epc_m[epc_sid].flags.fcr ){
        ret_val = SE_FAIL;
        goto FAIL;
}
p_smap_page = translate(context, rcx, PAGE_ACCESS_READ |
PAGE_ACCESS_WRITE| EPC_PAGE,
SE_SMAP_PAGE_ALIGNMENT, &fault);
if (fault.valid){
        ret_val = fault.reason;
        goto FAIL;
}
smap_sid = pa2sid(p_smap_page);
if (!is_valid_sid(smap_sid) || !is_fresh_sid(smap_sid))
    goto FAIL;
secs_sid = se_pmh_m[epc_sid].secs_sid;
smap_pt = se_epc_m[smap_sid].flags.pt;
smap_secs_sid = se_pmh_m[epc_sid].secs_sid;
switch(se_epc_m[epc_sid].flags.pt)
{
```

```
            case PT_SECS:
                goto FAIL;
            case PT_SMAP_LEVEL_1:
                if (secs_sid != smap_sid || smap_pt != PT_SECS)
                    goto FAIL;
                lin_offset = 0;
                ver_offset = ((se_pmh_m[smap_sid].offset >> 16) & 0x7f) + 0x80;
                break;
            case PT_SMAP_LEVEL_2:
                if (secs_sid != smap_secs_sid || smap_pt != PT_SMAP_LEVEL_1)
                    goto FAIL;
                lin_offset = se_pmh_m[epc_sid].offset & 0xFF0000;
                ver_offset = (se_pmh_m[epc_sid].offset >> 8) & 0xFF;
                break;
            default:
                if (secs_sid != smap_secs_sid || smap_pt != PT_SMAP_LEVEL_2)
                    goto FAIL;
                lin_offset = se_pmh_m[epc_sid].offset & 0xFFFF00;
                ver_offset = se_pmh_m[epc_sid].offset & 0xff;
                break;
        }
        if (se_pmh_m[smap_sid].offset != lin_offset)
            goto FAIL;
        if (p_smap_page->version[ver_offset].bits[0] != se_versions[epc_sid].bits[0] || p_smap_page->version[ver_offset].bits[1] != se_versions[epc_sid].bits[1])
            goto FAIL;
        se_epc_m[epc_sid].flags.fcr = 0;
        se_versions[epc_sid] = get_version( );
        p_smap_page->version[ver_offset] = se_versions[epc_sid];
        if (se_epc_m[epc_sid].flags.pt == PT_REG)
            se_pmh_m[epc_sid].flags.present = 1;
        release_writer_lock(&se_rw_locks);
        return SE_OK;
FAIL:
        release_writer_lock(&se_rw_locks);
        return ret_val;
```

Return:
If successful, the instruction sets the Z flag in the ELFAGS register to 0, otherwise the Z flag is set to one. The ENCLAVE_STATUS_MSR holds one of the following reasons:
  1. TBD
Flags Affected
See operation.
Use of Prefixes
Lock: causes UD#
REP: causes UD#
Segment overrides: N/A
Operand Size: causes UD#
Address Size: ignored
Protected Mode Exceptions
GP(0) If the current privilege level is not 0.
PF(fault-code) If a page fault occurs in access memory operands.
UD If enclaves are not enabled
Real Address Mode Exceptions
UD The instruction is not recognized in real address mode
Virtual 8086 Mode Exceptions
UD The instruction is not recognized in 8086 mode
    EREMOVE
Instruction Description
This instruction updates the SMAP when data is loaded into the EPC.
Instruction Inputs
leaf
epc_la
smap_la Instruction Operation

```
// uCode Scratchpad Variables
smap_t *p_smap_page;
sid_t secs_sid, epc_sid, smap_sid;
void *p_epc_page;
unsigned long lin_offset;
unsigned char ver_offset;
int ret_val = SE_FAIL;
fault_t fault= {0};
// End uCode Scratchpad
acquire_writer_lock (&se_rw_locks);
p_epc_page = translate(context, rbx, PAGE_ACCESS_READ | PAGE_ACCESS_WRITE| EPC_PAGE,
    SE_EPC_PAGE_ALIGNMENT, &fault);
if (fault.valid){
    ret_val = fault.reason;
    goto FAIL;
}
epc_sid = pa2sid(p_epc_page);
if (!se_epc_m[epc_sid].flags.valid || se_epc_m[epc_sid].flags.fcr )
    goto FAIL;
p_smap_page = translate(context, rcx, PAGE_ACCESS_READ | PAGE_ACCESS_WRITE| EPC_PAGE,
    SE_SMAP_PAGE_ALIGNMENT, &fault);
if (fault.valid){
    ret_val = fault.reason;
    goto FAIL;
}
smap_sid = pa2sid(p_smap_page);
if (!is_valid_sid(smap_sid) || !is_fresh_sid(smap_sid))
    goto FAIL;
secs_sid = se_pmh_m[epc_sid].secs_sid;
smap_pt = se_epc_m[smap_sid].flags.pt;
smap_secs_sid = se_pmh_m[epc_sid].secs_sid;
switch(se_epc_m[epc_sid].flags.pt)
{
    case PT_SECS:
        goto FAIL;
    case PT_SMAP_LEVEL_1:
        if (secs_sid != smap_sid || smap_pt != PT_SECS)
            goto FAIL;
        lin_offset = 0;
        ver_offset = ((se_pmh_m[smap_sid].offset >> 16) & 0x7f) + 0x80;
        break;
    case PT_SMAP_LEVEL_2:
        if (secs_sid != smap_secs_sid || smap_pt != PT_SMAP_LEVEL_1)
            goto FAIL;
        lin_offset = se_pmh_m[epc_sid].offset & 0xFF0000;
        ver_offset = (se_pmh_m[epc_sid].offset >> 8) & 0xFF;
        break;
    default:
        if (secs_sid != smap_secs_sid || smap_pt != PT_SMAP_LEVEL_2)
            goto FAIL;
        lin_offset = se_pmh_m[epc_sid].offset & 0xFFFF00;
        ver_offset = se_pmh_m[epc_sid].offset & 0xff;
        break;
}
if (se_pmh_m[smap_sid].offset != lin_offset)
    goto FAIL;
if (p_smap_page->version[ver_offset].bits[0] != se_versions[epc_sid].bits[0] || p_smap_page->version[ver_offset].bits[1] != se_versions[epc_sid].bits[1])
    goto FAIL;
if ( se_pmh_m[epc_sid].flags.present == 1){
    se_pmh_m[epc_sid].flags.present = 0;
    tlb_shootdown(secs_sid,se_pmh_m[epc_sid].offset);
}
if (se_epc_m[epc_sid].flags.pt == PT_SMAP_LEVEL_1 || se_epc_m[epc_sid].flags.pt == PT_SMAP_LEVEL_2){
    // removing smap page
    int i;
    smap_t *temp = p_epc_page;
    for (i=0; i<256; i++)
        if ((temp->version[i].bits[0] != 0 || temp->version[i].bits[1] != 0))
```

```
        goto FAIL;
}
se_versions[epc_sid].bits[0] = 0;
se_versions[epc_sid].bits[1] = 0;
p_smap_page->version[ver_offset] = se_versions[epc_sid];
se_epc_m[epc_sid].flags.valid = 0;
atomic_dec16(&se_pmh_m[secs_sid].ref_count);
release_writer_lock(&se_rw_locks);
return SE_OK;
FAIL:
    release_writer_lock(&se_rw_locks);
    return ret_val;
```

Return:
If successful, the instruction sets the Z flag in the ELFAGS register to 0, otherwise the Z flag is set to one. The ENCLAVE_STATUS_MSR holds one of the following reasons:
 2. TBD
Flags Affected
See operation.
Use of Prefixes
Lock: causes UD#
REP: causes UD#
Segment overrides: N/A
Operand Size: causes UD#
Address Size: ignored
Protected Mode Exceptions
GP(0) If the current privilege level is not 0.
PF(fault-code) If a page fault occurs in access memory operands.
UD If enclaves are not enabled
Real Address Mode Exceptions
UD The instruction is not recognized in real address mode
Virtual 8086 Mode exceptions
UD The instruction is not recognized in 8086 mode
    EADDSMAP
Instruction Description
This instruction is used to add a new page to the SMAP when the enclave is already initialized.
Instruction Inputs
page_info
epc_la
smap_la

| Name of Offset | Value |
|---|---|
| LIN_ADDR | MBZ |
| SOURCE_PAGE | Linear address of the page where page contents are located |
| SEC_INFO | Linear address of the secinfo structure for the page |
| SECS | Linear address of EPC of empty slot |

Instruction Operation

```
// uCode Scratchpad Variables
page_info_t *p_page_info;
secs_t *p_secs_page;
smap_t *p_smap_page;
sid_t secs_sid, epc_sid, smap_sid;
void *p_epc_page;
sec_info_t *p_sec_info;
sec_info_t sec_info;
uint64 lin_addr;
unsigned char ver_offset;
se_epc_flags_t smap_bits;
int ret_val = SE_FAIL;
fault_t fault= {0};
// End uCode Scratchpad
acquire_writer_lock (&se_rw_locks);
p_page_info = (page_info_t *) translate (context, rbx,
PAGE_ACCESS_READ, SE_PAGE_INFO_ALIGNMENT, &fault);
if (fault.valid) {
        ret_val = fault.reason;
        goto FAIL;
}
p_secs_page = (void *) translate (context, p_page_info->secs,
PAGE_ACCESS_READ | PAGE_ACCESS_WRITE| EPC_PAGE,
SE_SECS_PAGE_ALIGNMENT, &fault);
if (fault.valid) {
        ret_val = fault.reason;
        goto FAIL;
}
p_sec_info = (sec_info_t *)translate(context, p_page_info->
sec_info, PAGE_ACCESS_READ , SE_SEC_INFO_ALIGNMENT,
&fault);
if (fault.valid) {
        ret_val = fault.reason;
        goto FAIL;
}
p_epc_page = (void *)translate(context, rcx, PAGE_ACCESS_READ |
PAGE_ACCESS_WRITE| EPC_PAGE,
SE_EPC_PAGE_ALIGNMENT, &fault);
if (fault.valid) {
        ret_val = fault.reason;
        goto FAIL;
}
p_smap_page = (void *)translate(context, rdx,
PAGE_ACCESS_READ |
PAGE_ACCESS_WRITE| EPC_PAGE,
SE_SMAP_PAGE_ALIGNMENT, &fault);
if (fault.valid) {
        ret_val = fault.reason;
        goto FAIL;
  }
    if (p_page_info->content_page != 0)
        goto FAIL;
secs_sid = pa2sid(p_secs_page);
if (!is_valid_sid(secs_sid) || !is_fresh_sid(secs_sid) ||
!is_secs_sid(secs_sid))
        goto FAIL;
lin_addr = p_page_info->lin_addr;
if (!is_enclave_addr(p_secs_page, lin_addr))
        goto FAIL; // address does not fall within ELS
if (!se_epc_m[secs_sid].flags.valid)
        goto FAIL;
memcpy(&sec_info, p_sec_info, sizeof(sec_info));
if (!((sec_info.flags.bits & SMAP_FLAG_MASK) ==
SMAP_FLAG_CONSTANT))
        goto FAIL;
epc_sid = pa2sid(p_epc_page);
if (se_epc_m[epc_sid].flags.valid)
        goto FAIL;
smap_sid = pa2sid(p_smap_page);
if (!se_epc_m[smap_sid].flags.valid)
        goto FAIL;
se_pmh_m[epc_sid].offset = (lin_addr & p_secs_page->
lin_addr_mask)>>12;
smap_bits.bits = 0;
smap_bits.flags.valid = 1;
smap_bits.flags.rp = 1;
if (sec_info.flags.pt == PT_SMAP_LEVEL_2) {
        if ( !(se_epc_m[smap_sid].flags.pt ==
PT_SMAP_LEVEL_1) &&
(se_pmh_m[smap_sid].secs_sid == secs_sid))
            goto FAIL;
        if ((se_pmh_m[epc_sid].offset & 0xFF0000) !=
se_pmh_m[smap_sid].offset)
            goto FAIL;
        ver_offset = (uint8)((se_pmh_m[epc_sid].offset >> 8) &
0xFF);
        smap_bits.flags.pt = PT_SMAP_LEVEL_2;
} else if(sec_info.flags.pt == PT_SMAP_LEVEL_1){
        if ( !(smap_sid == secs_sid))
            goto FAIL;
```

```
    ver_offset = (uint8)(((se_pmh_m[epc_sid].offset >> 16) &
0x7F) + 0x80);
        smap_bits.flags.pt = PT_SMAP_LEVEL_1;
} else {
        goto FAIL; // not an SMAP page
}
if (p_smap_page->version[ver_offset].bits[0] !=0 || p_smap_page->
version[ver_offset].bits[1] !=0)
        goto FAIL;
memset(p_epc_page, 0, 4096);
se_versions[epc_sid] = get_version( );
p_smap_page->version[ver_offset] = se_versions[epc_sid];
atomic_inc16(&(se_pmh_m[secs_sid].ref_count));
se_pmh_m[epc_sid].secs_sid = secs_sid;
se_pmh_m[epc_sid].flags.present = 0;
se_epc_m[epc_sid] = smap_bits;
release_writer_lock(&se_rw_locks);
return SE_OK;
FAIL:
release_writer_lock(&se_rw_locks);
return ret_val;
```

Return:
If successful, the instruction sets the Z flag in the ELFAGS register to 0, otherwise the Z flag is set to one. The ENCLAVE_STATUS_MSR holds one of the following reasons:
 3. TBD
Flags Affected
See operation.
Use of Prefixes
Lock: causes UD#
REP: causes UD#
Segment overrides: N/A
Operand Size: causes UD#
Address Size: ignored
Protected Mode Exceptions
GP(0) If the current privilege level is not 0.
PF(fault-code) If a page fault occurs in access memory operands.
UD If enclaves are not enabled
Real Address Mode Exceptions
UD The instruction is not recognized in real address mode
Virtual 8086 Mode exceptions
UD The instruction is not recognized in 8086 mode
 EMODIFY
Instruction Description
This instruction modifies the SEC_INFO field to allow an enclave to modify a page inside the enclave. The enclave requests the change to the page but then may accept the change to complete the process.
Instruction Inputs

| SEC_INFO pointer | EPC Linear Address | Mask |

Instruction Operation

```
// uCode Scratchpad Variables
    secs_t *p_secs_page;
    sid_t epc_sid, secs_sid;
    void *p_epc_page;
    sec_info_t *p_sec_info;
    sec_info_t sec_info;
    int ret_val = SE_FAIL;
    fault_t fault= {0};
    uint64 lin_addr;
// End uCode Scratchpad
acquire_writer_lock(&se_rw_locks);
p_sec_info = (sec_info_t *)translate(context, rbx,
PAGE_ACCESS_READ,
SE_SEC_INFO_ALIGNMENT, &fault);
if (fault.valid){
        ret_val = fault.reason;
        goto FAIL;
}
p_epc_page = (void *)translate(context, rcx, PAGE_ACCESS_READ |
PAGE_ACCESS_WRITE| EPC_PAGE,
SE_EPC_PAGE_ALIGNMENT, &fault);
if (fault.valid){
        ret_val = fault.reason;
        goto FAIL;
}
memcpy(&sec_info, p_sec_info, sizeof(sec_info));
epc_sid = pa2sid(p_epc_page);
if (!se_epc_m[epc_sid].flags.valid ||
se_epc_m[epc_sid].flags.fcr ||
se_epc_m[epc_sid].flags.pt != PT_REG ||
        se_pmh_m[epc_sid].flags.ept != 0)
        goto FAIL;
se_pmh_m[epc_sid].flags.present = 0;
secs_sid = se_pmh_m[epc_sid].secs_sid;
p_secs_page = (secs_t *)(se_epc + secs_sid);
lin_addr = (se_pmh_m[epc_sid].offset << 12) + p_secs_page->
base_address;
tlb_shootdown(secs_sid, lin_addr );
se_epc_m[epc_sid].flags.pt = PT_TCS;
se_pmh_m[epc_sid].flags.ept = EPT_MODIFY;
release_writer_lock(&se_rw_locks);
return SE_OK;
FAIL:
release_writer_lock(&se_rw_locks);
return ret_val;
```

Return:
If successful, the instruction sets the Z flag in the ELFAGS register to 0, otherwise the Z flag is set to one. The ENCLAVE_STATUS_MSR holds one of the following reasons:
 4. TBD
Flags Affected
See operation.
Use of Prefixes
Lock: causes UD#
REP: causes UD#
Segment overrides: N/A
Operand Size: causes UD#
Address Size: ignored
Protected Mode Exceptions
GP(0) If the current privilege level is not 0.
PF(fault-code) If a page fault occurs in access memory operands.
UD If enclaves are not enabled
Real Address Mode Exceptions
UD The instruction is not recognized in real address mode
Virtual 8086 Mode exceptions
UD The instruction is not recognized in 8086 mode
 EACCEPT
Instruction Description
Software inside the enclave uses this instructions to accept changes to the SEC_INFO field. This allows the SMAP to be updated to a new page type.
Instruction Inputs

| Linear Address | Flags | Mask |

89

Instruction Operation

```
// uCode Scratchpad Variables
sid_t epc_sid;
void *p_epc_page;
int ret_val = SE_FAIL;
fault_t fault= {0};
// End uCode Scratchpad
acquire_reader_lock(&se_rw_locks);
p_epc_page = translate(context, rbx, PAGE_ACCESS_READ |
PAGE_ACCESS_WRITE| EPC_PAGE,
SE_EPC_PAGE_ALIGNMENT,&fault);
if (fault.valid){
        ret_val = fault.reason;
        goto FAIL;
}
epc_sid = pa2sid(p_epc_page);
if (!se_epc_m[epc_sid].flags.valid ||
se_epc_m[epc_sid].flags.fcr || se_pmh_m[epc_sid].flags.ept == 0)
    goto FAIL;
if (current_secs_sid( ) != se_pmh_m[epc_sid].secs_sid)
    goto FAIL;
// todo: need to check flags
se_pmh_m[epc_sid].flags.ept = 0;
if (se_epc_m[epc_sid].flags.pt == PT_REG)
    se_pmh_m[epc_sid].flags.present =1;
release_reader_lock(&se_rw_locks);
return SE_OK;
FAIL:
release_reader_lock(&se_rw_locks);
return ret_val;
```

Return:
If successful, the instruction sets the Z flag in the ELFAGS register to 0, otherwise the Z flag is to one. The ENCLAVE_STATUS_MSR holds one of the following reasons:
  5. TBD Flags Affected
See operation.
Use of Prefixes
Lock: causes UD#
REP: causes UD#
Segment overrides: N/A
Operand Size: causes UD#
Address Size: ignored
Protected Mode Exceptions
GP(0) If the current privilege level is not 0.
PF(fault-code) If a page fault occurs in access memory operands.
UD If enclaves are not enabled
Real Address Mode Exceptions
UD The instruction is not recognized in real address mode
Virtual 8086 Mode exceptions
UD The instruction is not recognized in 8086 mode
  EENTER
Instruction Description
The EENTER instruction transfers execution to an enclave. At the end of the instruction, the CPU is running in enclave mode at the IP specified in the TCS oENTRY or oHANDLER. EENTER checks that TCS is a valid and available for entry. TCS and the corresponding SSA may be resident in memory for the instruction to proceed.
EENTER also checks the state machine to determine the type of entry and checks that only one logical processor is active inside a TCS at one time.
RFLAGS.TF has a slightly modified behavior on EENTER. RFLAGS.TF is stored into TCS.SAVE_TF and is then loaded from TCS.TF. A Debug Exception is then conditionally generated depending on the updated value of RFLAGS.TF.

90

If the enclave is in not Debug Mode, debug register DR7 is saved into TCS.DR7 and is cleared. Likewise for the IA32_DEBUGCTL MSR.

Instruction Inputs

| RAX | 0x4 |
| RBX | TCS pointer |

Instruction Outputs

| RCX | EPC Linear Address |

Instruction Operation

```
// uCode scratchpad
Uint64 p_tcs_page, enc_top_addr , flags, Tmp_CurrSSASlot;
Uint16 tcs_sid, ssa_sid, secs_sid;
// End uCode scratchpad
// Caching may be enabled
if (!CR0.CD)
    UD( );
//No EENTER while executing inside an enclave
if (Reg_EnclaveMode)
    GP(0);
// check that all segment register bases are 0
if (CS_base != 0 || DS_base !=0 || SS_base != 0 || ES_base != 0)
    GP(faulting segment sel);
// Enclaves can only be entered from ring 3
If (CPL != 3)
    UD( );
p_tcs_page = translate(context, RBX, PAGE_ACCESS_READ |
    PAGE_ACCESS_WRITE | EPC_PAGE,
    SE_TCS_PAGE_ALIGNMENT, &fault);
acquire_writer_lock(&se_rw_locks);
// Make sure we're in the right state
if (p_tcs_page->STATE != INACTIVE &&
    p_tcs_page->STATE != EXCEPTED)
    goto FAIL0
// Get the TCS slotID, then get the SECS physical page
tcs_sid = pa2sid(p_tcs_page);
p_secs_page = &se_epc[se_pmh_m[tcs_sid].secs_sid];
if (!p_secs_page || p_secs_page->init != 1)
    GP(0);
// Make sure the supplied TCS page has the TCS attribute set
if (se_epc_m[tcs_sid].flags.pt != PT_TCS)
{
    GP(0);
}
Tmp_CurrSSASlot = p_tcs_page->CSSA
// check that current SSA slot is valid.
if (Tmp_CurrSSASLot < 0 || Tmp_CurrSSASLot >= p_tcs_page->
num_ssa_slots)
    goto FAIL0;
// compute physical address to check EPC presence
Reg_SSAptr = translate(context, p_tcs_page->ssa_base +
    Tmp_CurrSSASLot*SSA_SIZE, PAGE_ACCESS_WRITE |
    EPC_PAGE, SE_SSA_PAGE_ALIGNMENT);
// make sure ssa page belongs to the same enclave
ssa_sid = pa2sid (Reg_SSAptr);
if (se_pmh_m[tcs_sid] != se_pmh_m[ssa_sid])
    goto FAIL0;
// Save the base and limit
CReg_EnclaveBaseLa = p_secs_page->BaseAdr;
CReg_EnclaveLimit = p_secs_page->Limit;
RDX = RIP + 4;
switch (p_tcs_page->tcs_state)
}
case INACTIVE:
    p_tcs_page->tcs_state = ACTIVE;
    RIP += p_tcs_page->oEntry;
    break;
case EXCEPTED:
    p_tcs_page->tcs_state = HANDLING;
    RIP += p_tcs_page->oHandler;
    break;
```

```
}
Set Reg_TCS to p_tcs_page;
Set Reg_SECS to p_secs_page;
Set Reg_SecsSID to secs_sid;
Set Reg_EnclaveMode to TRUE;
if (p_secs_page->debug == 0)
{
    p_tcs_page->SAVE_DR7 = DR7;
    DR7 = 0;
    p_tcs_page->SAVE_DEBUGCTL = IA32_DEBUGCTL;
    SAVE_DEBUGCTL = 0;
}
p_tcs_page->SAVE_TF = RFLAGS.TF;
RFLAGS.TF = p_tcs_page->TF;
Normal processing of RFLAGS.TF and RFLAGS.RF now occurs;
release_writer_lock(&se_rw_locks);
Return;
FAIL0:
    release_writer_lock(&se_rw_locks);
    Set RFLAGS.Z = 0
    Return;
```

Flags Affected
None
Use of Prefixes
Lock: causes UD#
REP: causes UD#
Segment overrides: N/A
Operand Size: causes UD#
Address Size: ignored
RFLAGS.TF Behavior
The value of RFLAGS.TF at the start of execution of EENTER has no effect on a trap on completion of EENTER. Instead, the value of RFLAGS.TF that is loaded from the TCS determines whether or not a trap is taken.
DR7 Behavior
If the enclave is in not Debug Mode, debug register DR7 is saved into TCS.DR7 and is cleared.
IA32_DEBUG_CTL Behavior
If the enclave is in not Debug Mode, the IA32_DEBUG_CTL MSR is saved into TCS.
DEBUG_CTL and is cleared.
Protected Mode Exceptions
GP(0) If the current privilege level is not 3.
    If executed inside an enclave.
    If the processor is in SMM
    If segment registers or limit registers not correctly set.
    If thread busy
    Executed in enclave mode
PF(fault-code) If a page fault occurs in access memory operands.
UD If enclaves are not enabled
Real Address Mode Exceptions
UD The ECALL instruction is not recognized in real address mode
Virtual 8086 Mode exceptions
UD The ECALL instruction is not recognized in 8086 mode
EEXIT
EEXIT exits to outside the enclave.
Instruction Description
EEXIT disables enclave mode and branches to the location specified in RBX.
No registers are affected by this instruction. If secrets are contained in any registers, it is responsibility of enclave software to clear those registers.
RFLAGS.TF has a slightly modified behavior on EEXIT. RFLAGS.TF is loaded from TCS.SAVE_TF. A Debug Exception is then conditionally generated depending on the updated value of RFLAGS.TF.
If the enclave is in not Debug Mode, debug register DR7 is loaded from TCS.DR7. This behavior and that of RFLAGS.TF is documented in more detail in ???.
Instruction Inputs

| RAX | 0x6 |
| RBX | Target address |

Instruction Operation

```
// uCode scratchpad
Uint64 p_tcs_page;
, enc_top_addr , flags, Tmp_CurrSSASlot;
Uint16 tcs_sid, secs_sid;
// End uCode scratchpad
// Instruction may be executed while inside an enclave
if (Reg_EnclaveMode == 0)
{
    #GP(0)
}
p_tcs_page = Reg_TCS
// May be in ACTIVE or HANDLING state
switch (p_tcs_page->State)
{
case HANDLING:
    p_tcs_page->State = HANDLED;
    break;
case ACTIVE:
    p_tcs_page->State = INACTIVE;
    break;
default:
    GP(3);           // Not in legal state
}
tcs_sid = pa2sid(p_tcs_page);
p_secs_page = sid2pa(se_epc[se_pmh_m[tcs_sid].secs_sid]);
RIP = RBX
Reg_EnclaveMode = 0
if (p_secs_page->debug == 0)
{
    DR7 = p_tcs_page->SAVE_DR7;
    IA32_DEBUGCTL = p_tcs_page->SAVE_DEBUGCTL;
}
RFLAGS.TF = p_tcs_page->SAVE_TF;
Normal processing of RFLAGS.TF and RFLAGS.RF now occurs;
```

Flags Affected
None
Use of Prefixes
Lock: causes UD#
REP: causes US#
Segment overrides: N/A
Operand Size: caused UD#
Address Size: ignored
RFLAGS.TF Behavior
The value of RFLAGS.TF at the start of execution of EEXIT has no effect on a trap on completion of EEXIT. Instead, the value of RFLAGS.TF that is loaded from the SSA determines whether or not a trap is taken.
DR7 Behavior
If the enclave is in not Debug Mode, debug register DR7 is loaded from TCS.DR7.
IA32_DEBUG_CTL Behavior
If the enclave is in not Debug Mode, the IA32_DEBUG_CTL MSR is loaded from TCS.
DEBUG_CTL.

Protected Mode Exceptions
GP(0) If the current privilege level is not 3.
    If executed outside an enclave.
    If the processor is in SMM
    If segment registers or limit registers not correctly set.
    If thread busy not in ACTIVE or HANDLED state
PF(fault-code) If a page fault occurs in access memory operands.
UD If enclaves are not enabled
Real Address Mode Exceptions
UD The EEXIT instruction is not recognized in real address mo
Virtual 8086 Mode exceptions
UD The EEXIT instruction is not recognized in 8086 mode
EIRET
Instruction Description
The EIRET instruction resumes execution of an enclave that was interrupted due to an exception or interrupt using the machine state previously stored in the SSA.
EIRET checks that TCS is a valid and available for resumption. TCS and the corresponding SSA may be resident in memory for the instruction to proceed.
EIRET also checks the state machine to determine the type of entry and checks that only one logical processor is active inside a TCS at one time.
If RFLAGS.TF is set on EIRET, a Debug Exception will occur upon completion of the instruction, i.e. normal TF behavior. This exception will be reported as having occurred inside the enclave (in the usual SE-defined fashion), with no instructions having been executed inside. Since EIRET restores RFLAGS from the SSA, TF may become set at the end of EIRET. In this case, the TF will affect the following instruction; again, normal TF behavior.
Instruction Inputs

| RAX | 0x5 |
|---|---|
| RBX | TCS pointer |

Instruction Operation

```
// uCode scratchpad
Uint64 p_tcs_page, enc_top_addr , flags, Tmp_CurrSSASlot;
Uint16 tcs_sid, secs_sid;
// End uCode scratchpad
// Caching may be enabled
if (!CR0.CD)
    UD( );
//No EIRET while executing inside an enclave
if (Reg_EnclaveMode)
    GP(0);
// check that all segment register bases are 0
if (CS_base != 0 || DS_base !=0 || SS_base != 0 || ES_base != 0)
    GP(faulting segment sel);
// Enclaves can only be entered from ring 3
If(CPL != 3)
    UD( );
p_tcs_page = translate(context, tcs_la, PAGE_ACCESS_READ |
PAGE_ACCESS_WRITE, SE_TCS_ALIGNMENT, &fault);
acquire_writer_lock(&se_rw_locks);
// Make sure we're in the right state
if (p_tcs_page->STATE != INTERRUPTED &&
    p_tcs_page->STATE != HANDLED)
    goto FAIL0
// Get the TCS slotID, SECS slotID and a pointer to the EPC copy of the
SECS
tcs_sid = pa2sid(p_tcs_page);
p_secs_page = &se_epc[se_pmh_m[tcs_sid].secs_sid];
if (!p_secs_page || p_secs_page->init != 1)
    GP(0);
// Make sure the supplied TCS page has the TCS attribute set
if (se_epc_m[tcs_sid].flags.pt != PT_TCS)
{
    GP(0);
}
Tmp_CurrSSASlot = p_tcs_page->CSSA
// check that current SSA slot is valid.
Verify that 0< Tmp_CurrSSASLot <= p_tcs_page->num_ssa_slots,
else goto FAIL0;
Reg_SSAptr = translate(context, p_tcs_page->ssa_base +
(Tmp_CurrSSASLot - 1)*SSA_SIZE,
PAGE_ACCESS_READ | PAGE_ACCESS_WRITE,
SE_SSA_PAGE_ALIGNMENT);
// Set up enclave PMH sate
CReg_EnclaveBaseLa = p_secs_page->BaseAdr;
CReg_EnclaveLimit = p_secs_page->Limit;
tempTF = RFLAGS.TF;
Restore the registers RAX, RBX, RCX, RDX, RSI, RDI, RSP, RBP, R8
to R15, RFLAGS, XMM0 to XMM15, RIP and p_tcs_page->State from
the SSA whose address is stored in Reg_SSA;
p_tcs_page->current_ssa_slot = Tmp_CurrSSASLot - 1;
Set Reg_TCS to p_tcs_page;
Set Reg_SECS to p_secs_page;
Set Reg_SecsSID to secs_sid;
Set Reg_EnclaveMode to TRUE;
#DB trap occurs after instruction if tempTF (see above) was set.
Return;
FAIL0:
    release_writer_lock(&se_rw_locks);
    Set RFLAGS.Z = 0
    Return;
```

Flags Affected
None
Use of Prefixes
Lock: causes UD#
REP: causes UD#
Segment overrides: N/A
Operand Size: causes UD#
Address Size: ignored
RFLAGS.TF Behavior
If RFLAGS.TF is set at the start of the EIRET instruction, #DB will occur after completion. The exception will be reported at the RIP to which control would have been transferred had TF not been set. In effect, no forward progress within the enclave will occur.
As part of the normal operation of EIRET, RFLAGS is restored from the SSA copy. If the resulting TF is set, #DB will occur after execution of the target instruction inside the enclave. These behaviors are consistent with those of the normal IA IRET instruction.
DR7 Behavior
DR7 is restored from the SSA copy that was previously save in the last interrupt or exception.
IA32_DEBUG_CTL Behavior
The IA32_DEBUG_CTL MSR is restored from the SSA copy that was previously save in the last interrupt or exception.
Protected Mode Exceptions
GP(0) If the current privilege level is not 3.
    If executed inside an enclave.
    If the processor is in SMM.
    If segment registers or limit registers not correctly set.
    If thread busy
    Executed in enclave mode
PF(fault-code) If a page fault occurs in access memory operands.
UD If enclaves are not enabled Real Address Mode Exceptions
UD The ECALL instruction is not recognized in real address mode
Virtual 8086 Mode exceptions
UD The ECALL instruction is not recognized in 8086 mode
EREPORT
The EREPORT instruction reports a measurement about the enclave contents
Instruction Description
EREPORT retrieves the enclave measurement registers, its capabilities and debug status (flags). All these values are protected using a symmetric message authentication code, which can be verified using the REPORT key. Enclaves which require the REPORT key may have the appropriate capability set in their SECS to retrieve it using the EGETKEY instruction. The result of this instruction is deposited in the destination location, output_buffer_la.
Instruction Inputs

| | | |
|---|---|---|
| RAX | 0x0 | |
| RBX | output_buffer_la | |
| RCX | userInput_la | |

Instruction Operation

```
// uCode Scratchpad Variables
Uint64 p_secs_page,
Uint16 secs_sid;
report_t report;
// End uCode scratchpad
IF (Reg_EnclaveMode == 0)
    GP(0);
verify that output_buffer is naturally aligned
// retrieve enclave information
secs_sid = Reg_SecsSID;
p_secs_page = Reg_SECS;
report.flags = p_secs_page->flags;
// Get next derived AES key. returning the key and the keyID
key = deriveKey(REPORT, currentkeyID);
// populate the rest of the report structure
guest copy 32 bytes from userInput_la to report.userdata
report.capabilities = p_secs_page ->capabilities;
report.tcbVersion = currentTCBVersion;
report.isv_version = p_secs_page ->isv_version;
report.MR_EADD = p_secs_page ->MR_EADD;
report.MR_POLICY = p_secs_page ->MR_POLICY;
report.MR_SWCODE = 0;
report.MR_SWPOLICY = 0;
//Compute the CMAC over report structure
report.MAC = cmac(report, key)
guest copy report to output_buffer_la
Set RFLAGS.Z = 0
Return;
```

Flags Affected
None
Use of Prefixes
Lock: causes UD#
REP: causes US#
Segment overrides: N/A
Operand Size: caused UD#
Address Size: ignored
Protected Mode Exceptions
PF(fault-code) If a page fault occurs in access memory operands.
UD If enclaves are not enabled
Real Address Mode Exceptions
UD The EREPORT instruction is not recognized in real address mo Virtual 8086 Mode exceptions
UD The EREPORT instruction is not recognized in 8086 mode
ERDMR
The ERDMR instruction reads the measurement register values out of the enclave SECS
Instruction Description
This instruction can only be executed from outside the enclave. If the SECS points to a valid SECS page then the instruction outputs the contents of the enclaves measurement registers to the address specified by output_buffer_la.
Instruction Inputs

| | | |
|---|---|---|
| RAX | 0x8 | |
| RBX | secs_la | |
| RCX | output_buffer_la | |

Instruction Operation

```
// uCode Scratchpad Variables
Uint64 p_secs_page,
Uint16 secs_sid;
instantiate & initialize report on scratch pad
// End uCode scratchpad
copy from userInput_la to scratch pad
verify that output_buffer is naturally aligned
// Called from within the enclave
IF (Reg_EnclaveMode)
    GP(0);
// translate & verify secs_la
acquire_writer_lock(&se_rw_locks);
p_secs_page = (secs_t *) translate(context, rbx,
    PAGE_ACCESS_READ | PAGE_ACCESS_WRITE| EPC_PAGE,
    SE_SECS_PAGE_ALIGNMENT, &fault);
if (fault.valid){
    ret_val = fault.reason;
    goto FAIL;
}
secs_sid = pa2sid(p_secs_page);
// is page really an SECS?
if (!is_valid_sid(secs_sid) || !is_secs_sid(secs_sid))
    goto FAIL;
// populate the MR data structure
Output_buffer_la->MR_EADD = p_secs_page ->MR_EADD;
Output_buffer_la->MR_POLICY = p_secs_page ->MR_POLICY;
Output_buffer_la->MR_SWCODE = 0;
Output_buffer_la->MR_SWPOLICY = 0;
release_writer_lock(&se_rw_locks);
Set RFLAGS.Z = 1;
Return;
FAIL:
release_writer_lock(&se_rw_locks);
Set RFLAGS.Z = 0
Return;
```

Flags Affected
None
Use of Prefixes
Lock: causes UD#
REP: causes US#
Segment overrides: N/A
Operand Size: caused UD#
Address Size: ignored
Protected Mode Exceptions
PF(fault-code) If a page fault occurs in access memory operands.
UD If enclaves are not enabled
Real Address Mode Exceptions
UD The EREPORT instruction is not recognized in real address mo Virtual 8086 Mode exceptions
UD The EREPORT instruction is not recognized in 8086 mode
EGETKEY
Used by enclave code to return a particular key from the processor key hierarchy.
Instruction Description
The key required is specified using a KeyRequest structure, the address of which is provided as an input. This address may be naturally aligned.
The output is always a 256 bit data value. output_la needs to be naturally aligned for this value
Inputs

| RAX | 0x02 |
| RBX | request_la |
| RCX | output_buffer_la |

Instruction Operation

```
// uCode Scratchpad Variables
SECS        *pSECS;
UINT8       derivationBuffer[DERV_BUFFER_SIZE];
UINT128     finalKey, baseKey;
UINT128     capabilitiesMask = {0};
// End Scratchpad Variables
IF (!Reg_EnclaveMode)
    Return ERROR; // can't request enclave key if not in enclave mode
ENDIF
// get the pointer to the current SECS
pSECS =;
memset(baseKey, 0x00, sizeof(baseKey));
memset(finalKey, 0x00, sizeof(finalKey));
memset(derivationBuffer, 0x00, sizeof(derivationBuffer));
if (pSECS->flags & SE_FLAGS_DEBUG)
    derivationBuffer[DB_DEBUG] = DBV_DEBUG_ON;
else
    derivationBuffer[DB_DEBUG] = DBV_DEBUG_OFF;
switch(request_la->keySelect) {
    case KEYSELECT_OOB:
        // Out of Band Key
        if (pSECS->capabilities & CAPL_KEY_OOB) {
            getBaseKey(BK_OOB_KEY,
pKeyRequest->hwSecVersion, baseKey);
            derivationBuffer[DB_FIXED_LABEL] =
                FS_OOB_KEY;
            COPY pSECS->Reg1  to
derivationBuffer[DB_MRPOLICY];
        } else {
            // The enclave doesn't have the right capabiltiy to have access to
            // the Key
            return SE_INVALID_CAPABILITY;
        }
        break;
    case KEYSELECT_PROV:
        if (pSECS->capabilities & CAPL_KEY_PROV_KEY)) {
            derivationBuffer[DB_FIXED_LABEL] =
                FS_PROVISIONING_KEY;
            COPY pSECS->isvSecVersion to
derivationBuffer[DB_TCB_ISV];
            COPY pSECS->permitSecVersion to
derivationBuffer[DB_TCB_PE];
            COPY pSECS->Reg1 to derivationBuffer[DB_MRPOLICY];
        } else {
            return SE_INVALID_CAPABILITY;
        }
        break;
    case KEYSELECT_PERMIT:
        //Permit Key
        if (pSECS->capabilities & CAPL_KEY_PERMIT_KEY){
            derivationBuffer[DB_FIXED_LABEL] =
                FS_PERMIT_KEY;
            COPY ownerEpochMSR to
derivationBuffer[DB_OWNEREPOCH];          COPY pSECS->isvSecVersion to derivationBuffer[DB_TCB_ISV];
            COPY SE_PERMSEC_DEFAULT to
derivationBuffer[DB_TCB_PE];
            COPY request_la->randomness to
derivationBuffer[DB_KEYID]; } else {
            return SE_INVALID_CAPABILITY;
        }
        break;
    case KEYSELECT_REPORT:
        // Report Key
        if (pSECS->capabilities & CAPL_KEY_REPORT_KEY) {
            derivationBuffer[DB_FIXED_LABEL] =
                FS_REPORT_KEY;
            COPY ownerEpochMSR to
derivationBuffer[DB_OWNEREPOCH];           COPY request_la->randomness to derivationBuffer[DB_KEYID];
        } else {
            return SE_INVALID_CAPABILITY;
        }
        break;
    case KEYSELECT_AUTH:
        // Authentication Key - used by the enclave to authenticate data from
        // the QE
        derivationBuffer[DB_FIXED_LABEL] = FS_AUTH_KEY;
        COPY ownerEpochMSR to
            derivationBuffer[DB_OWNEREPOCH];
                COPY pSECS->isvSecVersion to
derivationBuffer[DB_TCB_ISV];
        COPY pSECS->permitSecVersion to
derivationBuffer[DB_TCB_PE];
        COPY pSECS->Reg0 to derivationBuffer[DB_MREADD];
        break;
    case KEYSELECT_AUTH_ISV:
        // Authentication Key - used by the QE to authenticate data to an ISV
        // enclave
        if (pSECS->capabilities & CAPL_KEY_ISV_AUTH)) {
            derivationBuffer[DB_FIXED_LABEL] =
                FS_AUTH_KEY;
            COPY ownerEpochMSR to
derivationBuffer[DB_OWNEREPOCH];           COPY pSECS->isvSecVersion to derivationBuffer[DB_TCB_ISV];
            COPY pSECS->permitSecVersion to
derivationBuffer[DB_TCB_PE];
            COPY request_la->randomness to
derivationBuffer[DB_MREADD};
        } else {
            return SE_INVALID_CAPABILITY;
        }
        break;
    case KEYSELECT_SEAL:
        // Seal Key
        if (request_la->isvSecVersion > pSECS->isvSecVersion)
            // You cannot ask for a future TCB Key
            return SE_INVALID_TCBREQUEST;
        if (request_la->permitSecVersion > pSECS->permitSecVersion)
            // You cannot ask for a future TCB Key
            return SE_INVALID_TCBREQUEST;
        // Check if the user has selected a legal combintation for keyPolicy
        if (request_la->keyPolicy & KEYPOLICY_VALID_MASK)
            return SE_INVALID_KEYPOLICY;
        // All is OK build the derivation string
        derivationBuffer[DB_FIXED_LABEL] = FS_SEAL_KEY;
        COPY ownerEpochMSR to
            derivationBuffer[DB_OWNEREPOCH];
                COPY pSECS->isvSecVersion to
derivationBuffer[DB_TCB_ISV];
        COPY pSECS->permitSecVersion to
derivationBuffer[DB_TCB_PE];
        if (request_la->keyPolicy & KEYPOLICY_MREADD)
            COPY pSECS->Reg0 to derivationBuffer[DB_MREADD];
        if (request_la->keyPolicy & KEYPOLICY_MRPOLICY)
            COPY pSECS->Reg1 to derivationBuffer[DB_MRPOLICY];
        COPY request_la->randomness to
derivationBuffer[DB_KEYID];           break;
    case KEYSELECT_EPID_ID:
```

```
        // Device ID
        if (pSECS->capabilities & CAPL_KEY_EPID_ID)) {
            COPY EPID_ID to output_la
                return SE_SUCCESS;
        } else {
                return SE_INVALID_CAPABILITY;
        }
        break;
    case KEYSELECT_EPID_BLOB:
    // The fused safeID Key blob
        if (pSECS->capabilities & CAPL_KEY_EPID)) {
            COPY EPID_BLOB to output_la
                return SE_SUCCESS;
        } else {
                return SE_INVALID_CAPABILITY;
        }
        break;
    case KEYSELECT_EPID_RAND:
    // The other portion of the safeID rand - derived
        if (pSECS->capabilities & CAPL_KEY_EPID)) {
            COPY EPID_RAND to output_la
                return SE_SUCCESS;
        } else {
                return SE_INVALID_CAPABILITY;
        }
        break;
    default:
        return SE_INVALID_KEYSELECT;
        break;
}
//
// Derive the key and return it
//
deriveKey(finalKey, baseKey, derivationBuffer,
sizeof(derivationBuffer));
guest_memcpy (pOutputBuffer, finalKey, sizeof(finalKey));
// Clear internal memory of keys
memset(baseKey, 0x00, sizeof(baseKey));
memset(finalKey, 0x00, sizeof(finalKey));
return    SE_SUCCESS;
```

Flags Affected
None
Use of Prefixes
Lock: causes UD#
REP: causes US#
Segment overrides: N/A
Operand Size: caused UD#
Address Size: ignored
Protected Mode Exceptions
PF(fault-code) If a page fault occurs in access memory operands.
UD If enclaves are not enabled
Real Address Mode Exceptions
UD The EGETKEY instruction is not recognized in real address mo
Virtual 8086 Mode exceptions
UD The EGETKEY instruction is not recognized in 8086 mode
    ERDTCSPTR
Instruction Description
The ERDTCSPTR instruction is used to read the current TCS linear address into RBX
Instruction Output

| | |
|---|---|
| RAX | 0x3 |

Instruction Output

| | |
|---|---|
| RBX | Current TCS pointer |

Instruction Operation

```
// Instruction may be executed while inside an enclave
if (Reg_EnclaveMode == 0)
{
    #GP(0)
}
RBX = Reg_TCS
```

Flags Affected
None
Use of Prefixes
Lock: causes UD#
REP: causes US#
Segment overrides: N/A
Operand Size: caused UD#
Address Size: ignored
Protected Mode Exceptions
UD If enclaves are not enabled
GP(0) If executed outside an enclave.
Real Address Mode Exceptions
UD The ERDTCSPTR instruction is not recognized in real address mode
Virtual 8086 Mode exceptions
UD The ERDTCSPTR instruction is not recognized in 8086 mode
    EDBGRD
Instruction Description
The EDBGRD instruction is used to read 8 bytes from debug enclave
Instruction Inputs
epc_la
dest
Instruction Operation

```
unsigned short epc_sid;
uint64 *p_epc_page, *p_dest;
int ret_val = SE_FAIL;
fault_t fault= {0};
secs_t *p_secs_page;
// End uCode scratchpad
acquire_reader_lock(&se_rw_locks);
if (thread( )->enclave_mode)
        goto FAIL;
p_epc_page = translate(context, rbx, PAGE_ACCESS_READ |
EPC_PAGE, 0x7,&fault);
if (fault.valid){
        ret_val = fault.reason;
        goto FAIL;
}
epc_sid = pa2sid(p_epc_page);
p_dest = translate(context, rcx, PAGE_ACCESS_READ |
PAGE_ACCESS_WRITE, 0x7, &fault);
if (fault.valid){
        ret_val = fault.reason;
        goto FAIL;
}
if (!se_epc_m[epc_sid].flags.valid || !is_present(epc_sid))
        goto FAIL;
p_secs_page = &se_epc[se_pmh_m[epc_sid].secs_sid];
if (!p_secs_page->flags.debug)
        goto FAIL;
*p_dest = *p_epc_page;
release_reader_lock(&se_rw_locks);
return SE_OK;
```

-continued

```
FAIL:
    release_reader_lock(&se_rw_locks);
    return ret_val;
```

Flags Affected
None
Use of Prefixes
Lock: causes UD#
REP: causes UD#
Segment overrides: N/A
Operand Size: causes UD#
Address Size: ignored
Protected Mode Exceptions
GP(0) If Enclave is not marked debug
PF(fault-code) If a page fault occurs in access memory operands.
UD If enclaves are not enabled
Real Address Mode Exceptions
UD The EDBGRD instruction is not recognized in real address mode
Virtual 8086 Mode exceptions
UD The EDBGRD instruction is not recognized in 8086 mode
    EDBGWR
Instruction Description
The EDBGWR instruction is used to write 8 bytes to debug enclave page
Instruction Inputs
src
epc_la
Instruction Operation

```
unsigned short epc_sid;
uint64 *p_epc_page, *p_src;
secs_t *p_secs_page;
int ret_val = SE_FAIL;
fault_t fault= {0};
//End uCode scratchpad
acquire_writer_lock(&se_rw_locks);
if (thread( )->enclave_mode)
        goto FAIL;
p_epc_page = translate(context, rbx, PAGE_ACCESS_READ |
PAGE_ACCESS_WRITE |EPC_PAGE, 0x7, &fault);
if (fault.valid) {
        ret_val = fault.reason;
        goto FAIL;
}
epc_sid = pa2sid(p_epc_page);
p_src = translate(context, rcx, PAGE_ACCESS_READ |
PAGE_ACCESS_WRITE, 0x7, &fault);
if (fault.valid) {
        ret_val = fault.reason;
        goto FAIL;
}
if (!se_epc_m[epc_sid].flags.valid || !is_present(epc_sid) ||
is_tcs_sid(epc_sid))
        goto FAIL;
p_secs_page = &se_epc[se_pmh_m[epc_sid].secs_sid];
if (!p_secs_page->flags.debug)
        goto FAIL;
*p_epc_page = *p_src;
release_writer_lock(&se_rw_locks);
return SE_OK;
FAIL:
release_writer_lock(&se_rw_locks);
return ret_val;
```

Flags Affected
None
Use of Prefixes
TBD
Protected Mode Exceptions
GP(0) If Enclave is not marked debug
PF(fault-code) If a page fault occurs in access memory operands.
UD If enclaves are not enabled
Real Address Mode Exceptions
UD The EDBGWR instruction is not recognized in real address mode
Virtual 8086 Mode exceptions
UD The EDBGWRITE instruction is not recognized in 8086 mode
    ERDINFO
The ERDINFO instruction returns information, about the contents of the enclave page cache
Instruction Description
If executed outside the enclave EREPORT reports the enclave measurement registers its capabilities and debug status (flags). All these values are protected using a symmetric message authentication code, which can be verified using the EVERIFYREPORT instruction.
The result of this instruction is deposited in the destination location, output_buffer_la.
Instruction Inputs

| | |
|---|---|
| epc_la | // Linear address of the page inside EPC |
| page_info | // The SEC_INFO field inside page_info may be populated with a valid pointer to // a naturally aligned SEC_INFO structure |

Instruction Operation

```
// uCode Scratchpad Variables
Uint64 p_page_info;
Uint64 p_sec_info;
Uint64 p_epc_page;
Uint64 epc_sid;
Uint64 secs_sid;
Uint64 p_epcm_entry;
// End uCode scratchpad
If (Enclaves not enabled)
{
        Deliver #UD
}
If (CPL != 0)
{
        Deliver #GP.
}
If (VMX enabled && VMCS.ERDINFO_EXIT ==1)
{
        Deliver appropriate VMEXIT
}
if(p_epc_page <EPC_BASE || p_epc_page >= EPC_BASE +
EPC_SIZE)
{
        Deliver FAULT; May be failure
}
Ensure that page_info is aligned on 32-byte boundary, else go to FAIL0;
Ensure that epc_la is aligned on 4096-byte boundary, else go to FAIL0;
p_page_info = xuTranslate(page_info, PAGE_ACCESS_READ |
PAGE_ACCESS_WRITE);
p_epc_page = xuTranslate(epc_la, PAGE_ACCESS_READ);
p_sec_info = xuTranslate(p_page_info->SEC_INFO,
PAGE_ACCESS_READ |
                    PAGE_ACCESS_WRITE);
epc_sid = (p_epc_page – EPC_BASE) >> 12;
p_epcm_entry = EPCM_BASE + epc_sid*SIZEOF_EPCM_ENTRY;
secs_sid = p_epcm_entry->secs_sid;
```

```
p_secs_epcm_entry = EPCM_BASE +
  secs_sid*SIZEOF_EPCM_ENTRY;
p_page_info->LIN_ADDR = p_epcm_entry->offset;
p_page_info->SECS = p_secs_epcm_entry->offset;
p_sec_info->FLAGS = p_epcm_entry->FLAGS;
Set RFLAGS.ZF to 1
Return
FAIL0:
Set RFLAGS.ZF to 0
return
```

Flags Affected

RFLAGS.ZF

Use of Prefixes

Lock: causes UD#

REP: causes US#

Segment overrides: N/A

Operand Size: caused UD#

Address Size: ignored

Protected Mode Exceptions

PF(fault-code) If a page fault occurs in access memory operands.

UD If enclaves are not enabled

GP If CPL !=0

FAULT If epc_la does not point within EPC

Real Address Mode Exceptions

UD The EREPORT instruction is not recognized in real address mo

Virtual 8086 Mode exceptions

UD The EREPORT instruction is not recognized in 8086 mode

Routine References

Exits

This section provides pseudocode for exit processing. This code is invoked when there is an exit from the enclave which is not planned by the enclave code. Enclave execution is resumed at the place where it was stopped. Information needed to resume is saved on the outside stack. The architectural state of the processor is saved in the appropriate save area.

Operation

```
nextRIP = 0 // Need to vet with SWWG
    SAVE STATE AREA
        TCS STATE VARIABLE
        INTERRUPT VECTOR NUMBER
        EXCEPTION ERROR CODE
        XSAVE
        GPRs
        RFLAGS
        RIP
        DR7
        IA32_DEBUGCTL
        TCS STATE VARIABLE = INTERRUPTED
        UPDATE TCS:CSSA
        nextRIP = TCS:IRR
GENERATE SYNTHETIC STATE
    RFLAGS = RFLAGS & ~0xff // make sure the right bits are being
                             cleared
    RFLAGS.TF = 0
    GPRs = 0, SSE = 0, MMX = 0, FP = 0, etc
    RBX = TCS
    RIP = nextRIP
    if (p_secs_page->debug == 0)
    {
        DR7 = p_tcs_page->SAVE_DR7;
        IA32_DEBUGCTL = p_tcs_page->SAVE_DEBUGCTL;
    }
Reg_EnclaveMode = 0
"NORMAL" EXCEPTION FLOW
``` acquire_reader_lock

RW locks enable logical processors to access shared resources and provide two modes in which threads can access a shared resource:

Shared mode grants shared read-only access to multiple reader logical processors, which enables them to read data from the shared resource concurrently.

Exclusive mode grants read/write access to one writer logical processor at a time. When the lock has been acquired in exclusive mode, no other thread can access the shared resource until the writer releases the lock.

A single RW lock can be acquired in either mode; reader logical processors can acquire it in shared mode whereas writer logical processors can acquire it in exclusive mode. The logical processors are granted request ownership in fair order.

The following are the RW lock functions.

acquire_reader_lock, release_reader_lock, acquire_writer_lock, release_lock.

Subroutine Description

Acquires lock in shared mode.

Subroutine Inputs volatile se_rw_lock_t*1

Subroutine Operation

```
uint16 my_ticket;
my_ticket = atomic_inc16(&1->ticket);    /* get my ticket */
while (my_ticket != 1->rd_curr)          /* spin until it is my
turn */
    ;
1->rd_curr++;                            /* let the next reader start
*/
```

Flags Affected

None

Exceptions

None release_reader_lock

Subroutine Description

Releases lock acquired in shared mode.

Subroutine Inputs volatile se_rw_lock_t*1

Subroutine Operation atomic_inc16((uint16*)&1->curr); /*retire the read for writers */Flags Affected None Exceptions None acquire_writer_lock Subroutine Description Acquires lock in exclusive mode.

Subroutine Inputs
volatile se_rw_lock_t *l
Subroutine Operation

```
uint16 my_ticket;
my_ticket = atomic_inc16(&1->ticket);    /* get my ticket */
while (my_ticket != 1->curr)             /* spin until it is my
turn */
    ;
```

Flags Affected
None
Exceptions
None
  release_writer_lock
Subroutine Description
Releases lock acquired in exclusive mode.
Subroutine Inputs
volatile se_rw_lock_t*l
Subroutine Operation

```
unsigned int temp = 0;
temp = (1->curr + 1) &0xffff;
temp |= ((1->rd_curr + 1) << 16) & 0xffff0000;
1->curr_bits = temp;    /* update curr and rd_curr
atomically */
```

Flags Affected
None
Exceptions
None
  xutranslate
Subroutine Description
This subroutine is in fact a hardware add by which the uCode exposes the PMH address-translation functionality to other code. XUTRANSLATE is an operation that takes as input a PMH context, and a linear address, and produces the final physical address as the output. If the PMH encounters any fault conditions during the page table walk, those are reported to code.
Subroutine Inputs
TBD
Subroutine Operation
Flags Affected
None
Exceptions
None
  deriveKey
Subroutine Description
This subroutine is used to create a key by performing a CMAC operation over the DerivationBuffer with the identified key. DerivationBuffer needs to be a multiple of 128 bits.

Subroutine Inputs
pBaseKey—the base key to be used.
derivationBuffer—fixed size data field to be hashed.
Subroutine Operation

```
int32_t keySchedule[KEYSCHEDULE128_SIZE];    //key schedule
Create KeySchedule;
AES128_CMAC(KeySchedule, derivationBuffer, baseKey, mac, sizeof (derivationBuffer)*8) bufferSize *= 8;
Clear KeySchedule Memory;
```

Flags Affected
None
Exceptions
None

The invention claimed is:

1. A system comprising:
hardware logic to generate a platform-level key to provide for a secure enclave corresponding to a plurality of processors, wherein the platform-level key is to be derived from a plurality of processor-level keys corresponding to the plurality of processors, wherein each of the plurality of processors is to store a plurality of package-unique symmetric keys (PUSKs) and a plurality of package-specific asymmetric keys (PASKs), and wherein the secure enclave is to be executed from an enclave page cache in which data is to be protected using access control mechanisms to be provided by at least one processor of the plurality of processors having an instruction set architecture including a plurality of secure enclave instructions.

2. The system of claim 1, Wherein the plurality of processors is contained within a plurality of processor packages.

3. The system of claim 1, wherein the plurality of processors is contained within a single processor package.

4. A method comprising:
generating, by hardware logic, a multi-package secure enclave key, common to a plurality of processors;
storing the multi-package secure enclave key;
storing a package-unique symmetric key (PUSK) into the plurality of processors to be
used in a multi-package secure enclave, and
creating a plurality of package-specific asymmetric keys (PASKs) for each of the plurality of processors,
wherein a secure enclave is to be executed from an enclave page cache in which data is to
be protected using access control mechanisms to be provided by at least one processor of
the plurality of processors having an instruction set architecture including a plurality of
secure enclave instructions.

* * * * *